US008055910B2

(12) United States Patent
Kocher et al.

(10) Patent No.: US 8,055,910 B2
(45) Date of Patent: *Nov. 8, 2011

(54) REPROGRAMMABLE SECURITY FOR CONTROLLING PIRACY AND ENABLING INTERACTIVE CONTENT

(75) Inventors: Paul C. Kocher, San Francisco, CA (US); Joshua M. Jaffe, San Francisco, CA (US); Benjamin C. Jun, Oakland, CA (US); Carter C. Laren, Castro Valley, CA (US); Peter K. Pearson, Aptos, CA (US); Nathaniel J. Lawson, Oakland, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/563,793
(22) PCT Filed: Jul. 7, 2004
(86) PCT No.: PCT/US2004/021621
§ 371 (c)(1), (2), (4) Date: Aug. 4, 2006

(87) PCT Pub. No.: WO2005/008385
PCT Pub. Date: Jan. 27, 2005

(65) Prior Publication Data
US 2007/0033419 A1    Feb. 8, 2007

Related U.S. Application Data

(60) Provisional application No. 60/537,421, filed on Jan. 16, 2004.

(51) Int. Cl.
*G06F 11/30* (2006.01)
*G06F 12/14* (2006.01)

(52) U.S. Cl. ........ 713/193; 280/228; 380/201; 380/202; 380/203; 380/210; 380/211; 380/239; 380/240; 380/241; 380/242; 705/51; 705/54; 713/161; 713/168; 713/170; 713/179; 713/183; 713/184; 726/21; 726/32; 726/33

(58) Field of Classification Search .................. 713/193, 713/183
See application file for complete search history.

(56) References Cited

U.S. PATENT DOCUMENTS 4,598,288 A    7/1986    Yarbrough et al.
(Continued)

FOREIGN PATENT DOCUMENTS

AU    199960042    4/2000
(Continued)

OTHER PUBLICATIONS

Anderson, Ross (Ed.), "Information Hiding", Lecture Notes in Computer Science, First International Workshop, Cambridge, UK, May 30-Jun. 1, 1996, Proceedings, Springer.
(Continued)

*Primary Examiner* — William Korzuch
*Assistant Examiner* — Bryan Wright
(74) *Attorney, Agent, or Firm* — Schwegman, Lundberg & Woessner, P.A.

(57) ABSTRACT

Technologies to transfer responsibility and control over security from player makers to content authors by enabling integration of security logic and content. An exemplary optical disk (200) carries an encrypted digital video title combined with data processing operations that implement the title's security policies and decryption processes. Player devices include a processing environment (e.g., a real-time virtual machine), which plays content by interpreting its processing operations. Players also provide procedure calls to enable content code to load data from media, perform network communications, determine playback environment configurations (225), access secure non-volatile storage, submit data to CODECs for output (250), and/or perform cryptographic operations. Content can insert forensic watermarks in decoded output for tracing pirate copies. If pirates compromise a player or title, future content can be mastered with security features that, for example, block the attack, revoke pirated media, or use native code to correct player vulnerabilities.

24 Claims, 5 Drawing Sheets

U.S. PATENT DOCUMENTS

| | | | |
|---|---|---|---|
| 4,890,319 A | 12/1989 | Seth-Smith et al. | |
| 5,172,413 A | 12/1992 | Bradley et al. | |
| 5,191,611 A | 3/1993 | Lang | |
| 5,214,702 A | 5/1993 | Fischer | |
| 5,315,448 A | 5/1994 | Ryan | |
| 5,323,244 A | 6/1994 | Yamaguchi et al. | |
| 5,343,527 A | 8/1994 | Moore | |
| 5,392,351 A | 2/1995 | Hasbe et al. | |
| 5,418,853 A | 5/1995 | Kanota et al. | |
| 5,450,489 A | 9/1995 | Ostrover et al. | |
| 5,513,260 A | 4/1996 | Ryan | |
| 5,574,787 A | 11/1996 | Ryan | |
| 5,590,194 A | 12/1996 | Ryan | |
| 5,606,612 A | 2/1997 | Griffin et al. | |
| 5,613,004 A | 3/1997 | Cooperman et al. | |
| 5,638,443 A | 6/1997 | Stefik et al. | |
| 5,646,999 A | 7/1997 | Saito | |
| 5,668,954 A * | 9/1997 | Feder et al. | 369/30.24 |
| 5,687,236 A | 11/1997 | Moskowitz et al. | |
| 5,802,592 A | 9/1998 | Chess et al. | |
| 5,822,436 A | 10/1998 | Rhoads | |
| 5,859,950 A | 1/1999 | Iwamoto | |
| 5,862,218 A | 1/1999 | Steinberg | |
| 5,889,919 A | 3/1999 | Inoue et al. | |
| 5,903,650 A | 5/1999 | Ross et al. | |
| 6,041,316 A | 3/2000 | Allen | |
| 6,064,967 A | 5/2000 | Speicher | |
| 6,141,681 A | 10/2000 | Kyle | |
| 6,164,853 A | 12/2000 | Foote | |
| 6,272,631 B1 | 8/2001 | Thomlinson et al. | |
| 6,289,455 B1 * | 9/2001 | Kocher et al. | 713/194 |
| 6,314,409 B2 | 11/2001 | Schneck et al. | |
| 6,314,565 B1 | 11/2001 | Kenner et al. | |
| 6,393,568 B1 | 5/2002 | Ranger et al. | |
| 6,470,450 B1 | 10/2002 | Langford et al. | |
| 6,487,663 B1 * | 11/2002 | Jaisimha et al. | 713/193 |
| 6,496,898 B1 | 12/2002 | Tsutsui | |
| 6,529,950 B1 | 3/2003 | Lumelsky et al. | |
| 6,542,610 B2 * | 4/2003 | Traw et al. | 380/262 |
| 6,744,891 B1 | 6/2004 | Allen | |
| 6,782,190 B1 | 8/2004 | Morito | |
| 6,859,789 B1 | 2/2005 | Hayashi | |
| 6,931,534 B1 | 8/2005 | Jandel et al. | |
| 6,937,553 B1 | 8/2005 | Mitui | |
| 6,957,343 B2 | 10/2005 | Ripley et al. | |
| 6,999,587 B1 | 2/2006 | Asano et al. | |
| 7,065,216 B1 | 6/2006 | Benaloh et al. | |
| 2002/0004903 A1 * | 1/2002 | Kamperman et al. | 713/182 |
| 2002/0026638 A1 | 2/2002 | Eldering et al. | |
| 2002/0035492 A1 | 3/2002 | Nonaka | |
| 2002/0071553 A1 | 6/2002 | Shirai et al. | |
| 2002/0087871 A1 * | 7/2002 | Ripley | 713/193 |
| 2002/0116533 A1 * | 8/2002 | Holliman et al. | 709/246 |
| 2002/0124251 A1 | 9/2002 | Hunter et al. | |
| 2002/0141582 A1 | 10/2002 | Kocher | |
| 2003/0018895 A1 | 1/2003 | Morrison | |
| 2003/0046238 A1 | 3/2003 | Nonaka et al. | |
| 2004/0039911 A1 | 2/2004 | Oka et al. | |
| 2004/0111608 A1 | 6/2004 | Oom Temudo de Castro et al. | |
| 2004/0133794 A1 * | 7/2004 | Kocher et al. | 713/193 |
| 2004/0153648 A1 | 8/2004 | Rotholtz et al. | |
| 2008/0072040 A1 | 3/2008 | Asano | |
| 2008/0101604 A1 | 5/2008 | Kocher | |
| 2008/0133938 A1 | 6/2008 | Kocher et al. | |
| 2008/0137848 A1 | 6/2008 | Kocher et al. | |

FOREIGN PATENT DOCUMENTS

| | | |
|---|---|---|
| CN | 1245926 A | 3/2000 |
| EP | 0668695 | 8/1995 |
| EP | 0668695 A2 | 8/1995 |
| EP | 0717337 A1 * | 11/1995 |
| EP | 0 696 121 A1 | 2/1996 |
| EP | 0 717 337 A1 | 6/1996 |
| EP | 982725 A2 | 1/2000 |
| JP | 09-163339 | 6/1997 |
| JP | 11-088659 | 3/1999 |
| JP | 11-185383 | 7/1999 |
| JP | 11-232775 | 8/1999 |
| JP | 2000090567 | 3/2000 |
| JP | 2000163883 | 6/2000 |
| JP | 2000175188 | 6/2000 |
| JP | 2001006278 | 1/2001 |
| JP | 2001023297 | 1/2001 |
| WO | WO 98/29869 | 7/1998 |
| WO | WO 98/58306 | 12/1998 |
| WO | WO 00/21087 | 4/2000 |
| WO | WO 00/31964 | 6/2000 |
| WO | WO 00/59152 | 10/2000 |
| WO | WO 01/13571 A1 | 2/2001 |
| WO | WO-0113199 A1 | 2/2001 |
| WO | WO-2005008385 A2 | 1/2005 |
| WO | WO-2005008385 A2 | 1/2005 |

OTHER PUBLICATIONS

Simmons, Gustavus, "Contemporary Cryptology", IEEE Press, New York, NY, 1991, pp. 199-202.

Ford, Susan, "Advanced Encryption Standard (AES) Questions and Answers", Oct. 2, 2000, pp. 1-5, obtained from http://www.nist.gov/public_affairs/releases/aesq&a.htm.

Ford, Susan, "Advanced Encryption Standard (AES) Questions and Answers," Oct. 2, 2000, pp. 1-5, obtained from http://www.nist.gov/public_affairs/releases/aesq&a.htm.

"U.S. Appl. No. 10/614,765, Final Office Action mailed Oct. 22, 2008", 27 pgs.

"U.S. Appl. No. 10/614,765, Non Final Office Action mailed Jun. 4, 2007", 19 pgs.

"U.S. Appl. No. 10/614,765, Non-Final Office Action mailed Apr. 28, 2009", 26 pgs.

"U.S. Appl. No. 10/614,765, Preliminary Amendment filed Feb. 4, 2005", 8 pgs.

"U.S. Appl. No. 10/614,765, Response filed Feb. 13, 2009 to Final Office Action mailed Oct. 22, 2008", 16 pgs.

"U.S. Appl. No. 10/614,765, Response filed Mar. 28, 2007 to Restriction Requirement mailed Jan. 3, 2007", 7 pgs.

"U.S. Appl. No. 10/614,765, Response filed Jul. 23, 2008 to Non Final Office Action mailed Feb. 25, 2008", 12 pgs.

"U.S. Appl. No. 10/614,765, Response filed Dec. 1, 2007 to Non Final Office Action mailed Jun. 4, 2007", 14 pgs.

"U.S. Appl. No. 10/614,765, Restriction Requirement mailed Jan. 3, 2007", 5 pgs.

"European Application Serial No. 04756690.6, Office Action Mailed Sep. 1, 2008", 15 pgs.

"U.S. Appl. No. 10/614,765, Response filed Aug. 27, 2009 to Non Final Office Action mailed Apr. 28, 2009", 15 pgs.

"Australian Application Serial No. 2004258523, Examiner's First Report mailed Aug. 4, 2009", 3 pgs.

"Australian Application Serial No. 2004258523, Response filed Sep. 25, 2009 to Examiner's First Report mailed Aug. 4, 2009", 42 pgs.

"Chinese Application Serial No. 2004800239483, First Office Action mailed Sep. 7, 2007", (English Translation), 5 pgs.

"On Digital Optical Disk", *Computer Technique Issue 10*, (2000), 5 pgs.

"U.S. Appl. No. 10/614,765, Examiner Interview Summary May 20, 2008", 2 pgs.

"U.S. Appl. No. 11/981,977, Non Final Office Action mailed Sep. 1, 2009", 18 pgs.

"U.S. Appl. No. 11/982,190, Non Final Office Action mailed Oct. 2, 2009", 14 pgs.

"China Application Serial No. 2008100822994, Office action mailed Oct. 23, 2009", 6 pgs.

"U.S. Appl. No. 10/614,765, Final Office Action mailed Dec. 14, 2009", 27 Pgs.

"U.S. Appl. No. 10/614,765, Non Final Office Action mailed Feb. 25, 2008", 19 pgs.

"U.S. Appl. No. 11/981,977, Response filed Dec. 31, 2009 to Non Final Office Action mailed Sep. 1, 2009", 10 pgs.

"U.S. Appl. No. 11/981,990, Non Final Office Action mailed Feb. 26, 2010", 18 pgs.

"U.S. Appl. No. 11/981,990, Response filed Nov. 24, 2009 to Restriction Requirement mailed Oct. 30, 2009", 9 pgs.

"U.S. Appl. No. 11/981,990, Restriction Requirement mailed Oct. 30, 2009", 6 pgs.

"U.S. Appl. No. 11/982,190, Response filed Dec. 21, 2009 to Non Final Office Action mailed Oct. 2, 2009", 11 pgs.

"U.S. Appl. No. 11/981,977, Final Office Action mailed Apr. 8, 2010", 13 pgs.

"U.S. Appl. No. 11/982,190, Final Office Action mailed Mar. 29, 2010", 15 pgs.

"U.S. Appl. No. 10/614,765 Non-Final Office Action mailed Aug. 9, 2010", 28 pgs.

"U.S. Appl. No. 10/614,765, Response filed Jun. 10, 2010 to Final Office Action mailed Dec. 14, 2009", 14 pgs.

"U.S. Appl. No. 11/981,977, Response filed Sep. 8, 2010 to Final Office Action mailed Apr. 8, 2010", 10 pgs.

"U.S. Appl. No. 11/981,990 Final Office Action mailed Sep. 13, 2010", 19 pgs.

"U.S. Appl. No. 11/981,990, Response filed Jun. 29, 2010 to Non Final Office Action mailed Feb. 26, 2010", 13 pgs.

"U.S. Appl. No. 11/982,190 Non-Final Office Action mailed Jul. 20, 2010", 32 pgs.

"U.S. Appl. No. 11/982,190, Advisory Action mailed Jun. 16, 2010", 3 pgs.

"U.S. Appl. No. 11/982,190, Response filed May 19, 2010 to Final Office Action mailed Mar. 29, 2010", 15 pgs.

"U.S. Appl. No. 10/614,765, Response filed Jan. 10, 2011 to Non Final Office Action mailed Aug. 9, 2010", 15 pgs.

"U.S. Appl. No. 11/981,977, Non Final Office Action mailed Dec. 28, 2010", 15 pgs.

"U.S. Appl. No. 11/981,990, Response filed Jan. 13, 2011 to Final Office Action mailed Sep. 13, 2010", 9 pgs.

"Australian Application No. 2010200153—Office Action Response", 33 pgs.

"Indian Application Serial No. 479/CHENP/2006, Office Action mailed Jan. 18, 2011", 8 pgs.

"Indian Application Serial No. 479/CHENP/2006, Response filed Mar. 1, 2011 to Office Action mailed Jan. 18, 2011", 3 pgs.

"Japanese Application Serial No. 2006-518845, Response filed Jan. 20, 2011 to Office Action mailed Oct. 20, 2010", 9 pgs.

"Korean Application Serial No. 10-2006-7000444—Office Action Response", 13 pgs.

"Korean Application Serial No. 10-2006-7000444, Amendment filed Mar. 30, 2010", 19 pgs.

"U.S. Appl. No. 11/982,190, Examiner Interview Summary Received Aug. 25, 2010", 4 pgs.

"U.S. Appl. No. 11/982,190, Non Final Office Action mailed Dec. 9, 2010", 7 pgs.

"U.S. Appl. No. 11/982,190, Response filed Sep. 22, 2010", 14 pgs.

"Australian Application Serial No. 2010200153, First Examiner Report mailed Nov. 8, 2010", 2 pgs.

"European Application Serial No. 04756690.6, Office Action Response Filed Oct. 26, 2010", 9.

"Japanese Application Serial No. 2006-518845, Office Action mailed Oct. 21, 2010", 6 Pgs.

"Korean Application Serial No. 10-2006-7000444, Office Action mailed Jan. 30, 2010", 3 Pgs.

"Korean Application Serial No. 10-2006-7000444, Office Action mailed Oct. 29, 2010", 3 Pgs.

EP Search Report for EP08075213 (a counterpart to US20020141582) and communication setting for examination, mailed Jun. 3, 2008—rel to references cited on previous page.

US Office Action mailed Feb. 25, 2008 in a sister case (corresp. to US Publ. 20040133794), rel to reference cited on previous page.

"Australian Application Ser. No. 2010200153, Examiner Report mailed Mar. 1, 2011", 2 Pgs.

"China Application Ser. No. 200810082299.4—Office Action Response", 92 pgs.

"Japanese Application Ser. No. 2006-518845, Final Office Action mailed Mar. 18, 2011", 5 Pgs.

* cited by examiner

REPROGRAMMABLE SECURITY FOR CONTROLLING PIRACY AND ENABLING INTERACTIVE CONTENT

CROSS REFERENCE TO RELATED APPLICATIONS

The present patent application is a U.S. national phase application of International Application No. PCT/US2004/021621, filed Jul. 7, 2004, which claims priority to U.S. patent application Ser. No. 10/614,765 filed Jul. 7, 2003, and to U.S. provisional patent application Ser. No. 60/537,421 filed Jan. 16, 2004.

FIELD

This application relates generally to securing the distribution of digital content and other data against piracy and other unauthorized use or redistribution.

BACKGROUND

A wide variety of systems have been proposed for protecting digital content. Most such schemes encrypt the content to protect it against unauthorized use and copying while it is stored on media or sent over untrusted communication channels. Decryption algorithms and keys are then managed by trusted, tamper-resistant software or hardware modules, which are designed to enforce access control rules (which may be fixed or configurable) specifying how the content can be used.

Content protection schemes are generally customized for a particular playback environment. For example, anti-piracy systems in software-only streaming content players designed for personal computers lack the security benefits of tamper resistant hardware but can generally be upgraded without great difficulty (e.g., if the user uninstalls the player and downloads an updated version from the manufacturer web site). As a result, such systems may provide less robust security than hardware-based players, but the consequences of an attack are relatively small since upgraded security features can be deployed by modifying the content stream and requiring that users upgrade their software.

In contrast, protection methods embedded in consumer electronics hardware devices that play optical media are notoriously difficult to upgrade. Security challenges include the long lifetime of optical media (which prevents security upgrades that are not backward-compatible), the lack of a convenient and reliable way to deliver updates to players, and the lack of standardization between player implementations. These difficulties, combined with the long lifetime of playback devices and the consumer expectation that all new content will play on old players, make it extremely difficult to introduce security upgrades. As a consequence, most consumer electronics devices provide little or no real protection against copying, and the few content protection standards that are deployed in consumer electronics devices tend to be simple, rigid schemes that offer little flexibility and renewability. FIG. 1 diagrams a typical content protection system of the background art. Content player 100 includes software in nonvolatile program memory 105, which implements the player's security policies 110, decryption code 120, and player keys 130. This code and keys are used by processor 140 to validate whether the content read from media 150 is valid and, if so, to decrypt the content and supply the results to output interface 160. Examples of protection systems like the one shown in FIG. 1 include the copy control scheme used with digital audio tape, the content scrambling system (CSS) intended to protect DVD video, and the CPPM scheme proposed for protecting DVD audio.

A variety of different technologies are known in the background art:

Access control policies: A wide variety of access policies, and methods for specifying such policies, are known in the background art. For example, the software protection system of U.S. Pat. No. 4,658,093 to Hellman uses a straightforward authorization code issued by a publisher. In contrast, U.S. Pat. No. 5,982,891 to Ginter et al. describes a variety of very complex access rules involving a large number of participants. Standards for encoding access policies (both for use with content distribution and other applications) have also been proposed, such as PolicyMaker and the X.509 certificate format.

Anti-virus software: Methods for detecting and blocking known viruses, Trojan horses, and other malicious code are well known in the background art. These methods generally involve scanning for attributes of known viruses, such as known instruction sequences. These programs can work in a variety of ways, such as scanning files during start-up, scanning files on-the-fly, scanning programs as they execute, scanning memory, scanning new media, scanning network communications, etc.

Content protection systems and DRMs: A wide variety of content protection systems (which are also sometimes called Digital Rights Management (DRM) systems) have been proposed. DRM systems of the background art generally provide for content to be distributed in encrypted form, then supply decryption keys or perform decryption operations for legitimate purchasers. Many features have been proposed or included in commercial DRMs, including support for superdistribution (where encrypted content can be exchanged between users), pay-per-use billing (including off-line pay-per-use with reporting via a telephone line), variable billing rates (charging different amounts based on promotions, number or duration of uses, requested user operations, user history, etc.), protection for various data types (audio, video, text, software, etc.), support for various formats, and support for various playback device types (portable, set-top, computer-based with hardware assistance, software-only, etc.)

Copy protection: Methods for copy protecting personal computer software are known and are widely deployed for some kinds of software such as computer games. These methods often involve binding a software program to physical media that are designed to be difficult to copy (e.g., by intentionally incorporating errors or nonstandard formatting that are difficult to replicate). Other copy protection systems involve securing the installation process, e.g. by requiring that users obtain an authorization code from a server. In some cases, copy protection features are designed into a system. In others cases (including copy protection systems used for computer software, videocassette tapes, and audio CDs), copy protection is implemented by producing media with nonstandard encoding that allows playback on most players but will confuse most attempts to copy the media. A major design challenge for copy protection systems is to minimize the impact on legitimate users (i.e., obtain high playability and user acceptance) while preventing undesirable actions as effectively as possible (i.e., obtaining good security).

Cryptographic functions: A wide variety of basic cryptographic functions are known, including block ciphers, hash functions, digital signature systems (and other public key systems), key management systems, etc. For more information about basic cryptography, see *Applied Cryptography* by Bruce Schneier.

Cryptographic oracles: Using block ciphers or other cryptographic functions, it is possible to construct "cryptographic oracles" which apply a secret cryptographic transformation to arbitrary externally-supplied input messages and return the results. Cryptographic oracles can be constructed so that it is computationally infeasible for an attacker who knows the oracle's algorithms and protocols to determine the oracle's keys. In addition, because the number of possible inputs to an oracle can be extremely large (e.g., $2^{256}$ for an oracle constructed from a 256-bit block cipher), it is not feasible for an attacker to anticipate or pre-compute the responses to random queries.

Interpreters, emulators, and virtual machines: A variety of interpreted computer languages are known in the background. Some interpreted languages, such as Java, require a compilation process to convert source code into an executable or interpretable form. In contrast, most BASIC interpreters operate directly on the source code. Some interpreters allow self-modifying code, while others do not. Technology for implementing interpreters and for emulating assembly languages is also known in the background art. For example, sophisticated emulators such as Virtual PC and SoftWindows can run programs designed for Microsoft Windows on Apple Mac computers. Virtual machine (VM) designs, such as those used for Java and JavaCard, are known, and it is also known that VMs can interact with native code on the computer, or call other VM functions in different memory spaces. (Many Java implementations provide these capabilities.) Interpreted languages are commonly used for applications or where cross-platform compatibility is required, such as for creating processor-independent device driver formats. (See, for example, *Writing FCode 2.x Programs*, Sun Microsystems, 1993, page 5.)

Key management: A wide variety of methods for assigning and managing cryptographic keys have been proposed. It is known that devices can have device-specific keys, group keys, public keys, private keys, certificates, etc. Keys can be assigned to individual devices, to selected groups of devices (e.g. as described in U.S. Pat. No. 5,592,552 to Fiat), to all devices, etc. Devices can contain a variety of keys of different types, including symmetric keys, public keys (e.g., to verify certificates and digital signatures) and asymmetric private keys.

Media: Media technologies are known that can offer tremendous storage capacity, low manufacturing cost, and good durability. Examples of current media technologies include optical discs (CD, DVD, etc.), magnetic media, flash memory, and ROMs. Newer technologies, such as holographic memories, are also being developed. It is known that a single piece of media can include data of many different types. For example, a compact disc can contain standard Red Book audio tracks as well as a data session for use on personal computers (e.g., containing software, compressed bonus tracks, images, videos, lyrics, etc.) Compact discs for use for use in personal computers can contain both encrypted content as well as the playback software required to play the content.

Network communication: Sophisticated data networks, including the Internet, are known. These networks can provide flexible, reliable, high-bandwidth data communication. Although networks with a physical connection usually provide higher bandwidth, wireless communication channels are also popular.

Renewable security: In some cases, it is not practical to produce a security system that is guaranteed to be able to prevent all possible attacks. As a result, it is desirable that it be possible to renew security after an attack, e.g. by discontinuing the use of any compromised keys and correcting the vulnerability. Although renewable security is desirable, many deployed and proposed systems lack any effective recovery mechanism for many kinds of attacks.

Sandboxing: Sandboxing involves executing software programs in a controlled environment where the program is unable to access any operations that could damage the system. The Java "virtual machine" supports sandboxing so that untrusted applets (such as those downloaded over the Internet) can be executed.

Security modules: Many security systems employ removable security modules so that the security upgrades can be performed without the difficulty or expense of replacing other portions of the system. For example, removable security modules are used in many pay television systems.

Software updates: Secure software updates can be performed by receiving a proposed software update, verifying a digital signature or message authentication code validating the update, then (if the signature is valid) performing the update. For example, it is known that digital audio players can receive code updates, verify digital signatures or message authentication codes on the updates, and (if valid) update their code. Methods for ensuring that updates are applied in the correct order (e.g., using sequence counters) and for recovering from failed or unsuccessful updates (e.g., by reverting to previous software versions or by activating special recovery code) are also known. It is also known that software updates can be delivered via virtually a wide variety of distribution mechanisms, such as the Internet, optical media, ROM cartridges, etc. Software updates have been used to prevent pay television piracy by distributing code updates with the signal to descramblers, which apply and successfully execute the new code to compute the correct decryption key for the next video segment. These updates are commonly used to prevent unauthorized viewing by disabling or even destroying unauthorized descramblers.

Steganography: Steganography involves hiding information in data. For example, it is known that encrypted data can be placed in the least-significant bits of an image or sound recording. An attacker who obtains this image or recording but does not know the decryption key cannot even determine whether there is any hidden data because low-order bits often appear random and ciphertext produced by a strong encryption algorithm cannot be distinguished from random data without the key.

Tamper resistance: Many methods are known for designing and constructing devices that are resistant to attack. Tamper resistant hardware is commonly used in systems where it is desirable to prevent attackers from reverse engineering devices or extracting keys from cryptographic modules. For example, Wave Systems markets a tamper-resistant microprocessor-based integrated circuit product called "Embassy" which can be integrated with content players or general-purpose computers and is advertised for use in securing the distribution of digital content. Methods for implementing tamper resistant software have also been proposed (see, for example, U.S. Pat. No. 5,892,899 to Aucsmith et al.).

Traitor Tracing: Traitor tracing schemes have been proposed to identify the source of compromises or attacks, typically by tracing keys used in unauthorized devices back to a customer particular or compromised device.

Watermarking: Watermarks are signals embedded in content that can be detected by a specialized detector but do not affect (or minimally affect) human perception of the content when played. Watermarks embedded in pictures, sound recordings, and images have been used by copyright holders to indicate that copying is not authorized. "Robust" watermarks are known that can withstand conversions between formats (including re-recording from analog outputs) and provide varying degrees of security against attacks attempting to remove the watermark. In contrast, "fragile" watermarks have little or no ability to withstand format conversions but are easier to design and can carry more information.

Although no anti-piracy system can completely prevent all possible attacks, systems of the background art fail to provide practical solutions to solvable problems such as casual piracy using digital-to-digital copying or high-speed ripping of protected formats to unprotected formats. Significant limitations of many systems of the background art include, without limitation:

Reliance on global secrets: Many protection systems require that cryptographic algorithms, keys, and other information needed for decoding be kept secret. As a result, the decoding process cannot be documented in open standards documents without compromising the security of the system. Also, if a large number of implementations are available, attackers can potentially break the entire scheme by attacking the weakest implementation. (Such an attack recently occurred with the DVD video protection system.) While such systems are useful in closed single-vendor environments, they cannot be standardized and do not provide effective long-term security.

Lack of standardization: Content publishers have already committed to a variety of data formats and decryption algorithms that are incompatible. Different content protection systems enable different business models, and publishers who have committed to one model are likely to oppose any security system that requires a different model.

Incompatibility with product types: Many security features cannot be integrated with all product types. For example, downloadable software-only players for personal computers cannot include tamper-resistant hardware. Similarly, frequent software updates are difficult to deliver to players lacking Internet connectivity.

User interface: Many proposals involve complex user interfaces. Security should be invisible to honest users. Users are likely to reject schemes that require explicit user involvement (e.g., to obtain or enter authorization codes). In general, consumer electronics devices such as car stereos and video disc players must be easy-to-use, since many users must be satisfied even if they do not read documentation, are intimidated by technology, have poor eyesight or other handicaps, or lack fluency in the languages supported by the player.

Legal challenges: Some security systems require cooperation between competitors. Such cooperation can be illegal due to antitrust regulations.

Lack of manufacturer benefit: Manufacturers will oppose security features that increase player cost, time-to-market, prevent the inclusion of legitimate features, or otherwise make their products less effective or desirable. Although advances in semiconductor technology are decreasing the cost required to implement security systems, effective tamper-resistant hardware remains difficult and expensive to design and produce. As a result, content protection systems that rely on manufacturers to produce good implementations will fail unless they provide a real marketplace advantage to manufacturers whose offerings are more secure.

Indefinite security policies: Effective security systems must specify rules or other decision-making procedures for determining whether to allow or prevent user-requested specific actions. In many systems, these rules or procedures are not well specified.

Inflexible security policies: It is desirable for content protection systems to have the flexibility to support different models for different publishers, content types, jurisdictions, playback environments, etc. Systems should offer the necessary flexibility without becoming too complex.

Weak long-term security: Security systems must be robust and flexible enough to remain effective for a long time. Few content protection systems of the background art could last more than a few years as part of a high-profile format, while a popular format can last for more than 30 years.

Untraceability of attacks: If attacks do occur, systems should be able to identify the source of the attack so that the compromised (or misused) device can be revoked and so that criminals can be prosecuted.

SUMMARY

The present application relates to various embodiments, and aspects, of a standardizable content protection system that can be implemented in a manner providing flexible and renewable content protection across a wide variety of interoperable platforms. The system provides participants (manufacturers, publishers, artists, and/or consumers, etc.) with unparalleled flexibility to make decisions about security and functionality.

An exemplary player usable with the system (i.e., a device that wishes to decrypt or otherwise gain access to protected content) includes several components. The first is a data or media input interface, such as for an optical disc drive. To initiate playback, the player loads a sequence of data processing commands from the input interface and begins executing these commands using an interpreter or other execution module. This execution environment preferably provides a Turing-complete language (one that can execute any algorithm, subject to the player's memory, user interface, and performance limitations). From the execution environment, the content can query the player to determine the configuration of the playback environment and to perform cryptographic operations using the player's keys. Content can thus be designed so that playback will only proceed on players that provide satisfactory responses to queries. Publishers can also provide limited playback. For example, less secure platforms could provide CD-quality stereo audio or regular-definition images, while more secure platforms could offer more audio channels, high-definition images, higher sampling rates, and higher-quality compression. Even after playback begins, playback can remain under the control of the content's data processing commands. One exemplary embodiment includes the capability to perform robust, essentially on-the-fly watermarking. Enabling the content itself to control what data regions are played, makes it possible to embed information in the output by selecting between output data versions with tiny differences. Pirate copies can be traced back to a specific player by analyzing these differences.

Because the content contains and enforces its own security policies, attacks that occur can be addressed by designing and issuing new content that is resistant. The flexibility afforded by allowing content to enforce its own security policies also allows support for artists' preferences, regional "fair use" regulations, etc. New player features can be added easily by adding new content-accessible player functions.

From a business perspective, it is desirable that any content protection system be usable to unite content publishers and consumer electronics manufacturers in the common goal of providing the best possible security consistent with their business and operational constraints. The systems disclosed herein allow publishers to determine their own security requirements then allow the content itself to implement policies that consider a wide variety of factors and determine whether (or how) to play in each environment. Also, manufacturers can be motivated to design products that offer good security and do not facilitate piracy so that their customers will have the broadest-possible access to content.

DETAILED DESCRIPTION

Figure 1:
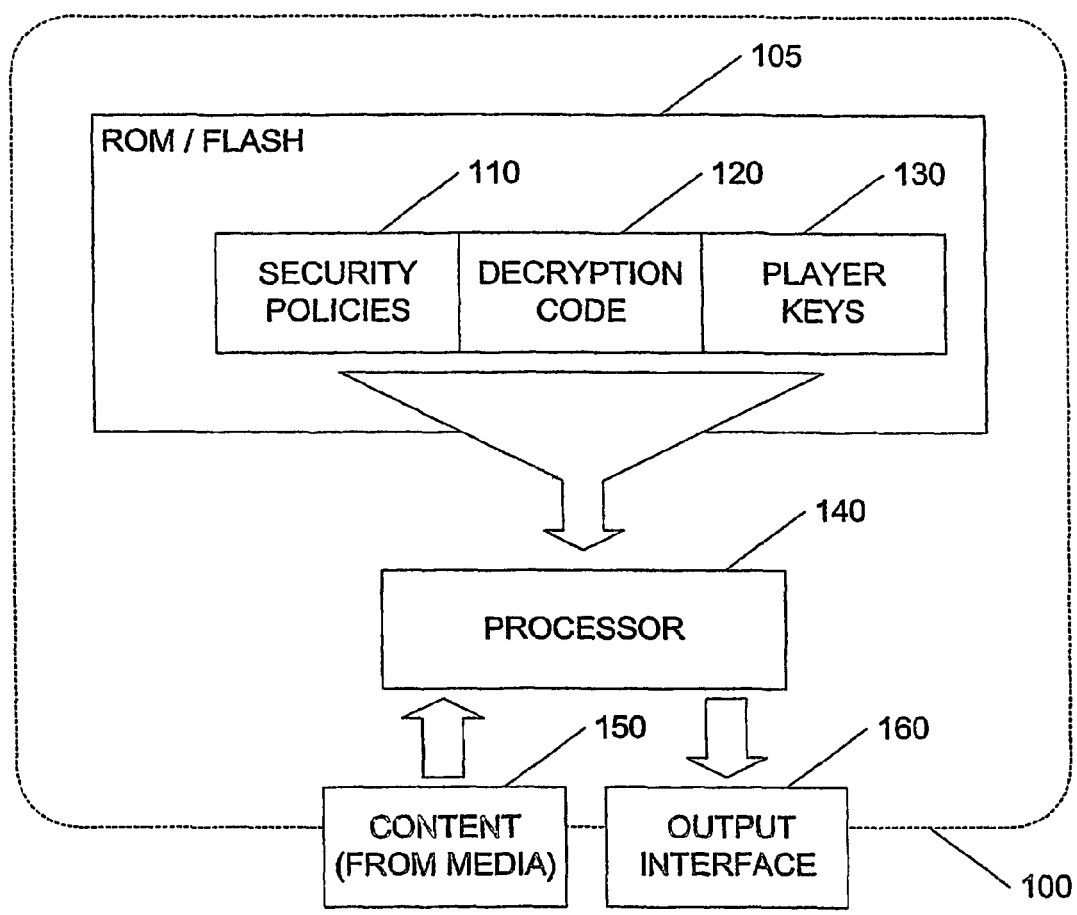
FIG. 1 shows a media player using content protection methods of the background art.
Figure 2:
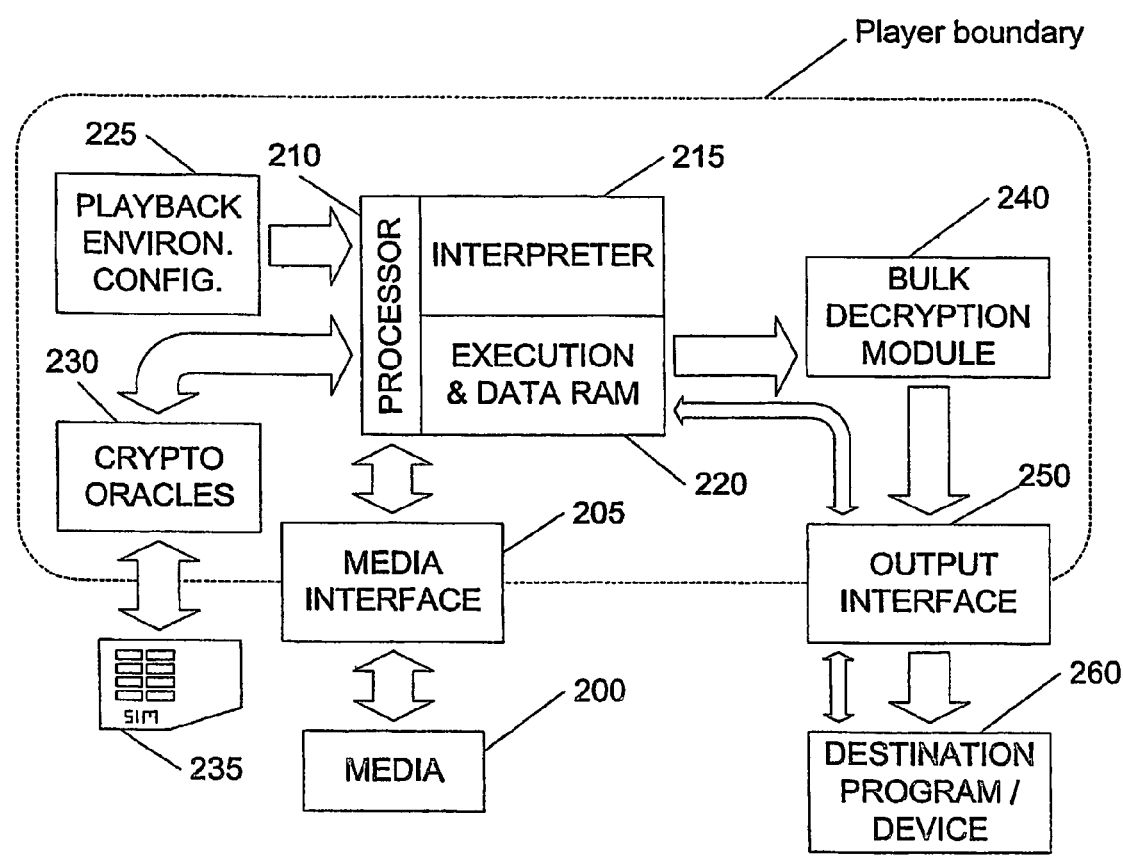
FIG. 2 illustrates an exemplary media player using content protection methods disclosed herein.
Figure 3:
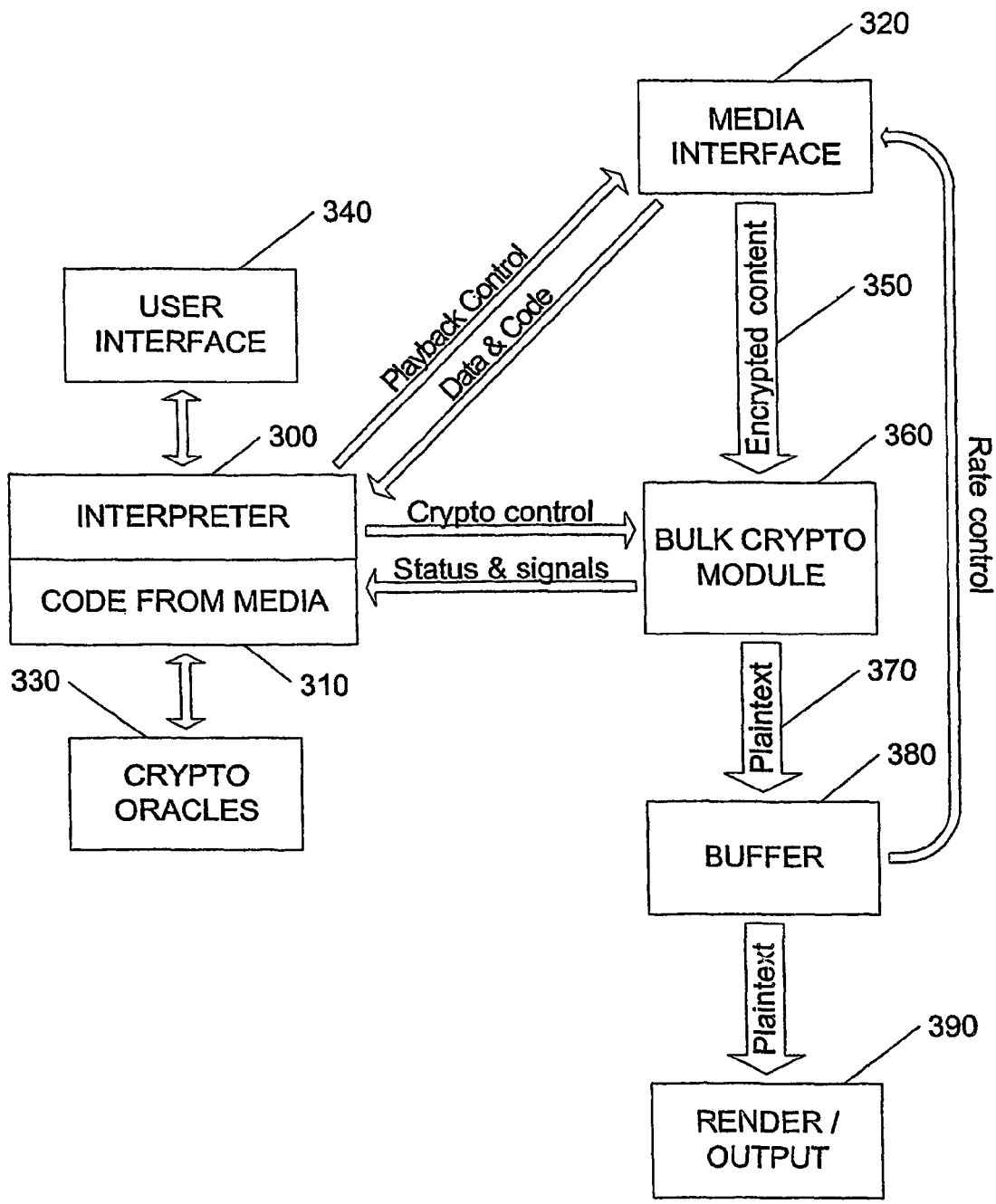
FIG. 3 illustrates the decryption portion of an exemplary embodiment.

FIG. 2 shows an exemplary embodiment of a player using physical media 200. The playback process is controlled by processor 210, which can access media 200 via media interface 205. When media 200 is mounted (e.g., when it is first inserted, or the system is re-initialized, etc.), processor 210 begins by initializing the media interface, reading the media's table of contents, and recognizing the protection system supported. If so, the processor loads a small initial portion of media 200 into execution and data RAM 220.

Using interpreter 215, processor 210 begins performing the data processing operations specified by the loaded media portion. Interpreter 215 provides a set of predetermined data processing operations from which more complex tasks can be accomplished. The interpreted language is preferably Turing-Complete. Turing-Complete programming languages are characterized in that algorithms implementable in one such language can be implemented in any other, and the implementations will have similar asymptotic performance characteristics. Examples of Turing Complete programming languages include without limitation C, C++, BASIC, Fortran, Pascal, Java, and virtually all assembly languages.

The loaded portion proceeds by invoking procedure calls provided by interpreter 215. Although the initial data loaded into RAM 220 may be relatively small, code running on interpreter 215 can load additional data (including code) from the media via procedure calls, thereby allowing more complex operations to be performed.

Other procedure calls allow the content to determine the playback environment configuration 225. The content can thus analyze the playback environment characteristics (e.g., player type, requested user action, etc.) to determine if playback should proceed. In an exemplary embodiment, if correctable problems are detected (e.g., if the media contains a security firmware upgrade for the player), these can be addressed. If supported, the content can also query output interface 250 and, if supported, destination program/device 260 (e.g., amplifier, digital speakers, speaker driver, etc.) to check security characteristics, load cryptographic keys, specify output parameters (e.g., to specify reduced output quality if security is uncertain), etc.

In an exemplary embodiment, the content can also query cryptographic oracles 230, which may be implemented in an external removable security module 235 (such as a smart card, etc.) to allow for security hardware upgrades. Oracles can also be implemented, without limitation, in processor 210, other hardware in the player, in media, in attached devices such as speakers, etc. Cryptographic oracles 230 can provide the content with verifiable proof of the player's identity. Results from queries to oracles 230 can be used in decrypting subsequent content or code portions, thereby providing strong cryptographic assurance that players lacking valid keys (or whose keys are revoked) cannot decrypt the content.

In an exemplary embodiment, the interpreter executes the data processing commands specified by the content in a "sandbox," meaning that the content does not have access to cryptographic secrets (such as oracle keys) that could otherwise compromise the player. Sandboxing is useful where not all content is necessarily trustworthy. For example, an attacker could try to produce malicious content that attempted to extract the cryptographic keys from players. (Additional information about exemplary cryptographic oracles and their operation is provided below.)

If the content determines that playback should not proceed (for example if a user is attempting to make a copy and the content is configured to prohibit copying), the content can report an error and reject the requested action. Alternatively, the content can control the rendering and/or output processes to reduce the quality of the output so that unauthorized copies will be degraded and therefore less attractive.

If the content determines that playback should proceed, the content then awaits a signal from the player specifying that playback should begin from a specific location on the media (e.g., a particular track). Interpreter 215 processes the request using the data processing instructions loaded into execution/data RAM 220 when the media was mounted. If the content decides that playback should proceed, it uses procedure calls to direct media interface 205 to begin loading encrypted content from the appropriate location on media 200. The content specifies valid decryption keys and parameters to bulk decryption module 240, which retrieves the encrypted content from RAM 220 (or, alternatively, directly from media interface 205) and decrypts it. The decrypted content is then supplied to output interface 250, which converts it to the appropriate analog or digital format for destination program or device 260. As playback continues, the data processing instructions being processed by interpreter 215 can load new decryption parameters, specify new blocks of data to read from media 200, etc. When playback completes, the content can re-initialize the RAM 220.

Additional information is provided in the following sections about the interpreter, the playback system, and other embodiments and aspects.

Responding to Attacks

Anti-piracy systems implemented widely in software and in low-cost consumer electronics devices cannot prevent all possible attacks. The techniques disclosed herein are usable, following an attack, to facilitate mastering new content in ways that substantially block the existing attacks. While professional pirates may try to continuously seek out and install new circumvention systems, casual piracy will involve an ongoing struggle to develop and maintain attack tools and will hopefully therefore be more difficult than simply purchasing content legitimately. The following sections describe how the techniques described herein can be used to address some common attacks.

A first category of attack involves attempts to use uncompromised players to perform unauthorized actions. For example, content can be mastered to allow copying from original media but disallow copying from copies. If an attempt is made to copy such content from a copy (which the content could, for example, recognize by detecting modifications inserted during the copying process or by comparing the current media's serial number and/or type with the original), playback can be blocked by the interpreter code. Alternatively, the interpreter can allow content to play with reduced fidelity (such as playing stereo audio with a 44.1 kilohertz sample rate even though multi-channel audio with a higher sample rate might be available), or by inserting additional anti-piracy warnings. Thus, by analyzing information provided to the interpreter, inappropriate user requests can be detected and handled on non-compromised players.

A second category of attack involves compromise of a player's cryptographic keys. If a player's cryptographic keys have been compromised, an attacker could (at least in theory) emulate the compromised playback environment completely by emulating the cryptographic oracles and (optionally) providing false responses to queries about the playback environment. Security can be re-established after such an attack by making the interpreted code in future content require at least one cryptographic key that was not present in the compromised device. If a particular player model or manufacturer is the source of many attacks (e.g., because the player implementation has inadequate security), publishers can create content that will not play (or will play at reduced quality) on such platforms.

A third category of attack involves compromising a particular piece of content or a group of titles containing similar interpreter security code. Such attacks could potentially be mounted by modifying the content itself to bypass security checks or by producing a malicious interpreter tailored to play the target title. Such attacks can be addressed by deploying different or better protection software in future content.

A fourth category of attack involves copying content from protected media to unprotected formats, then redistributing the content in the new format. No content protection system can completely prevent such attacks, but the techniques and systems disclosed herein provide for powerful, flexible watermarking capabilities that can be used to trace a compromise back to a particular device which can then be revoked to prevent future attacks. Because the number of users who actively upload content for piracy is relatively small, piracy can be reduced significantly by identifying and revoking these users' players. Imperceptible differences can be introduced in the decryption output by selectively skipping portions of the ciphertext. For example, in an exemplary embodiment, the content can watermark a "zero" bit by directing the player's decryption module to decrypt and output a first ciphertext portion then skip a second ciphertext portion. To watermark a "one" bit, the content can direct the module to skip the first ciphertext portion and output the second one. By encoding a series of such bits, the content can be watermarked with any data available to the interpreter code, including without limitation the identity of the player, results of cryptographic operations, user action descriptions, output device information, etc. If a pirated copy of the content is discovered, the watermarks can be analyzed to trace the illegal copy back to a single player, which can then be revoked in future content releases. This capability is also useful for law enforcement and forensic purposes, since it is possible to prove with certainty that a particular copy originated from a particular player. Features for tracing copies can also serve as a disincentive to piracy since people considering making illegal copies will be discouraged by the knowledge that they could be identified, caught, and prosecuted.

Of course, no consumer-friendly anti-piracy system can reliably prevent all possible attacks in all environments. For example, audio and video can be recorded from analog outputs. (Even if watermarks are embedded in content, recorders without watermark detectors are available.) Data captured from analog outputs can then be re-mastered onto new digital or analog media and redistributed without the original's security features. Similarly, copies made by professional pirates who have equipment required to make exact copies of media cannot be detected by the player, but the techniques and systems disclosed herein can help to prevent media cloning. For example, disc manufacturer identifiers on media can be checked by content to ensure that honest or careless duplicating facilities will not be duped by pirates. Media type identifiers can prevent content sold on read-only media from being redistributed on recordable media. For players with Internet, telephone/modem, or other network support, content can (for example) obtain authentication from a server prior to playback (or the first playback) to validate that the media is valid. Players with nonvolatile storage can even store a table of known-bad media serial numbers, which the content and/or player can query to determine whether the media has been revoked.

Querying and Controlling the Playback Environment

The content can be configured to decide whether it will allow itself to be decoded. To assist with this decision, the player can provide the content with information about the playback environment. Although very limited information (such as the user's requested action and the player model) may be adequate in many cases, more detailed and accurate information is desirable so that the content can make a more informed assessment as to whether playback should proceed. Although the specific information and capabilities provided to the content depend on the player implementation, the following describes (without limitation) some exemplary functions and capabilities that can be provided to content. Note that for players constructed out of multiple connected components (such as output ports, connected output devices, operating system device drivers, security modules, etc.), some or all of the following information may be provided for these connected devices as well as the main part of the player containing the interpreter.

Security Support Information: Security specification version, supported query functions, and/or security module form factor (replaceable hardware, embedded hardware, updateable firmware, ROM firmware, PC software, etc.), etc. (Exemplary cryptographic processing functions and playback control/decryption functions are discussed in detail below.)

Manufacturer Information: Name, identifier, web site, public key/certificate, manufacturing batch, manufacture date/time, region of manufacture, country of manufacture, manufacturer address, technical support contact information, and/or manufacturer warranty information, etc.

Device Information: Product line, serial number, model number, firmware/software versions, device public key/certificate identifiers, GPS location or other physical location/region, content supported Codec types, network/Internet support information, network addresses, device telephone number, IP address, watermark support, interpreter performance ratings, security certification ratings, device distributor(s), device retailer, device form factor, and/or security specifications, etc.

User Information: User name, geographical region, country, address, GPS location or other physical location/region/country/etc., user telephone number, IP address, e-mail address, web address, preferred language, tolerances for controversial material, preferred payment methods/accounts, payment limits, purchase history, and/or privacy preferences, etc.

Media Control: Query media format, recordable vs. nonrecordable, media serial number, recording device type, recording device owner, recording device serial number, recording device security information, and/or recording device watermark-checking capabilities, etc. Functions can also allow reading from media, writing to media, formatting media, testing media, and/or ejecting media, etc. Additional functions can provide access to cryptographic functions or other special capabilities supported by particular media formats.

Requested User Operation: For example, play, record, translate to new format, load to portable device, make first copy, make multiple copies, and/or simultaneous play/record, etc. The content can also be given the ability to initiate or modify requested operations.

Output Information: Information about output ports, output port configurations, output port security characteristics, connected devices, output data format, and/or output data quality/resolution, etc. If supported, content can directly query output devices, to obtain additional information about the device, and/or request cryptographic operations, etc. The player can also allow the content to modify these parameters, for example to specify reduced-quality output if security is poor.

Environment: Identities/hashes/versions of other running programs and device drivers on the platform; contents or hashes of memory; versions of installed attack detection modules; results of system scans for attacks, and/or status of tamper detectors, etc. These functions can also allow the content to modify memory, e.g. to correct security weaknesses in other programs.

Time: Date, time, time zone, elapsed clock cycle count, time since last reset, time since manufacture, time since last security upgrade, time since last battery change, and/or estimated battery life remaining, etc.

Connectivity: Determine player communication capabilities, check current connection status, establish network connections, establish modem connections, specify criticality of establishing network connections, check/specify connection security characteristics, transmit data, receive data, close connections, and/or idle connections, etc.

User Interface: Display user messages, display lyrics, display graphics images, print graphics images, display advertising/promotional messages, identify available user interface controls, obtain user input, play speech to the user using a player's speech synthesizer, and/or error reporting, etc.

Watermark Control: Select content regions to output, select external watermarking algorithms, control external watermark detectors, and/or check mark detector status, etc.

Other: Player/playback status information, pay-per-play billing control (e.g., player-based funding sources), error handling, playback termination, secure nonvolatile memory support (see below), apply player firmware update, and/or invoke external modules (such as dynamically linked libraries), etc.

Some standardization of functions and parameters is useful to ensure interoperability between implementations (e.g., so that content can function effectively in player environments designed after the content was originally published) and to simplify the task of authoring secure content. Standardization is particularly helpful for functions where a variety of different manufacturers' products should provide the same types of information or operations. For example, a function and response codes to allow the content to determine the player form factor (home audio/video, portable, automotive, personal computer software-only, personal computer software with hardware assistance, professional studio, movie theater, etc.) can be standardized. Standardization has the additional benefit of preventing manufacturers from trying to avoid security controls by reporting pertinent risk-related information in nonstandard formats that pre-existing content cannot understand.

Of course, the system may also be configured to allow for manufacturers to add additional proprietary functions for use by content producers who choose to use them. The ability to add new functions is particularly valuable for manufacturers who wish to add new features to their products, since they can add these features, then establish co-operative business relationships with content publishers to support the features. Such an embodiment can be extended easily while (if desired) maintaining backward compatibility.

Manufacturers are responsible for providing accurate information to the content. While the content generally cannot directly verify the accuracy of much of the information it receives, this is not strictly necessary where manufacturers have strong incentives to ensure that this information is correct. For example, publishers could prevent their future content from playing on products made by dishonest manufacturers.

Although it can be beneficial if players provide cryptographic authentication of information they provide to the content (e.g., by including digital signatures issued using certified player or manufacturer keys), such authentication is not mandatory for most data. For output devices (such as digital speakers requesting high-quality digital audio data) or other portions of the system that connect via potentially untrusted interfaces, cryptographic authentication is more important so that malicious devices that impersonate trustworthy devices can be detected and avoided.

Cryptographic Processing

In addition to providing information describing the playback environment, an exemplary player also implements cryptographic operations that can be invoked by the content. These operations can behave like cryptographic oracles, allowing the content to supply an input datum (for example, a 64-bit plaintext block) and returning the result of a cryptographic computation. In an exemplary embodiment, the inputs to the cryptographic computation include at least a key (whose value is normally unknown and inaccessible to the content) and the content-specified input datum.

The following are (without limitation) examples of cryptographic primitives that can be provided to the content for uses including (without limitation) authenticating the playback environment, deriving content decryption keys, etc.:

Block cipher oracles: The oracle encrypts (or decrypts) an input message using a secret key, producing a ciphertext (or plaintext) result.

Hash function oracles: The input message is hashed, typically with a secret key (for example using an algorithm such as HMAC-SHA), to produce the result.

Digital signature oracles: The input message is digitally signed using the secret (private) key to produce the result. The function can also provide the public key and its certificate(s) to the content.

Random number generators: Random number generators can provide the content with unpredictable information, for example to use in preventing replay attacks in on-line connections.

Mathematical functions: Basic mathematical operations can be provided to help the content optimize its computation processes. For example, optimized modular multiplication or exponentiation functions can be used by the content to perform the RSA algorithm of U.S. Pat. No. 4,405,829 to Rivest et al. to produce and verify digital signatures and to encrypt and decrypt messages.

Optimized cryptographic primitives: Optimized implementations of standard cryptographic algorithms can help improve performance. These operations can be used to help decrypt or hash blocks of data, including without limitation regions of the interpreter code space or sectors of content loaded from media.

Decryption control: If the content decides that playback is authorized, the interpreter code can initialize the content decryption module with the correct decryption key for each segment of content. In addition, the interpreter code can specify portions of the content that should be rendered or skipped (e.g., to allow real-time watermark insertion during playback). To ensure synchronization between the interpreter and content streaming from media, key changes (or skipped regions) can be specified in advance then triggered by signals in the content. For example, an exemplary embodiment could allow the content to specify a 64-bit value that triggers a key change when encountered in the ciphertext, the number of ciphertext bytes to skip following a key change, and the new key value to use.

Key management: These functions allow the content to determine which keys are known to the player.

In an exemplary embodiment for cryptographic oracles whose operations do not incorporate random parameters or other such variable data, the system can be configured so that expected result for a particular input can be computed in advance (e.g., when the content is mastered). The publisher can thus program the content to submit a chosen input to the oracle, then verify that the expected result is obtained. Malicious players that lack authorized cryptographic keys will be unable to compute the correct oracle response. Because the number of possible oracle inputs is enormous (e.g., $2^{128}$ for an oracle using a block cipher with a block size of 128 bits), it is not practically feasible for an attacker to precompute or store the results to all possible queries.

In addition to validating valid players, cryptographic oracles can also be used to identify invalid players. For example, if keys extracted from a legitimate player are being used for unauthorized purposes, content can be mastered so that it will refuse to play on players that contain the revoked oracles. Because content will not play without valid keys, unauthorized players must include stolen keys. However, by using these stolen keys, unauthorized devices reveal their status to new content that is aware of the compromise.

A wide variety of methods can be employed for incorporating oracle results or checking whether a particular oracle query response is valid. The simplest is to simply perform a comparison against an expected value. Because this can (at least in theory) be circumvented by a maliciously-designed interpreter that behaves as though all comparisons match, content can include "dummy" comparisons that are expected to fail or other such tests designed to thwart malicious interpreters. The oracle itself can also be used to decrypt code or influence self-modifying code. For example, the input to the oracle can be an encrypted version of the desired code. Depending on their configuration, such oracles thus allow content publishers to include on media code that can only be decrypted by authorized players or a subset of players, thereby helping to keep the content's code away from potential attackers. Another way to use oracles is to use their outputs as cryptographic keys or to derive keys. These keys can then, for example, be used to decrypt code, content, other keys, or any other data. This flexible decryption capability can be used to implement a wide variety of protocols and policies in content. For example, if players have an adequate assortment of keys, content can be programmed to use schemes such as the method of Fiat and Naor (see A. Fiat and M. Naor, "Broadcast Encryption," *Advances in Cryptology*, Douglas Stinson, editor, p. 480; Springer Verlag, 1993.). Even sophisticated access control systems, such as those described in U.S. Pat. No. 5,982,891 to Ginter et al. can be implemented if desired (provided, of course, that the player provides the necessary user interface, network, data storage, and cryptographic functions).

For mastering content, publishers may benefit from having access to oracle input/output pairs. In the case where the oracle uses a private key for an asymmetric cryptosystem such as RSA, the publisher simply obtains the public key and uses it to perform the inverse of the oracle operation. For a symmetric oracle constructed using block cipher, player manufacturers can compute for publishers inverses of the symmetric oracles provided in each player. For example, if the player oracle uses a block cipher to decrypt 256-bit data blocks under a secret key, the manufacturer can provide publishers with access to the corresponding encryption function. Because access to the inverse-oracle does not allow the oracle to be compromised, manufacturers could (for example) provide the inverse-oracle computation via a publicly-accessible web server using SSL. Manufacturers could also provide publishers with outputs from randomly-selected oracle inputs. (Although manufacturers could provide publishes with actual oracle functions as implemented in players, these functions could potentially be misused to construct unauthorized players that emulate of legitimate ones.)

The specific methods used to assign keys to players and manufacturers depends on the specific embodiment and security objectives. For example, in one exemplary embodiment, players are assigned a variety of symmetric cryptographic oracle keys, including (without limitation): player symmetric keys chosen (pseudo)randomly from a larger global pool of such keys; player-specific symmetric keys generated (pseudo)randomly by the manufacturer; symmetric keys unique to the manufacturer, player model, etc.; and/or symmetric keys authenticating that the player does not have particular characteristics (e.g., was not produced by particular manufacturers). In this exemplary embodiment, the content can identify which keys are implemented in the player by calling a separate function that returns a list of the supported keys. Players can also contain asymmetric keys. For example, in the exemplary embodiment, players have a player-specific public/private keypair; a player certificate issued by the manufacturer by signing the player public key using the manufacturer's private key; a certificate issued by a root key issuing authority validating the manufacturer's public key; a public key used to validate requests to access the player's secure memory areas (see below); and/or a public key used to validate player firmware updates.

In infrastructures involving multiple player manufacturers, it may be helpful to have one or more central administrative organizations manage keys for players, manufacturers, etc. Central administrators can also be helpful for enforcing minimum security standards, ensuring that players provide accurate information to content code, reserving keys for new manufacturers (so that that their products will be able to play old content), tracking compromised keys, performing cryptographic oracle operations for content publishers, etc.

Secure Memories and Counters

The memory available to content is typically volatile, providing content with a "clean" execution environment each time it is run. For some features, however, it is useful for content to be able to store data between playings and between titles. To satisfy this need, players can provide content with secure, nonvolatile storage for maintaining state between playings. Such storage can require additional security protections to ensure that only authorized interpreted code is able to read or modify the nonvolatile memory contents. Ensuring the security of nonvolatile memory is important for publishers so that, for example, this memory can be trusted to track offline pay-per-view viewing histories for later billing. It is not adequate to simply have a key on the media for unlocking each memory slot, since this key would soon be discovered by pirates, compromising the memory slots of all players. Thus, one embodiment provides for explicit cryptographic authentication of the code that accesses these secure nonvolatile memory regions.

In this embodiment, players contain several blocks of nonvolatile memory, which are locked (i.e., read and write permissions are denied) by default. The player also contains a public key used to authenticate requests to unlock memory blocks. To gain access to this memory block, the content calls a function that takes as input a digital signature over the block of code that is authorized to access the memory. This signature is verifiable using the public key embedded in the player and specifies the memory block to unlock and the access privileges authorized (arbitrary read, arbitrary write, increment, decrement, zeroize, etc.) within each portion of the block. The interpreter verifies the digital signature and, if the signature is valid, unlocks the memory and executes the digitally-signed code. The following shows an example of this process for use in billing for off-line pay-per-use content with occasional (e.g., monthly) auditing:

(a) Publisher X negotiates with player manufacturer Y rights to control a 4-byte counter in the nonvolatile memory of manufacturer Y's players.

(b) Publisher X writes a function for the interpreter that checks the memory contents. If the value is below a spending limit, the function increments the counter. Otherwise, the function establishes an Internet connection with the publisher, transmits a payment request including the counter value, a random number, and payment information (such as a credit card number or other funding source stored in the player). If the publisher accepts payment for the past purchases indicated by the counter plus the current purchase, the publisher transmits to the player a cryptographic authorization to clear the counter, which the player verifies and (if valid) zeroes the counter. The player concludes by relocking the memory and returning a code indicating success or failure.

(c) Manufacturer Y digitally signs the memory-update code with parameters identifying Publisher X's memory regions, access privileges, etc.

(d) Publisher X produces content including the signed code and distributes it to a user.

(e) The user's player begins loading the content, which presents the user with a purchase option. If the user declines to purchase, playback does not proceed.

(f) The content calls the memory unlock function with pointers to the code written at step (b), and the digital signature produced at step (c).

(g) The memory unlock function attempts to perform the purchase as described in step (b) and reports success or failure.

(h) If the purchase was successful, the content plays for the user. Otherwise, playback terminates.

Of course, much more sophisticated purchase mechanisms can be employed using the secure counter mechanism described above. The only real limits on what can be implemented in the content come from the player's capabilities and the publisher's creativity.

Various storage technologies can be employed with the systems and techniques disclosed herein, including without limitation, flash memory, magnetic storage (e.g., hard disks), battery-backed RAM, etc. (A wide variety of methods are known in the background art for providing nonvolatile storage and for encrypting or otherwise securing such storage.) Secure storage can (without limitation) be located outside of the player, including without limitation in a removable module (such as a smart card), in attached output peripherals (such as speakers, displays, remote devices in a home network, etc.), remotely over a computer network, etc. Memory block assignment can be provided, for example, on a space-available basis, guaranteed (e.g., by slot number), or allocated/recycled based on priority. Because the clearing or freeing of memory slots could result in the loss of unreported pay-per-view records, content can be given the ability to specify the conditions under which slots can be over-written. For players that can play multiple titles simultaneously but that have only one set nonvolatile memory slots, a locking mechanism may be required to ensure that one piece of content will access a slot that is being modified by another piece of content.

In one embodiment, a pre-paid smart card is purchased by a consumer and inserted into a slot on the player. The card contains a plurality of write-once memory slots into which the player can write identifiers corresponding to pay-per-view content titles. Once written, the content identifiers are incorporated into cryptographic oracle computations implemented in the card. Thus, content can verify that a purchase has been consummated by verifying that the correct oracle is present before allowing playback.

Note that the general approach described above for authenticating calls to player functions is not limited to use with secure counters. For example, the same approach can be used to secure access to special player features only available to authorized publishers. The approach also has applicability separate from other aspects of the techniques and systems disclosed herein, as it provides a general-purpose but extremely flexible method for securing access to computation functions.

Cryptographic vs. Language Based Security Features

Security policies can be enforced in several different ways. Cryptographic protections allow the construction of content such that revoked or unauthorized players will lack the cryptographic keys necessary to decrypt the content. Unauthorized players cannot access content which they lack keys (provided, of course, that good ciphers are used). This approach is relatively inflexible since it provides the content owner with only the ability to block playback on a particular device. (While a more sophisticated embodiment could use different key sets to offer somewhat more detailed control, key-based controls lack the flexibility required to solve more complex access control challenges.) Nevertheless, it is extremely effective at addressing the case where a particular player is compromised or otherwise deemed untrustworthy to have the ability to decrypt the content.

In contrast, language-based controls are less effective in the case where a player is compromised (or totally untrusted for some other reason), but can enforce extremely sophisticated security policies. As noted previously, the content can analyze the playback environment and call to cryptographic oracles and, if the results are deemed unsatisfactory, refuse to play. This approach provides virtually unlimited flexibility, making it ideally suited to managing risks involved in playback on players that generally behave honestly but may support operations (such as ripping to unprotected formats) that some publishers may wish to prevent on certain content. Although attackers could, at least in theory, analyze and break individual pieces of content particularly if the content's code is poorly-written), these attacks cannot be generalized and can be reliably addressed through careful use of the cryptographic oracles. Furthermore, the decryption control capabilities described herein enable publishers who observe pirated copies of their content to identify the compromised device and produce new content that it is not vulnerable.

Evolution

It is desirable to provide content owners with a distribution infrastructure that remains secure over the long term. Previous content protection systems have failed terribly in this regard; while implementers may initially be diligent about security as they woo content owners to a new format, security levels tend to fall significantly once a format's success is ensured. A variety of factors contribute to this decline, including: availability of more implementations to attack (increasing the likelihood that an easily-broken product will be sold), increased demand for piracy as more protected content becomes available, and increased sophistication of attackers. Exemplary embodiments of the systems and techniques disclosed herein can be configured to allow content owners to continue to specify how their content will be protected even after a media format has been standardized, while allowing virtually unlimited renewability so that security is not lost forever if an attack is found.

If security policies are not static, manufacturers have an ongoing long-term incentive to provide effective security. For example, content owners can have the ability to block playback (or prevent high-quality playback) on devices whose keys are compromised or on products that are commonly used for piracy. As a result, unlike traditional systems, product manufacturers cannot sacrifice security as they compete to offer their products at the lowest possible price, since consumers will also seek out products that have robust security because these will offer the best and most reliable playback experience.

Even a well-intentioned manufacturer may accidentally produce a product that is later found to have security flaws. Accordingly, we disclose a variety of methods that can be used to respond to compromises and security weaknesses. For example, player cryptographic keys and software can be updated using digitally-signed code or key updates. These updates can be delivered to the player on media containing software that performs the key update. For example, if a legitimate user's player ends up being revoked because a previous owner compromised its security, the new owner can call the product's technical support line and obtain new keys. (Of course, the customer service personnel may wish to obtain some user information such as name, address, credit card number, telephone number, e-mail address, IP address, etc. to discourage pirates from calling to request new keys for unauthorized purposes.) Updates can also be distributed via the Internet (or other network connections), modem calls, entry via the remote control or keyboard, etc. Of course, updates should be cryptographically secured whenever possible so that attackers cannot use the update process to inject compromised keys or otherwise attack a player.

Another way that manufacturers can reduce the consequences of a compromise is to include a removable security module, such as a smart card. The smart card would implement some or all of the cryptographic oracles as well as other security-related functions provided to the content. If a compromise does occur or if a security flaws is found, it is possible to replace the smart card instead of replacing or upgrading the entire player. Note that it may be sufficient to simply provide a smart card slot, but not deploy smart cards until such time as it becomes necessary for security reasons. To prevent smart cards from being removed from legitimate players and used in malicious ones, the smart card can be cryptographically linked to the receiver (e.g., by having them share a symmetric key) before the player and/or card are sent to the consumer.

Mastering & DRMs

Any new costs involved in mastering content are a legitimate concern for content owners. The techniques and systems disclosed herein can be deployed so as to avoid significant new costs to the mastering process, if simple security measures are employed. While developing content that enforces complex security policies obviously requires more development and testing effort, this expenditure is entirely optional. (Other protection systems simply eliminate this choice, forcing all content publishers to use the same security systems, policies, etc.)

Of course, publishers do not need to develop security systems themselves since the systems and techniques disclosed herein also permit third party DRM vendors to provide security modules and mastering systems. These vendors would compete for publishers' business by offering the best features, best security, lowest cost, greatest flexibility, best ease of use, best performance, smallest code size, most extensive revocation lists, etc. The techniques and systems disclosed herein can serve as a platform where content owners have the ability to make their own decisions about security.

Watermarking & Compromise Tracing

With most conventional watermarking methods, the mark detection process is standardized and implemented in a large number of widely deployed products. This static algorithm unfortunately poses a serious risk, since knowledge of the detection algorithm generally allows attackers to remove the watermark without seriously degrading the content. In an exemplary embodiment, the systems and techniques disclosed herein may include on-the-fly watermark insertion that is not susceptible to a general mark removal attack because the mark format, encoding process, and detection process are all chosen by the publisher.

In one exemplary embodiment, a publisher (or, more precisely, a control program written by the publisher) wishes to embed some information in some output content. Each bit of this information can be encoded by decrypting and outputting either a first content portion or a second portion. These portions can be different encrypted regions on the media and can be encrypted with different keys. The differences between these portions can be chosen by the publisher when the content is mastered, and can be anything from imperceptibly-subtle variations to total dissimilarity. Because there is no predetermined relationship between the two portions, there is no way for a pirate who knows only one portion (including the decryption key for that portion) to determine the other.

Because cryptographic and program-based controls can be used to select which regions are decrypted, attackers cannot determine what the alternate region(s) contain. Indeed, content can be designed so that attackers cannot even identify whether alternate regions are present, for example by encrypting the control code (so that different players use different code) and by including dummy regions that no players or only a very small number of players can decrypt.

In one exemplary embodiment, content is authored so that only a subset of all players have the keys necessary to decrypt each version of a region of the content, yet substantially all players have the keys necessary to decrypt at least one version of the region. Thus, by analyzing an unauthorized copy of this region, the publisher can determine information about the attacker. Note that this is true even in the case where attackers manage to analyze a (vulnerable) program and decrypt more than one alternate region, since the resulting combination of several regions still reveals to the publisher which versions were decrypted. Ultimately, the only way reliable way that users can avoid revealing their identity (or their player's identity) to publishers' anti-piracy enforcement experts is to refrain from participating in piracy in the first place.

This general marking approach is different from conventional watermarking because the mark detection process need not be standardized. This difference allows vastly greater security; indeed, it can be shown that there is no general attack against this marking scheme. Furthermore, because the watermarked bits produce differences in the output, these watermarks can be extremely robust and can be designed survive digital/analog conversions, editing, format conversions, malicious attacks, etc.

The decision of how to configure and use the content marking capability is typically made by the publisher. Some artists may wish to avoid to any technology that could make any modification, however small, precluding the use of the watermarking feature on their work. In other cases, certain types of content are pirated widely and are good candidates for very aggressive use of marking capabilities. While portions would normally be chosen to have only imperceptible differences, the choice of what alternate versions to encode, how to select between possible output versions, and the management of the decryption keys for these portions is controlled by the content. Because the marking capability is controlled by data processing instructions integrated with the content, the technology can be used for other features including, without limitation, implementing a sweepstakes where winners' players output a congratulatory message, delivering of security alerts to users whose players offer inadequate security, and providing bonus content to certain users.

Of course, other watermarking schemes can also be used with the techniques and systems disclosed herein. For example, traditional watermarks (for which the mark detection algorithm is standardized) can be embedded in output as well, either by the content's code or by external watermark embedding circuitry (which may or may not be under the control of the content). Similarly, watermarks in incoming content can be sensed (again, either by the content's code or by external detectors), for example to detect attempts to make unauthorized copies or introduce unauthorized content. The choice of what watermarks to embed and how to respond to detected watermarks can be implemented in the player and/or in the content.

Example Migration Path: CD-Audio

The vast majority of digital content is distributed today in unprotected or minimally-protected formats. For example, the CD audio standards contain no anti-copying features, and the protection scheme in DVD video has been widely broken. Because legacy media players do not support adequate security, they need to be upgraded or replaced. The success of a new security system depends on establishing a critical mass of compatible players.

By combining the techniques and systems disclosed herein with existing methods for producing copy protected CDs, it is possible to produce CDs that are backward compatible. Such CDs would utilize non-standard CD formatting to produce discs that play correctly on most audio CD players but confuse computer-based ripping software. Authorized (e.g., licensed) personal computer software can also play the disc by correcting the portions that are read incorrectly or otherwise confuse the computer. Thus, playback is enabled on (most) legacy audio players because they can play the non-standard (copy protected) Red Book audio portion, and playback is enabled on personal computers that have appropriate player software (which can, for example, be included on the CD or can be downloaded over the Internet). Although long-term support for backward-compatibility with existing CD audio players can introduce additional security risks, it can be beneficial as part of a longer-term strategy to encourage the deployment of audio players that can play the new secure format so that (eventually) content can be sold in only the secure format.

Example: High-Definition DVD

The copy protection system employed by current DVD video players has been widely broken. Because millions of DVD players have already been sold and are not upgradeable to new protection systems, there is no straightforward way to upgrade the current DVD format without abandoning support for these legacy users. Fortunately, the installed base of DVD players are only designed to support "standard" definition television (e.g., 525-lines for NTSC, 625 lines for PAL, etc.), but not the much higher-quality signals provided by high-definition television (HDTV) formats. Because legacy players do not support HDTV, the new security features disclosed herein can be incorporated on DVDs that support HDTV.

In one exemplary embodiment, the player would have a user-accessible media input (consisting of a mechanized tray for one or more discs), which loads the media to a spindle where it is rotated and read using a laser. The data read from the media are brought to a microprocessor-based circuit, which analyzes the disc encoding to determine the capacity of the disc, formatting type, and security method. If the disc is a legacy (low-resolution) DVD using the legacy security scheme (CSS), then the disc is played using methods known in the background art. If the disc is a high-density DVD using programmable security methods as disclosed herein, then program code (data processing instructions) for the content's security policies are loaded from the disc and executed by the player. Players can optionally also support low-density DVDs using the improved security, as well as high-density DVDs using legacy protection methods (although using a widely-broken security scheme for new content generally provides little benefit). The quality of the output from the DVD player can be controlled by the content. For example, the content can elect to output lower-resolution output if the player and/or HDTV output device do not provide adequate security. In this case, the content can (for example and without limitation) direct the player to down-convert HDTV signals to lower resolution (for example, using a degradation module specifically designed for this purpose), supply the player with only the keys required to decrypt lower-resolution portions of the signal (and withhold keys required for the higher-resolution portions), or direct the player to output a low-resolution version of the content that is encoded on the media separately from the higher-resolution version.

Interpreter Architecture

In one exemplary embodiment, the interpreted language is based on the DLX assembly language. The basic DLX processor architecture is well known in the background art (e.g., see *Computer Architecture: A Quantitative Approach* by Hennessy et al., Second Edition). Code executing within the interpreter's memory space (which, in one exemplary embodiment, consists of 8 megabytes of RAM) is sandboxed such that it can only access this memory and the processor's register set. Invalid instructions (or other operations) may be treated as NOPs (i.e., do nothing) or may trigger an exception. Similarly, out-of-bounds memory accesses may trigger an exception or may be corrected (e.g., in the case of a 32-bit read from an 8 megabyte address space, by ANDing the address with hexadecimal 0x007FFFFC to wrap out-of-bounds accesses around to the beginning of memory and to ensure 32-bit alignment).

The DLX "trap" instruction is used to provide access to external procedure calls. The "trap" instruction invokes operations in the player that may extend outside the sandbox (i.e., beyond the registers and memory accessible to normal instructions). For descriptions of such operations, see the section "Querying and Controlling the Playback Environment".

It is also possible for a dedicated hardware embodiment to use an ASIC or FPGA (or other hardware) implementation of the DLX processor instead of a software-based interpreter/emulator, in which case the "trap" instruction may (for example) be configured to trigger the processor to enter a higher privilege level, expand its address space to include a ROM or EEPROM area (e.g., by enabling an additional address line), store the return program counter, and jump to a predetermined address in the expanded address space for further processing. The higher privilege level may also enable additional instructions or capabilities in the processor core, such as the ability to interact with external peripherals (e.g., nonvolatile memory, cryptographic accelerators, key management components, optical media drives, data networks, satellite receivers, etc.) Memory protection capabilities in hardware implementations can include limiting the number of address lines (thereby preventing out-of-bounds accesses), or using other memory protection methods known in the background art. Upon completion of the "trap" call, the processor would reduce the privilege level and continue execution of the content code.

In an exemplary DLX implementation for decrypting video distributed on high-density optical discs, a "trap" operation is provided to allow the content to read data from the disc. To load data from physical media, the content code typically specifies an address (e.g., a sector number on an optical disc), the destination address for the data in DLX memory space, the amount of data to load, and optionally decoding parameters (such as error correction polynomials/parameters, decoding keys, etc.). The content may perform any manner of processing steps using the data, even including executing the data as code. Because optical drives, hard drives, and other data sources often have considerable latency (especially when performing operations such as seeking to a new track), separate "trap" operations may be used to pre-specify regions that are expected to be needed, to request data, to check the status of pending requests, and/or to actually load data into the DLX memory space.

The content code can also invoke trap operations for performing high-speed cryptographic operations on memory. For example, an exemplary bulk decryption "trap" operation utilizes the AES encryption algorithm and allows the content to specify (a) an index selecting from among the secret keys stored within (or accessible to) the player, (b) an encrypted key, (c) an address in the DLX memory space for the data to decrypt, and (d) the length of the data to decrypt. The trap (a) uses the key identified by the index value to decrypt the encrypted key received from the content, and (b) uses the decrypted key with the AES algorithm in ECB mode to decrypt the specified number of data blocks at the address indicated. The key-decrypting-keys that may be selected by the index may include keys stored in the player (including without limitation player-specific keys, manufacturer keys, group keys, media keys, etc. which may optionally be stored in internal tamper-resistant chips with cryptographic capabilities and internal nonvolatile memory), keys stored in external devices (including without limitation cryptographic modules, disc drives, remote network-accessible devices/servers, displays, speakers, etc.). To determine what keys are available, the content code may analyze information such as the player's type, the player's serial number, key lists/descriptions included with the player (and optionally digitally-signed by the player manufacturer or a trusted party), data obtained over a network, and any other available data about the player or playback environment (see the section "Querying and Controlling the Playback Environment"). Any manner of other cryptographic capabilities may also be provided by the content to the player, including without limitation: encryption, decryption, symmetric algorithms (stream ciphers, block ciphers, hashing algorithms, message authentication codes, etc. with any modes of operation), public key algorithms (signing, verification, encryption, decryption, key agreement, zero knowledge operations, etc.), key and certificate management, etc.

The content code may perform additional processing (or preprocessing) operations on the decryption result. For example, an XOR operation might be performed to convert an ECB decryption result into a CBC decryption result. Descrambling steps may be applied to prevent adversaries from using keys extracted from players to decrypt content without executing its interpreted code. Examples of steps that may be applied include, without limitation, toggling bits, making changes using simple binary operations, reordering blocks, fixing up or inserting offsets/addresses (e.g., to assemble a data stream that is complaint with MPEG-2 or other video compression standards), applying public key operations (such as modular squaring or cubing modulo a composite number), applying symmetric cryptographic operations, and updating internal checksums. Post-processing steps can also be used to introduce or modify forensic watermarks, e.g. to allow copies to be traced to a specific device. Decoded/processed data may also be executed using the interpreter, allowing portions of the decryption/playback code itself to be distributed in encrypted form and enabling content to utilize a wide variety of code hiding and obfuscation techniques, such as the use of self-modifying code. It is even possible to construct multi-functional data, e.g. data that performs a useful task when executed but also represents valid compressed video.

When the processing is complete and data is ready to be output, the content code can invoke additional procedure calls (e.g., DLX "trap" operations) in the player for outputting data to the user. Such calls may, for example, transfer data to one or more video decoders (e.g., an MPEG-2 decoder), audio decoders (e.g., an MP3 or AC-3 decoder), or graphics overlay systems (e.g., with transparency/overlay capabilities and supporting still images and/or animation engines such as GL, ShockWave, or Flash). The data would be transformed (e.g., decompressed) if appropriate, then presented. Presentation may include transferring the data to one or more physically-separate device, such as audio speakers or video displays.

Embodiments with decryption and decompression/output as separate API calls have the advantage that they allow greater control by the content, but have the potential disadvantage of increasing the number of times that the content needs to be read from and written to memory. In practice, however, random access memory is usually sufficiently fast that the additional latency is manageable even for very high bit-rate content such as theater-quality high-definition video. On high speed implementations, player codecs may be unnecessary, as decompression may be implemented in interpreted code. Players can also provide single-instruction, multiple-data parallel processing capabilities (e.g., by offering single-instruction-multiple-data mathematical operations accessible via procedure calls, roughly similar to the MMX, SSE, and SSE2 instructions found on x86 processors) to improve the performance of codecs, graphics processing operations, etc. implemented using interpreted code.

A variety of interpreter implementations strategies are possible. In one embodiment, an interpreter is implemented in software that runs on a normal microprocessor. In another embodiment, an interpreter is implemented using reconfigurable logic, such as a field programmable gate array. In another embodiment, a dedicated hardware device performs the role of the interpreter. In all three cases, procedure calls may be implemented (without limitation) using any combination of native software, hardware acceleration, and calls to external devices or components.

Native Code

In addition to interpreting player-independent, sandboxed code, the player may also allow the content to submit native code for execution and/or storage. Prior to accepting software or logic that may have access to keys or other privileged resources, the player validates the code. Validation may, for example, be performed by making sure that the code includes a valid RSA digital signature issued by the player manufacturer or another trustworthy party. Successfully-validated native code may be stored in volatile memory for execution by the currently-loaded content, or it may be stored in the player's nonvolatile memory where it can be available to other titles. For example, to avoid possible negative effects on other titles, a patch to correct a cosmetic quirk in the player or to provide a performance optimization might be stored in volatile memory for use only by the currently-loaded title. In contrast, an upgrade to correct a security vulnerability would typically be stored permanently in the player's nonvolatile memory.

Native code is normally specific to a single player platform or player application, making it less portable than interpreted code. Its advantage is that it can be used if needs arise that cannot be addressed using interpreted code. For example, native code can be employed by content as a way to distinguish between legitimate players and unauthorized emulators or "clones", avoiding the need to revoke every potentially-affected device each time attackers find a major security vulnerability in a product's design. As a defense against such attacks, product vendors can include built-in native-code capabilities or interpreter operations that would be difficult to emulate or reverse engineer. Note that capabilities designed to help detect or respond to player-specific attacks can be vendor-proprietary and/or player-specific, since they would only be activated in response to a player-specific issue. Specific measures could include, without limitation, simple undocumented features, timing-sensitive routines, operations that are explicitly designed to be difficult to reverse engineer or emulate at full speed in software (e.g., see the Pseudoasymmetric Function of U.S. Pat. No. 6,289,455 to Kocher et al. which is hereby incorporated by reference in its entirety), and full cryptographic oracles (symmetric or asymmetric). In the case of a device where the interpreter is implemented in dedicated hardware, the "native" code and the interpreted code may be similar or identical (though they may operate with different privileges, in which case players could limit execution at the higher privilege level to specially-authenticated code).

In an exemplary embodiment of content employing native code, the media includes an initial boot portion consisting of interpreted code which, when interpreted, loads additional interpretable code. The content code (e.g., the code loaded by the boot portion) would then issue procedure calls to the player and analyze the results to determine information about the playback environment, including the player type. The content may also verify the playback environment, e.g. by requiring that the player (or other components) perform cryptographic operations using keys specific to (or characteristic of) reported playback environment characteristics. To deter malicious interpreters from tampering with the validation results, the result of such operations may be used in subsequent decoding and playback processes. (For example, by incorporating cryptographic results from the player in decryption key computations, content can robustly prevent playback on malicious players that claim a particular player type or playback environment attribute but lack the corresponding cryptographic keys. Results can also be compared with expected values, verified using public key schemes, etc.) The content then determines whether the player is of a type that, by default, includes a security defect (or other problem) that needs correcting. In making this determination, the content code may analyze information from within the player (e.g., data in nonvolatile memory accessible to the content, date/time information from a clock in the player, etc.) and/or information obtained externally (e.g., by querying attached devices or communicating over a network). If a problem is identified, a corresponding countermeasure is obtained (e.g., from the media or over a data network such as the Internet). Depending on the nature of the issue, the countermeasure may involve interpreted code and/or native code. In the case where a native code countermeasure is necessary, the content can submit the countermeasure code as digitally-signed data to the player, including instructions indicating whether the code should be buffered in volatile memory for future use (e.g., through a procedure call), stored permanently (e.g., to correct a bug in existing nonvolatile memory), and/or executed immediately. The native code can also be configured to perform an identifiable operation (such as a cryptographic computation that can be integrated with content decryption processes) so that content code can be assured that the native code was actually executed by the player. Native code can also be configured to disable malicious players, e.g. by overwriting cryptographic keys. The content may also query, analyze, and deliver code and code updates (native or interpreted) to other devices, such as displays or speakers connected via digital interfaces. Once the playback environment is acceptable, the content code then proceeds with playback as requested by the user, for example by loading chunks of data from the media, performing decryption operations while inserting forensic watermarks, and delivering the decrypted data for decompression and output.

Standardization and Performance Considerations

It is often necessary to have standards that define the playback environment in sufficient detail that makers of compliant players can be confident that their products will be able to play compliant content (subject to security policies, etc.). Such standards would typically specify the interpreter's basic instruction set (or equivalent) and required procedure calls. It may also be necessary to define performance requirements for any instructions and procedure calls that may be included in real-time portions of the decoding process. (Performance requirements are generally less critical for operations that are only performed during start-up, shut-down, and other non-real-time operations.)

For example, an exemplary specification might require that compliant interpreters be able to execute a minimum of 8 million "time units" (TUs) per second, where normal low-level interpreter operations may each take up to one TU and multiplication and division operations may take 4 TUs each. Performance requirements for calls to player-supplied procedures (e.g., DLX "traps") depend on the operation requested. For example, AES encryption operations may take up to 100 TUs plus 12 TUs per block cipher computation. Word-aligned memory copies may take up to 50 TUs plus 1 TU per 16 bytes (or fraction thereof). Buffering a media read request, or checking the completion status of a buffered request, can take up to 100 TUs. Read requests are performed one at a time in the order submitted but in parallel with other processing, and may take up to 10,000 TUs plus 1500 TUs per 2048-byte sector. Non-sequential reads may take an additional (20000+ 640000* seek_distance_in_sectors/max_sectors_per_media) TUs for seek overhead. Loading data from a completed read (i.e., transferring data from the drive's buffer into the interpreter's memory space) can take up to 100 TUs plus 128 TUs per 2048-byte sector transferred. Transferring data to codecs or other outputs can take up to 100 TUs plus 1 TU per 16 bytes (of fraction thereof) transferred. Of course, these timing values are provided for exemplary purposes; the specific performance metrics would depend on the system's requirements. More complex performance mandates (e.g., that specify total computation times for instruction sequences) may also be specified to provide player implementers with greater flexibility or to provide content authors with better performance guarantees.

In practice, many implementations would operate considerably faster than the performance minimums. This simply means that the data will be ready before it is required. For example, a software-based interpreter that takes 40 clock cycles per regular interpreted instruction would perform about 50 million TUs/second on a 2 GHz microprocessor. Similarly, a dedicated hardware implementation running at 25 MHz and running at 2 clock cycles per instruction would also perform significantly more than 8 million TUs per second.

Note that standards developers face a trade-off between simplicity of the system and the performance. In particular, for software-based implementations, operations performed in procedure calls can generally be assumed to operate significantly faster than the same operations in interpreted code. On the other hand, these operations must typically be defined in advance and also typically include entry/exit overhead in their performance assumptions. Nevertheless, procedure calls for common operations such as memory copying, searching, large-number arithmetic, and cryptographic computations can provide a significant performance benefit. An alternative performance-enhancing approach is for the interpreter to analyze the content code before or during execution to identify regions that can be optimized (e.g., converted into native code). The content code can also include "hints" to notify the interpreter of regions that are suitable candidates for optimization. The "hint" approach has the benefit that hardware implementations (which tend to be fast, but have difficulty performing complex operations) can ignore the hint (e.g., by treating it as a NOP) and process the subsequent code normally. Software implementations (which tend to be slower, but have higher-speed native code capabilities) can use the hint to substitute interpreted code with functionally-compatible native code routines. If desired, performance standards can specify player performance requirements for common constructions. Players can also allow content to select between interpreter modes that are always guaranteed to meet performance minimums (e.g., for real-time tasks) and modes with better average-case performance (e.g., for non-real-time tasks).

When authoring content, content developers need to verify that the software they have written meets the performance minimums specified by the standard. A specialized test system for verifying timing compliance tabulates the worst-case performance characteristics of content code as it executes. It operates by emulating the playback process, while tabulating the maximum allowable time a player could take for each suboperation performed. If the playback process is too slow (e.g., if the measured worst-case player performance lags behind timestamps in the data being supplied to the codec or if the codec could become "starved" of data), the tool can notify the media author, who can then correct the problem. Authoring tools may employ the same approach to ensure that their output will play reliably.

Securing Nonvolatile Memory

As described previously, a player device can provide content with nonvolatile (NV) storage capabilities for use by the content. Because the number of entities authoring content may be large (possibly including small artists, students, home users, etc. as well as major studios), it may be advantageous for content and players to enforce limitations on NV storage use under the assumption that some content may be written poorly or even maliciously. As a result, players may wish to limit the ability of each title to reserve NV memory and to read, modify, and over-write stored data. The section entitled "Secure Memories and Counters" describes using digital signatures to validate code that accesses nonvolatile memory. In some situations, however, it may be desirable (e.g., for political and/or technical reasons) for the nonvolatile memory security to operate without a centralized certification authority while still allowing content titles to allocate and/or control nonvolatile memory regions.

Figure 4:
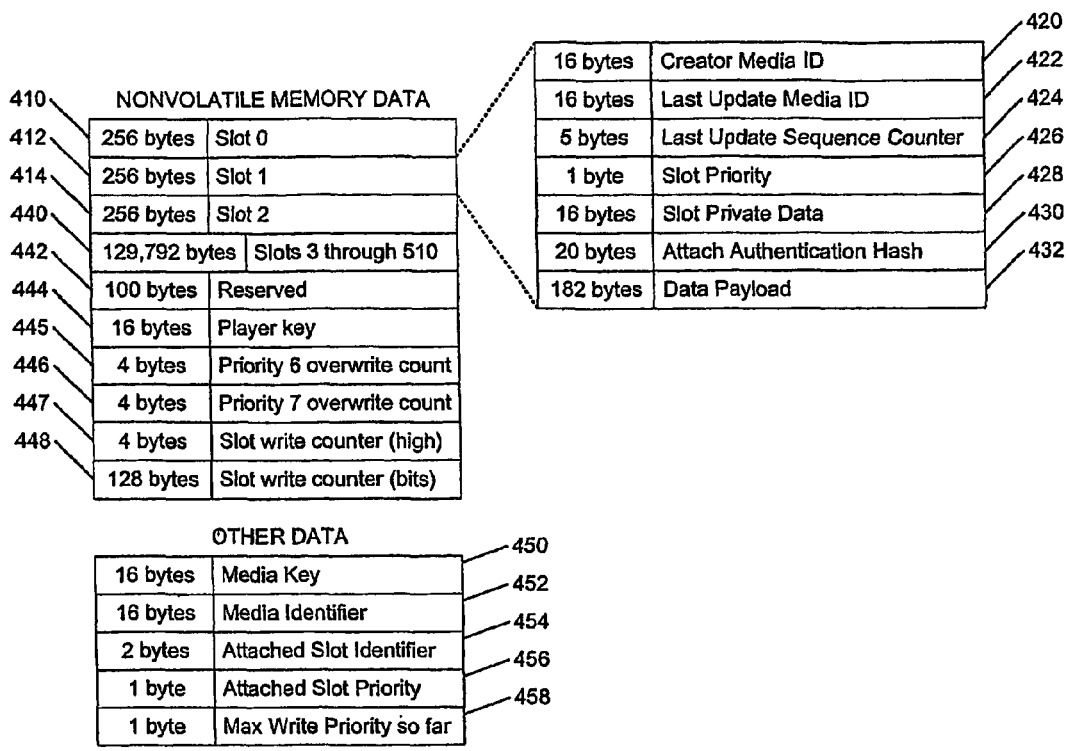
FIG. 4 illustrates an exemplary embodiment of player method for securing access to a nonvolatile memory without requiring a centralized code signing authority.

The following section describes an exemplary embodiment of a player that provides content with secure access to a nonvolatile memory without requiring a centralized signing authority. Referring to FIG. 4, the exemplary memory manager controls access to 128 kilobytes of flash memory, which is divided into 511 slots of 256 bytes each and 256 bytes for additional data. Slot 0 [410], slot 1 [412], slot 2 [414], and each slot thereafter 440 contains: a 128-bit creator media ID 420 identifying the media ID of the title that originally allocated the slot; a 128-bit last update media ID 422 identifying the media ID of the title that most recently modified the slot, a 40-bit last update sequence counter 424 identifying when the slot was most recently updated; an 8-bit slot priority value 426 indicating the slot's rank if a slot needs to be overwritten; 16 bytes of private data 428 that is only accessible by authorized code; a 160-bit hash 430 of the code that is authorized to access the slot; and the main slot payload data 432. When a player is initialized at the factory, these values may be all initialized to zero to indicate that the slot is empty.

The final 256 bytes of the 128 kilobyte nonvolatile memory is used to store values including: a secret player key 444; a counter containing the number of priority 6 slots that have been overwritten 445; a counter containing the number of priority 7 slots that have been overwritten 446; and a slot write counter stored as a high portion 447 and a low portion 448. Because the slot write counter is updated frequently and some nonvolatile memory technologies wear out after too many write cycles, this counter is stored in a form that limits the number of times that any particular memory cell is updated. The counter is incremented by setting a bit in the low portion 448 unless 1023 of the 1024 bits in the low portion are full, in which case high portion 449 is incremented and all 1024 bits of low portion 448 are cleared. The counter value is read by multiplying high portion 447 by 1024 then adding the number of bits set in low portion 449. When a player is initialized at the factory, these values may be all initialized to zero, except that the player key should be initialized with a secret (pseudo) random value.

The player also maintains several values which may be stored in volatile memory (e.g., conventional RAM). These include media key 450, media identifier 452, a value indicating which slot (i.e., number 0 through 510) is currently attached 456, and a value indicating the highest priority slot in the NV memory written so far by the current title. When a title is initialized (e.g., when media is inserted or the player is reset), attached slot identifier 454, attached slot priority 456, and max create priority 458 are reset. Media key 450 is preferably loaded from a portion of the media that is not writable with consumer-recordable devices on consumer-recordable media. Media identifier 452 is then derived from the media key by applying a one-way cryptographic transformation, such as the secure hash algorithm (SHA-1), which is well known in the background art. To provide additional assurance, the media may carry a cryptographic signature authenticating media key 450 and/or media identifier 452, which can then be authenticated by the player and/or content code. Alternate embodiments may include other values (such as the identity of the facility that manufactured or pressed the media and/or identifiers specific to particular piece of media instead) and do not necessarily have to have a fixed relationship between identifiers and keys.

In general, content code can be allowed largely unfettered read access to nonvolatile memory contents, excluding the private data 428 of each slot. This read access may be implemented using procedure call (e.g., a DLX "trap" operation) that allows the content to specify a slot number and retrieve the contents. If the requested slot is not currently attached (i.e., identified by attached slot identifier 454), the slot private data 428 is not returned (e.g., zeroes are returned for these locations).

In the exemplary embodiment, content is provided with the following basic operations for reading from, requesting access ("attaching") to, and modifying nonvolatile memory slots:

SlotRead: This procedure call reads the contents of a specified slot into the memory space accessible by the content code. This procedure's input parameters include a slot number and a pointer within the content's memory where the results should be stored. The entire slot contents are returned except for private data field 428, which is normally zeroed in the read results. If specified slot number is (−1), the slot identified by attached slot identifier 454 is read and the complete contents (including private data 428) are retrieved and stored. The operation's return value is an integer containing either the slot number that was read (e.g., attached slot identifier 454 if slot (−1) was specified) or an error code indicating why the request failed.

SlotAttach: This procedure call is used to request privileged access to a specified slot. Prior to granting such access, the code making the request is authenticated. The procedure's input parameters identify the slot number, the code length, and a requested priority level. The procedure determines the starting address of the code to be granted access (e.g., the address in the content's memory following the instruction invoking the SlotAttach operation). Using the address and the specified length, the procedure then computes a cryptographic hash (e.g., using SHA-1) of the code. If the hash result does not match the value of the authorization hash 430 stored in the slot or if the requested priority is determined to be invalid (e.g., as described below with respect to FIG. 5), then slot zero is attached (i.e., attached slot identifier 454 and attached slot priority 456 are set to zero) and an error is returned. Otherwise, the requested slot number becomes the slot that is currently attached (i.e., attached slot identifier 454 is set to the requested slot number, and attached slot priority 456 is set). As a special case, the calling code can specify a slot number of (−1) to request that a new slot be allocated. In this case, the player validates the requested priority (e.g. as described below with respect to FIG. 5) and returns an error if the priority is invalid. Otherwise, the player selects a slot to overwrite (as described below), clears it out (e.g., by setting creator media ID 420 to the current media ID 452, zeroing the other slot fields, and incrementing write counter 447/448), attaches to the slot (e.g., by setting attached slot identifier 454 to the slot's number and setting priority 456 to the requested priority), and sets max create priority 458 to the larger its current value and requested priority 456. If the interpreter supports interrupts or other capabilities that could cause the unexpected execution of potentially-untrusted code, these should be disabled to avoid the introduction of malicious code while a slot is attached. The return value is the attached slot number 454, or an error code if the operation failed (e.g., because of a code hash mismatch or an invalid requested priority).

SlotWrite: This procedure call writes data to the currently-attached slot. This procedure's input parameter points to the new contents for the slot private data 428, the authentication hash 430, and the payload 432, which are written along with updated values for other slot fields. (In particular, creator media ID 420 is left unchanged, last update media ID 422 is set to the current media ID 452, last update sequence counter 424 is set to slot write counter 447/448, and slot priority 426 is set to attached slot priority 456.) Prior to the slot write, the slot write counter is incremented by updating its low part 448 and, if necessary, high part 447. Players using nonvolatile memory with a limited lifetime (e.g., many flash and EEPROM memories are rated at 1 million write cycles) may reject writes if too many (e.g., more than 128) writes have been performed since power up/media insertion. The write operation resets attached slot identifier 454 and attached slot priority 456 both to zero. The return value is a status code indicating whether the write was successful.

Slot priority management support is provided to balance several potentially-conflicting objectives, including: (a) content should have access to as much nonvolatile memory as it might reasonably need; (b) content should have confidence that its nonvolatile memory will not be overwritten unexpectedly, (c) one title should not be able to reserve an excessive amount of nonvolatile memory and thereby preclude other titles from being able to reserve any; (d) if no empty slots are available in the nonvolatile memory, rarely-used slots should be recycled to provide new content with some nonvolatile storage; and (e) a title should not be able to submit large numbers of requests designed to cause legitimate slots to be recycled. In general, slots with higher priorities are less prone to be overwritten if a player runs out of slots. In an exemplary embodiment, priority rules are designed to ensure that each media title is able to have at most one top priority slot (priority 7). In addition, media are only allowed to create one slot with priority of 2 or greater on each insertion or player power cycle. Content cannot create slots with priorities higher than 7, although slots reserved when players are manufactured can have higher priority levels.

Figure 5:
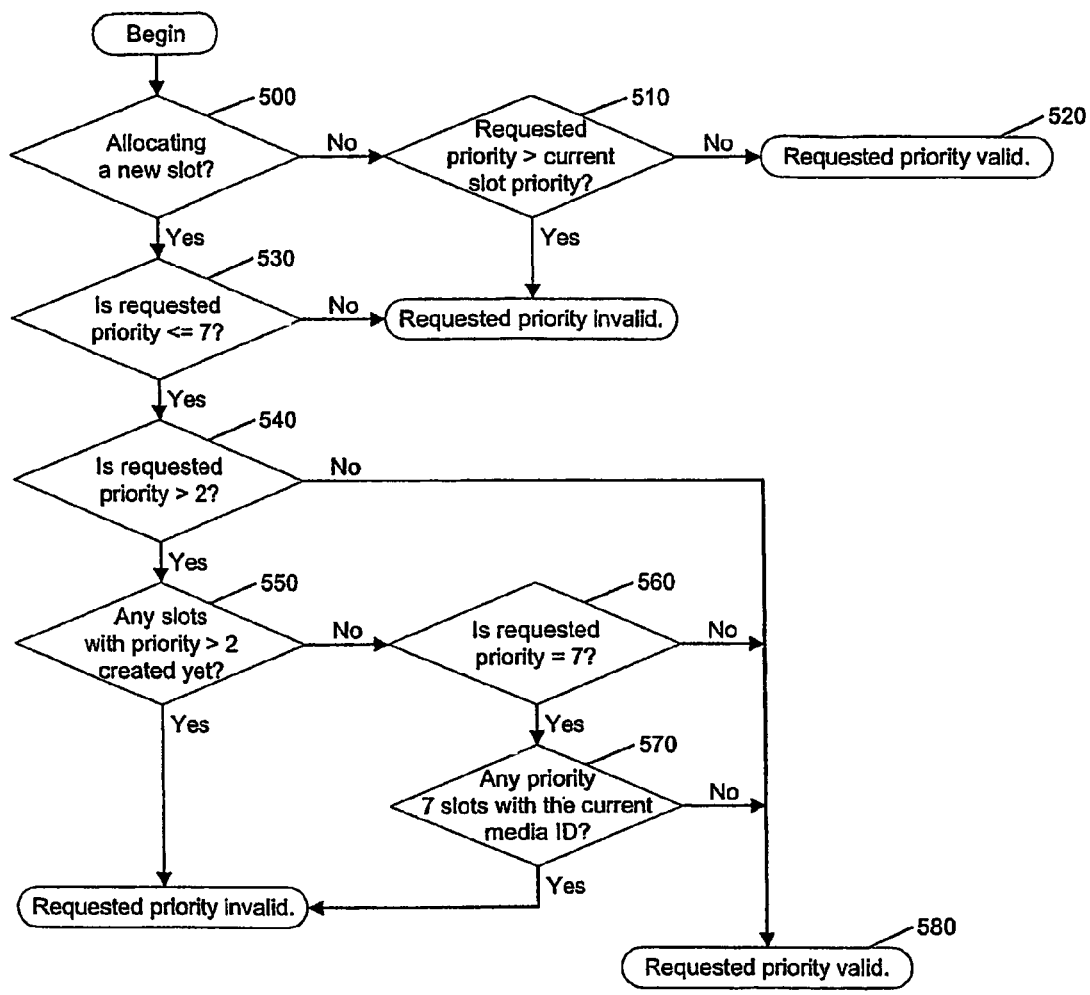
FIG. 5 illustrates an exemplary validation process when attaching to a nonvolatile memory slot.

FIG. 5 illustrates an exemplary process for validating the whether the requested priority for an attached slot is acceptable. When a slot is attached or created (see SlotAttach above), the content specifies a requested priority value. At step 500, the player checks whether a new slot is being allocated (e.g., the slot number is specified as −1). If so, at step 510, the player checks whether the requested priority exceeds the slot's existing priority 426 and, if so, returns an error indicating that the requested priority is too large. Otherwise, at step 520, the attachment request is allowed to proceed using the requested priority. If step 500 concludes that the request is to allocate a new slot, the player checks at step 530 whether the requested priority is 7 or less and, if not, returns an error. Otherwise, at step 540, the player checks whether the requested priority exceeds 2 and, if not, the requested priority is accepted as valid for allocating a slot. Otherwise, at step 550, the player checks max create priority 458 to determine whether any slots with priority larger than 2 have already been created since the media was inserted or the player was reset and, if so, the requested priority is rejected. Otherwise, at step 560, the player checks whether the requested priority is 7 and, if not, the requested priority is accepted as valid for allocating a slot. Otherwise, at step 570, the player checks whether there is already a priority 7 slot whose stored creator media ID 420 is equal to the current media ID 452, and if so, rejects as invalid the requested priority. Otherwise, the requested priority is accepted for allocating a slot.

When a new slot is allocated (i.e., the content calls SlotAttach with slot −1), the player selects the slot with the lowest priority 426 for overwriting. At the factory, empty slots are initialized with the lowest possible priority (zero), and therefore will generally be used first. If multiple slots share the lowest priority, then the slot with the lowest write sequence counter is selected. If a slot with priority 6 or 7 is selected for overwriting, the corresponding counter (priority 6 overwrite count 445 or priority 7 overwrite count 446) is incremented. Alternatively, players with space for a very large numbers of slots may simply fail if a request would require or otherwise involve overwriting a high-priority slot.

At the factory, some slots can be initialized with predetermined values for the authentication hash 432 and a nonzero slot priority. The functionality and/or security requirements for the slot depend on code that is hashed. By way of example, the code used to formulate a predetermined authentication hash may be configured to perform the following steps: (a) initialize all registers (e.g., stack pointers, etc.) to "safe" values; (b) load an RSA signature value from a predetermined address outside of the authenticated code area; (c) using a public key embedded in the region authenticated by the SlotAttach operation, determine whether the RSA signature is a valid signature over a region of the interpreter's memory; and (d) detach from the current slot (e.g., by attaching to generally-accessible slot 0) if the RSA signature is invalid, but otherwise jump to the first address of the region that was digitally signed. If the digitally-signed code is only intended to be played on a specific player, the code may, for example, be configured to check the identity (or other attributes) of the player and/or use player keys to decrypt a portion of the code before running it.

The example in the preceding paragraphs illustrates a method for implementing asymmetric signature validation (e.g., as described in the section entitled "Secure Memories and Counters") using a hash-based slot validation scheme. This approach allows slots to be reserved for future use, where the future use does not need to be specified when players are manufactured or standards are defined. It is also possible to use a public-key based code validation system to sign code that implements a hash-based approach.

It is possible to use a single slot for multiple purposes. For example, multiple code segments can be digitally-signed to pass a verification process such as the one described above. Each of these code segments can be configured to modify a different portion of the slot and properly detach when completed.

Private data field 428 of the slot is also noteworthy, since it makes it possible for code to encrypt slot contents. Although any content can read the main slot payload, only code that has been authorized (e.g., using the SlotAttach process) can read private data 428. Authorized code can therefore use private data 428 as a key (or to derive a key) to encrypt and decrypt slot contents. In this way, the privacy of data stored in slots can be assured. If desired, content also has the ability to place authentication codes or digital signatures on slot contents. Such signatures can be generated by the content code (optionally using player keys), can be generated by the player, or can be generated by an external party or device (such as the publisher of a title or the player manufacturer). Subsequent titles can then be configured to search through all slots, searching for a digitally-signed (or otherwise authenticated) values indicating (for example) that certain security checks are necessary or a particular media ID has been revoked.

Slot-based features can be shared by multiple titles. For example, it is possible to implement a date manager which provides content with the latest known date. Each title that uses this capability would carry a digitally-signed representation of the current date when it was mastered and some predetermined code matching the slot's authentication hash 430. The code for managing the slot would (a) check a digital signature on the date carried with the content and, if invalid, detach from the slot and stop; (b) read the current slot contents; (c) compare the now-verified date from the title with the date in the slots payload 432; (d) if the title's date is later, place the title's date in the slot contents and call SlotWrite to store the new date in the nonvolatile memory while leaving the rest of the slot unchanged; (e) detach from the slot, and (f) erase from RAM the slot private data (as well as any other non-essential values). The operation would return either an error or the later date value (i.e., the later of the authenticated date carried with the title and the date previously stored in the slot). The code can optionally store the digital signature with the date so that corrupted dates will not be misinterpreted as being far in the future. In addition, the date can also be stored encrypted (e.g., using the value of private data field 428 as a key) to limit read access to the stored date value to titles that include a current date. Date values in the player may, for example, be used by content to determine whether security updates are needed, whether on-line security checks are due, whether pay-per-view purchase records are due to be submitted, etc.

In some embodiments (e.g., those providing real-time network capabilities), it may be advantageous to have the player limit access to nonvolatile memory when network support is enabled. This limitation can help assure users' privacy, for example by preventing malicious content from extracting data from the nonvolatile storage and transmitting it over a network. As a specific example, titles that use network access capabilities may be prevented from reading data from slots (or from reading certain slots, such as those that might contain user-identifying information or were created by other titles). Players may also allow titles to terminate their network access privileges and obtain broader slot access (e.g., to obtain values for forensic watermarks once network access is no longer required). Note that information embedded in forensic watermarks does not raise the same privacy concerns, since this data can only be recovered from copies of the content.

The specific nonvolatile memory management descriptions above are intended to illustrate particular embodiments. Many variations are, of course, possible. For example, the specific slot configuration, slot management operations, and priority management approaches are provided for illustrative purposes. Rather than allocating memory in slots of fixed size, other memory management approaches may be employed (including using allocation methods that are not based on slots). Other access control mechanisms (such as those that are not based on media identifiers) may also be employed. The total amount of nonvolatile memory for slots may be variable (or effectively unlimited, as in the case of hard disks or other high-capacity storage technologies). Separate nonvolatile storage capabilities may be included for tracking media/disc insertion histories. It may be advantageous to use cryptography to encrypt and/or authenticate the contents of nonvolatile memory (or other memories, such as the memory accessible by the content) to prevent unauthorized reading/modification. In software implementations, a variety of code, address, data, and algorithm obfuscation techniques may be employed to prevent extraction of (or tampering with) player keys. Any manner of data may also be stored in slots, including, without limitation: pay-per-view purchase records; counters of any kind (e.g., purchase counters, credit/debit or other balance counters, failure counters, media/disc insertion counters, etc.); results of on-line or telephone-based security checks; viewing records/histories; code (interpretable or native); revocation data (for players, peripherals, etc.); signals to other titles; information used to evaluate qualification for rebates or discounts; transaction and playback history data; digital signatures; and keys.

Media Revocation

One noteworthy scenario is the situation where a player is trustworthy, but the media has been pirated. This is a typical situation for professional pirates, since they will generally seek to provide a "product" that is as close as possible to legitimate copies. All off-line media playback devices are potentially susceptible attacks of this nature if pirates develop methods for producing copies of legitimate media that players cannot physically distinguish from the originals. Hard-to-copy media features (such as measurements of wobble characteristics of tracks on optical discs) may be employed to make exact duplication more difficult, but sufficiently determined pirates may still find ways to make copies. Similarly, forensic watermarking allows content owners to identify (among other things) equipment used to pirate previous content, but does not prevent pirated content from being played.

To address the risk of pirates producing unauthorized copies of media, content owners can place a unique per-copy identifier on legitimate media. For optical discs, this data can be placed in a region that can be uniquely written in at the factory (such as the burst cutting area found on some existing stamped optical discs) or on recordable disc portions (e.g., utilizing storage technologies such those currently used to make recordable CDs and DVDs, magnetic discs, etc.). The uniquely-writable region only needs to carry a small amount of information (e.g., a few bytes to a few hundred bytes). In particular, this area can carry recorded serial numbers, user information (name, telephone number, etc.), cryptographic keys, etc. as well as digital signatures authenticating these values. For consumer-recordable media, a unique media serial number (and optionally an associated digital certificate) can be recorded for each piece of blank media that is manufactured.

The content code on media can be configured so that when media is inserted for playback, the authenticity of its unique data is verified. Depending on the media type and the data recorded, this verification process would typically include verifying a digital signature that is unique to the piece of media. To prevent adversaries from bypassing this verification check, verification can be performed using obfuscated code, checks can be performed multiple times (e.g., at various times during playback), and verification results can be integrated with subsequent decryption processes. If the unique data is invalid, the content code would typically reject playback. Otherwise, the content code gains confidence that either (a) the media is legitimate or (b) it was copied from a piece of legitimate media that had the unique data provided.

Next, to determine whether the unique media is valid or revoked, the content checks the player's nonvolatile memory area for data fields indicating the revocation status of the currently-inserted media. If no matching revocation information is found, the media is assumed to be valid. To prevent inadvertent or malicious revocation, revocation data can be authenticated by checking digital signatures or other authenticating data (such as a pre-image to a cryptographic hash). The data in the player's nonvolatile memory can also indicate what action, if any, is recommended, such as (a) notifying the user that the copy is illegal, (b) allowing playback to proceed at reduced resolution, (c) preventing playback altogether, or (d) allowing the user to legitimately purchase the content (e.g., by calling a telephone number and entering an unlock code, or by interacting with a server over the Internet). The nonvolatile memory can also over-ride previous revocation messages, e.g. so that content can be "unrevoked" if desired. If multiple conflicting status indicators are present, a serial number or date may be used to determine which is latest.

In some cases, it is useful to create media that is only playable on specifically authorized devices, such as those that are pre-registered. In this case, instead of providing revocation, unique media information can be used to enable media activation. For example, advance review copies and pre-production copies generally do not need to be (and should not be) playable on all players. Data recorded in the writable portion can include decryption keys or other information specific to the authorized recipient(s) of each piece of media. The uniquely-recorded region can also include names, e-mail addresses, account numbers, or other data identifying the specific recipient (e.g., for forensic watermarking purposes, interactive features, etc.) or characteristics of the recipient (e.g., viewing preferences, authorization data, group identifiers, zip codes, etc.). These fields can also be written during or after the sale of the media, for example as an activation step that prevents shoplifted media from being played (thereby reducing the risk of shoplifting to stores that display media on their shelves). Back-end systems can reimburse merchants for media that is never activated, or charge merchants for media when it is activated. Another use for this capability is to distribute "locked" media prior to an official release date, then write keys that enable playback on the writable area when playback is to be authorized. Information can be recorded by an entity or facility other than the one that manufactured the media, e.g. a retail facility, a shipping facility, or a security agent (e.g., if the pressing facility is not completely trusted). If end-user devices can write portions of the media, it is also possible to record data (such as authorization keys, player identifiers, etc.) when the media is played or unlocked. Writable portions on media can, for example, be used to implement features such as "bonus" material that can be unlocked for a fee then played on multiple players.

For off-line players, revocation notifications typically would be delivered on subsequent titles. For example, new titles can carry lists of serial numbers (with accompanying authenticating data) identifying media that have been revoked. If the player has adequate nonvolatile storage (e.g., a hard drive), revocation lists can be stored by players in their entirety. Otherwise, the revocation data can be checked against the player's insertion history and/or nonvolatile memory slots to determine whether any media that have been played by the player are revoked. If so, the corresponding revocation data is stored in the player's nonvolatile memory. With this approach, pirated "clone" media will play the first time it is inserted, but will become revoked (or otherwise "flagged") when a piece of media is inserted that revokes the pirated media. In general, media revocation is valuable because it makes pirated media less attractive to consumers than legitimate media.

Media activation/revocation can be used to implement a variety of promotional and security features. For example, a movie may be sold with multiple media containing different versions (e.g., wide-screen, pan-scan, Directors' cut, etc.) To prevent people from selling or renting such media separately, their content code can verify that one or more other media are represented in the player's nonvolatile memory. Optionally, the other media can also be required to have been inserted recently (e.g., within a certain amount of time or a certain number of increments to slot write counter 447/448). As another option, the media can also require that the user insert another piece of media during playback (e.g., by loading a key value from the other media). A promotion can be created where users are given access to bonus material if they have played certain combinations of other media. Of course, playback decisions also be linked to other information, such as characteristics of the player and/or playback environment.

Players with on-line capabilities can check the revocation status of the currently-inserted title, as well as other titles represented in the player's media insertion history and/or nonvolatile memory slots. This check can be implemented in content code or can be performed by players. On-line checks can also be used to detect the case where multiple players are simultaneously playing a single piece of media (e.g., indicating that the media has been pirated) or an excessive number of players have used a particular piece of media (e.g., indicating that it has been rented in violation of a license agreement).

Pirates may try to bypass revocation checks by modifying the content's code. In this case, subsequent portions of the code (e.g., code executed later during playback) can detect the modification, for example by repeating the check or by re-loading and verifying portions of the media containing the verification code. Revocation check results can also be integrated with decryption processes.

Of course, variations on the media revocation approach can be employed. For example, players can store digitally-signed interpreted code configured to identify revoked media. These code snippets can be executed each time media is inserted to determine whether the newly-inserted title is revoked. Titles would be able to store revocation checking code (preferably with corresponding digital signatures that would be verified by players), which the player would retain for checking future media. Media revocation checking can also be performed by code in the player's ROM, for example by storing in the player's nonvolatile memory a table of revoked optical discs' sector numbers and hash values. If media is writable, the content may also store and obtain revocation data on the media itself (or may store data of any other kind and purpose on the media, such as user preferences, user information, etc.).

Media may also be used to carry revocation data about recording devices. For example, if consumer recording devices are configured to place identifying data on their recordings, player devices can maintain records of revoked recorders. These records may be updated by revocation data carried on media. Recordable media can also be manufactured with information identifying revoked recorders to prevent revoked recorders from writing to the media. Revocation-related data fields may be cryptographically authenticated, for example to prevent malicious or inadvertent revocation of legitimate devices. For example, the identifying data placed by recording devices may include a recorder digital certificate and a digital signature on a media serial number. Identifying data placed on recordable media may be encrypted (for example with the public key of a third-party agent) to protect the privacy of users. Threshold cryptography may also be employed, for example to require multiple media to identify a recording device. (Note that threshold cryptography may also be employed in other aspects of the technologies disclosed herein, for example with forensic marks to ensure that a certain amount of copied material is required to recover the mark.)

One other use for media revocation is to provide an additional deterrent against casual piracy in addition to other approaches that are available. The data embedded in forensic watermarks can identify previous media played by a device. Depending on implementation choice, it may be advantageous to revoke other media whose IDs were determined from a pirate copy's forensic watermarks, revoke recordable media whose serial numbers are close to those used to distribute pirated material, require additional authorization steps prior to the playback from questionable media, etc.

Miscellaneous Features and Capabilities

Security Over-Ride Keys: Content can be designed such that players with knowledge of a security over-ride key can bypass some or all security checks, allowing access to part or all of the content. By supporting such keys, content owners can grant access to limited portions of a work (e.g., if a jurisdiction required that content owners grant critics "fair use" access to video on a frame-by-frame basis). These over-ride keys can also be used to "release" content from its protected form, for example if protection features are designed poorly (creating playability problems). If desired, these keys may be escrowed with a third party (or stored on the media encrypted with the third party's public key). Over-ride keys can also be schedule to be released when copyrights expire, e.g. to address concerns that anti-piracy mechanisms might prevent content from entering the public domain.

Multiple Round Collusion Analysis: In some situations, a determined adversary might combine output from a large number of devices in an attempt to prevent recovery of forensic watermarks. If an adversary has compromised so many devices that content is unable to identify the offending devices directly, it is possible to combine forensic information gathered from multiple content releases. For example, the information gathered from a first title may narrow the range of possible devices being used by the adversary, but not uniquely identify all offending devices. This knowledge may be used when a second title is mastered to create forensic watermarks that will provide further information about the attackers and/or their equipment. This process may be repeated until the adversaries have been uniquely identified.

Countermeasures to Malicious Interpreters: Malicious players may be designed to try to recognize security-related code in content. For example, a malicious player might attempt to identify where RSA signature verification operations are being performed by content and modify the results, e.g. to make an invalid RSA signature appear to be valid. If such players are produced, content owners can author new content to use different RSA signature computation routines that designed to evade this identification. Examples of operations that may be used include, without limitation: rewriting code to avoid unreliable operations; obfuscating code; message blinding; checking trial computations to detect attacks; and integrating intermediates and/or results with other cryptographic operations (such as decryption steps).

Interactivity: The virtual machine/interpreter may be for non-security tasks as well as security purposes. For example, content code can be used to display menus, text, graphics, animations, user interface elements, etc. to the user. Similarly, the content can receive user commands or responses, including without limitation mouse inputs (e.g., movements, clicks), button presses (such as keyboard or remote control inputs), light pen inputs, and joystick actions. Information about the local player (such as camera inputs, microphones inputs, changes in positions of users' bodies, etc.) may also be gathered and used, for example, to control the playback. Players can also provide features to assist with user interface implementation, including without limitation the ability to display dialog boxes, manage display windows, conduct voice recognition, manage user preferences, etc. As a deterrent to piracy, code implementing interactive user features can be combined with security code, such that adversaries cannot readily separate one from the other.

Accessing and Exchanging Content Over Networks

Although most consumer video and audio content is currently distributed on optical media, the popularity of streaming downloads is predicted to increase over time. The security measures presented herein can be redesigned to support streaming or locally-cached content instead of, or in addition to, physical media. Instead of loading data from media physically located at the player, the content code and data are retrieved over a network. For example, instead of issuing procedure calls requesting data sectors from media, the content would issue procedure calls requesting data over a network. Unlike passive media, a remote server can itself have processing capabilities, e.g. allowing it to send requests to the content (e.g., to have the player perform cryptographic operations) and validate the results. Security protocols for protecting data exchanged over networks (including without limitation SSL) can be implemented in the content's code or in the player (or other components).

A simple server implementation would receive incoming requests from validated users (e.g., those who have paid for access to the content), read the corresponding data from its own local storage, and deliver the result. A more sophisticated server can select and/or modify the data in real time, for example to embed forensic watermarks, and interact with other servers. Servers can also store information about or on behalf of remote players (e.g., as an alternative to player-based nonvolatile memory), deliver security code customized for the end user, perform real-time revocation checks, automatically insert security upgrades into content, provide Internet/web proxy capabilities, and supply other services to content code. For example, an exemplary transaction includes the following steps: (a) a content server receives a purchase request from an end user's player; (b) the content server verifies the payment; (c) the content server transmits a portion of interpretable code configured to analyze the functional and/or security properties of the user's player; (d) the user's player runs the interpreted code and returns information about its properties; (e) the content server analyzes the response and transmits security verification logic (which includes interpreted and/or native code, and may be custom-generated) to the user's player; (f) the user's player processes the verification logic and returns a response to the server; (g) the server validates the response; (h) the content server transmits (e.g., streams) encrypted digital content (e.g., audio, video, and/or images) to the user's player; and (i) the user's player decrypts the content (where correct operation of the decryption process may require correct keys or results from the security verification logic).

The server process can itself be controlled by interpreted code, optionally using the same interpreter architecture (e.g., DLX) as the player side. This has the benefit that content can be authored without regard for the server's physical hardware architecture. For home network environments, this is a particularly attractive model, since the security and decoding "intelligence" remain at the server, while content can be streamed out to authenticated local devices. Similarly, for content that will be streamed over a variety of different Internet services, server-side interpreters can allow content to be authored once and streamed from any compatible service.

In some cases, a recipient device may also possess the ability to make its own security decisions, such as in the case where a receiving device wishes to cache content and later transmit it to subsequent devices whose identity is not known during the initial transfer. In this case, the initial transfer may include interpretable and/or natively executable code for use by the recipient device in making its security-related decisions. It is not necessary that that all devices support the same interpreter or programmable technologies, as the code run by the transmitting device does not necessarily have to be the same as the code by the receiving device.

In some situations, multiple servers and/or content transfers may be involved. For example, content may include security code obtained from multiple entities, including (for example) servers operated by both player manufacturers and content owners. In some personal computer environments, it may also be useful to use multiple interpreters. For example, interpreters may be included in the media interface (e.g., an optical disc drive), the operating system, the application software (e.g., the player), output devices (e.g., an amplifier), etc. Alternatively or in addition, cryptographic oracles may also be provided in components.

Player Operation Invocation and Notation

The player device provides a (typically software-implemented) interpreter (virtual machine), which allows content code to perform a variety of individual operations. Such operations include manipulating virtual registers and accessing memory belonging to the content code. In addition, content code can also invoke TRAPs (external operations implemented in the player). TRAPs can be used to perform operations (such as accessing peripherals) that content code cannot directly perform by manipulating its own resources, or to provide higher performance than could otherwise be guaranteed by content code.

The notation used in this section is designed to be familiar to C/C++ programmers. The types UINT8, UINT32, and UINT64 are used to denote 8-, 32-, and 64-bit unsigned integers, respectively. In an exemplary embodiment, each prototype corresponds to a sequence of 32-bit values that should be pushed on a stack prior to calling the appropriate TRAP operation. Since all values on the stack are 32 bits in size, parameters smaller than 32 bits are extended to 32 bits, and larger values are stored using multiple 32-bit values. The actual number of 32-bit values involved in each TRAP operation may be zero (if the parameter list is void). The number of parameters may also be variable, in which case the prototype will end with " . . . ". Arrays are denoted as "type name [size]", e.g. "UINT32 test[16]" represents an array of sixteen 32-bit words. A pointer is denoted as "type *name", e.g. a pointer named testPtr to one or more 32-bit unsigned integers would be "UINT32 *testPtr".

The stack itself may simply be a region in memory accessible by the content code and by the portions of the player that implement each TRAP. For example, an exemplary stack may be implemented by designating an emulated register accessible by content code as the stack pointer. When a TRAP in invoked, the value of this register is read by the content code to locate the parameter values that were passed. (If the stack pointer or stack contents are invalid, appropriate action is taken such as ignoring a TRAP operation or substituting valid values.) An exemplary process of pushing an integer onto the stack involves first subtracting 4 from the stack pointer then storing the value to push at the memory address specified by the new stack pointer. Popping a value off the stack is performed by first reading the value from the memory address specified by the stack pointer then adding 4 to the stack pointer. Following a TRAP operation, the content code and/or the code that implements the TRAP clear the parameters from the stack, e.g. by restoring the stack pointer value. Other stacks and, more generally, function invocation and parameter passing techniques, are known in the background art and may also be used with the present invention.

To invoke a TRAP, the caller first pushes each of the parameters (starting with the rightmost parameter in the prototype definition), invokes the appropriate TRAP operation, and obtains the return value (e.g., by reading a result value stored, by convention, in register 1). For example, consider the following TRAP denoted as "UINT32 TRAP_Random(UINT8 *dst, UINT32 len);" Prior to invoking the trap operation, the caller (content code) would first push the 32-bit value "len", then push the 32-bit pointer value "dst" (which is the memory address where the result should be stored). The caller would then invoke the appropriate low-level TRAP operation. Usually (though not necessarily) content code thread that invoked a TRAP will be halted while the requested operation is performed. The TRAP's return value (denoted with the left-hand "UINT32" in the example prototype) is placed in a location where it can be retrieved by the content code (e.g., by placing the return value in a predetermined register). Most of the exemplary TRAPs return a status value (e.g., a constant STATUS_OK that indicates success, or a value indicating an error condition, or that otherwise describes the result or state of the system or operation). For brevity, the contents of the return value are generally omitted in the TRAP descriptions below if the value is simply a status value. Some TRAPs do not return any status value, but may fail (e.g., if given illegal input parameters), in which case content code may need to ensure that appropriate inputs are provided and/or verify that the operation completed as expected.

Values exchanged using TRAP operations may be cryptographically protected, e.g. using encryption and/or digital signatures. For example, values passed to a TRAP may be encrypted with the public key of the player or of other device(s). Values may also be encrypted with symmetric cryptography, e.g. using block or stream ciphers. Values may also be digitally signed. Responses may also be cryptographically protected. For example, responses may be digitally signed, e.g. by the player, the player's manufacturer, external devices, a format entity, etc. The specific combination of cryptographic protections employed (and the corresponding keys, etc.) may be specified, or may be based on content code requests, player requests, external devices, the state of the player, etc. Keys used to secure data may not be contained in (or accessible by) the player, e.g. in the case of data communications whose endpoints are the content code and an external device but that pass through the player.

TRAP operations often make changes to the system state. For example, register values and memory contents visible to the content code may be changed. For example, the "TRAP_Random" example above will store output from a random number generator for use by content code. Portions of the playback system outside the direct control of the content code are also commonly accessed or modified by TRAP operations. For example, TRAP_SlotWrite can change the contents of a player nonvolatile memory slot, and TRAP_MediaReadRequest adds a request to the queue of pending media reads. These changes may or may not be directly observable by the content code.

Player Operations

The following describe TRAP operations supported by an exemplary embodiment. Note that limitations, constants, and other aspects of the design reflect the exemplary embodiment, not necessarily other embodiments.

void TRAP_Yield(UINT32 sleepTime);

Yields control over the interpreter until the sooner of (a) the specified time in microseconds, or (b) an event occurs (e.g., media read completion, etc.). Implementations are not required to suspend the interpreter when TRAP_Yield is called, however it may be desirable to do so, particularly to save battery power on portable devices or to conserve processor cycles on multithreaded systems. Implementations also have the option to ignore the sleepTime parameter. This operation may consume 1 microsecond, even if a smaller value is specified for sleepTime or if an event occurs sooner. If an event occurs, control will resume within 1 microsecond of the event. If no events occur, execution may be suspended for up to sleepTime microseconds. The TRAP does not return anything; execution continues on the next instruction when the player is ready.

UINT32 TRAP_Random(UINT8 *dst, UINT32 len);

Stores len random (or strong pseudorandom) bytes generated by the player at dst.

UINT32 TRAP_Sha(UINT8 *dst, UINT8 *src, UINT32 len, UINT32 op);

Performs the SHA-1 algorithm on len bytes at src and stores the result at dst. Values for op include: SHA_UPDATE (0) which adds more data to an existing SHA state, SHA_INIT (1) which begins a new SHA context before hashing data, SHA_FINAL (2) which perform a finalize operation when the hash update is complete, and SHA_BLOCK (3) which performs a full block operation (equivalent to setting both SHA_INIT and SHA_FINAL).

There should be at least 512 bytes of available space at dst, and the contents of that space will be indeterminate until a finalize operation (e.g. op=SHA_FINAL) happens.

Player implementations may use the 512 bytes at dst for temporary storage of state, but should assume the contents of dst were chosen maliciously by the content code. Returns STATUS_OK if successful, otherwise returns one of the defined error codes.

UINT32 TRAP_Aes(UINT8 *dst, UINT8 *src, UINT32 len, UINT8 *key, UINT32 opOrKeyID);

Performs the AES ECB algorithm on len blocks from src and stores the decryption result at dst using the key at key (as transformed below). The value for opOrKeyID specifies how the key should be derived and whether to perform AES encryption or decryption. The following values for opOrKeyID are supported:

opOrKeyID=AES_ECB_ENCRYPT(0xFFF10000)–Encrypt the data using ECB mode with the 16-byte key at key.

opOrKeyID=AES_ECB_DECRYPT (0xFFF10001)–Decrypt the data using ECB mode with the 16-byte key at key.

opOrKeyID=AES_ECB_DECRYPT_MEDIA_KEY (0xFFF10002)–Decrypt an encrypted key value at key using the media key for the currently-inserted media, then use the result as a key to decrypt the data at src using ECB mode.

opOrKeyID=any other value. Decrypt the enciphered key at the pointer key using the player key identified by opOrKeyID, then use the resulting decrypted key to decrypt the data at the pointer src using ECB mode. (Note: Content code can check the player's certificate to determine the key range for the player's main AES key set; these keys do not necessarily begin at 0, and there may be multiple sets of keys.) While keys selected by opOrKeyID may be located in the player application, keys may (without limitation) also be located in the drive, in device drivers, in displays/output devices, located remotely across networks, located in a user-removable smart cards (or other tamper resistant chips), located in non-removable tamper resistant chips, split among multiple devices, etc. The first decryption operation (decrypting the content-specified encrypted key) may be performed by the device containing the identified key, while the bulk processing (i.e., decrypting the data at src) may be performed elsewhere (e.g., in a high-speed cryptographic module that lacks nonvolatile memory for key storage).

Cryptographic operations, particularly those involving external devices, may also be implemented via TRAP_DeviceDiscovery and/or TRAP_DeviceAccess. Cipher block chaining (CBC), counter mode, and other block cipher modes may be implemented from ECB operations using content code (optionally with operations such as TRAP_Xor). Alternate embodiments may also directly provide algorithms other than AES and/or modes other than ECB.

UINT32 TRAP_PrivateKey(UINT8 *dst, UINT8 *src, UINT32 srcLen, UINT32 controlWord, UINT32 keyID);

This operation uses the RSA private key selected by keyID (normally 0), or some other asymmetric key in the player (or in a device accessible by the player), to transform some data. From the keyID, the length of the result and the operation type (e.g., signing or decryption) is implicit. Information about available keys, including corresponding public keys and certificates (which the content code can verify), may be obtained using TRAP_DeviceDiscovery and/or TRAP_DeviceAccess. The choice of what data to submit is up to the content code (e.g., any function of any data from the media and/or TRAPs can be submitted). For example, the value submitted for a signing operation can be tied to user interface (and other) events by incorporating event data (see TRAP_EventGet) in generating the data signed.

For the player's main RSA private key (keyID=0), this operation produces a 2048-bit RSA signature of a SHA-1 hash. The hash is computed as follows: (a) hashing the value of srcLen, encoded as 4 bytes (MSB first); (b) hashing the contents of the user-specified buffer (i.e., srcLen bytes at src); (c) hashing the value of controlWord, encoded as 4 bytes (MSB first); (d) If controlWord bit 31 (the MSB) is set, hashing the value of the media ID; (e) If controlWord bit 30 is set, setting the destination pointer to PC+4, overriding dst; (f) if controlWord bit 29 is set, hashing the (control word mod $2^{16}$) code bytes beginning with the current program counter; then (g) if controlWord bit 28 is set, incorporating the current value of PC in the hash. The SHA-1 hash result is then padded by prepending "0x001||0x01||0xFF (repeated 233 times)||00" to the SHA-1 hash. The padded value is then raised to the player's secret exponent, modulo the player's public modulus.

For verifying signatures, the player's public exponent is 3, and the public modulus can be obtained by the content code by verifying the player's certificate using a system-wide public key (which can be a constant contained in the content code, optionally in obfuscated form).

The options provided by the control word allow content code to obtain attestations about the execution environment, such as detecting the situation where signatures are being performed by a compliant device other than the one containing the interpreter. Verifiable binding between the interpreter and the content code can be useful to address situations where an attacker tries to use malicious content running on a legitimate player to produce cryptographic results for use by a malicious player running legitimate content.

Embodiments may support any combination of asymmetric cryptographic algorithms (RSA, DSA, elliptic curve variants, Diffie-Hellman, etc.), operations (signing, verification, key agreement, etc.), and key sizes may be supported. Symmetric operations may also be integrated with asymmetric operations. Note that some cryptographic operations, such as RSA signature verification, can be implemented in content code without any special traps, or using only general-purpose performance acceleration operations (e.g., TRAP_AddWithCarry, etc.) An example of a more complex cryptographic TRAP would be one that does some or all of the following: (a) performs an RSA public key operation to verify a signature on a block of data, (b) if the signature is valid, performs an RSA private key operation to decrypt a block data in the verified portion to recover a symmetric key, (c) if the RSA decryption is successful, uses the symmetric key to decrypt and verify (e.g., using HMAC-SHA) some data (e.g., data in the signed block following the encrypted key), then (d) use the interpreter to process the decrypted data as code.)

In alternate embodiments, cryptographic support may be provided for signing, verifying, decrypting, encrypting, or otherwise processing the inputs and outputs of any manner of other computational operations (such as other TRAPs).

UINT32 TRAP_AddWithCarry(UINT32 *dst, UINT32 *src, UINT32 len);

This operation performs a multi-word addition operation with carry propagation. The value at src[0 . . . len−1] is added to dst[0 . . . len−1]. The values src and dst can each be verified as pointing to a large number stored as len words and encoded with the most-significant word at address src[0] or dst[0], respectively. The least-significant words are located at src[len−1] and dst[len−1], respectively.

For example, the number 0x08090A0B0C0D0E0F would have len=2 and would be stored with 0x08090AB at the location specified by the pointer (e.g., src[0]) and the value 0x0C0D0E0F at the byte offset referenced by the pointer plus 4 (e.g., src[1]).

If the source and destination areas overlap, correct operation is guaranteed only if src=dst. The operation's return value is 1 if the final (most-significant or left-hand) addition step produced a carry, and zero otherwise.

(Note: The TRAP_AddWithcarry operation, along with various other TRAP operations, could also be implemented using content code without a separate TRAP, but a dedicated TRAP enables player designers to chose the most efficient technique available on each platform, thereby enabling better performance guarantees across a broad variety of possible player designs.)

UINT32 TRAP_SubtractWithBorrow(UINT32 *dst, UINT32 *src, UINT32 len);

This operation performs a multi-word subtraction operation with borrow (carry) propagation. In particular, the value at src[0 . . . len−1] is subtracted from dst[0 . . . len−1]. The values src and dst each point to a large number stored as len words and encoded with the most-significant word at address src or dst, respectively. For example, the number 0x08090A0B0C0D0E0F would have len=2 and would be stored with 0x08090A0B at the location specified by the pointer (e.g., src[0] and the value 0x0C0D0E0F at the byte offset referenced by the pointer plus 4 (e.g., src[1]). If the source and destination areas overlap, correct operation is guaranteed only if src=dst. The operation's return value is 1 if the final (most-significant, or left-hand) subtraction step required a borrow, and zero otherwise.

UINT32 TRAP_MultiplyWithRipple(UINT32 *dst, UINT32 *src, UINT32 multiplicand, UINT32 len);

This operation multiplies multiplicand onto the number in dst[0 . . . len−1]. The result is len+1 words long. The most-significant word of the result is returned, and the rest is stored in dst[0 . . . len−1]. The value of dst should point to a large number stored as len words and encoded with the most-significant word at the address pointed to by dst.

The most-significant 32 bits of the result are returned. (This is equal to the most-significant 32 bits of the product of multiplicand and dst[0 . . . len−1].)

void TRAP_XorBlock(UINT32 *dst, UINT32 *src, UINT32 len);

This operation computes the exclusive-OR of two blocks of memory. The data stored at src[0 . . . len−1] is XORed onto the data at dst[0 . . . len−1]. This operation is, for example, useful when creating CBC mode block cipher operations. Operation if the src and dst blocks overlap is not defined. No return value is provided.

void TRAP_Memmove(UINT8 *dst, UINT8 *src, UINT32 len);

This operation copies len bytes from src to dst. The result is correct even if the source and destination blocks overlap. No return value is provided.

UINT32 TRAP_Memcmp(UINT8 *ptr1, UINT8 *ptr2, UINT32 maxlen);

This operation compares memory at ptr1 with ptr2, comparing for up to maxlen bytes. The return value is 0 if no differences are found, 1 if the value at ptr1 is larger at the first difference, and 0xFFFFFFFF if the value at ptr1 is smaller at the first difference.

void TRAP_Memset(UINT8 *dst, UINT8 fillvalue, UINT32 len);

This operation fills memory with the byte value specified by fillvalue. The destination address is specified by dst and the number of bytes to store is specified by len. No return value is provided.

UINT8* TRAP_Memsearch(UINT8 *region, UINT32 regionLen, UINT8 *searchData, UINT32 searchDataLen);

This operation searches memory for one or more bytes. In particular, it finds the first occurrence of the searchData (which has a length of searchDataLen bytes) within region (which has a length of regionLen bytes). Matches will be found if they occur entirely within region[0 . . . regionLen−1]; matches that begin in this range but extend beyond the end are not counted. The operation returns a pointer to the first match. If no match is found within region, the return value is NULL (zero).

UINT32 TRAP-SlotAttach(UINT32 slot, UINT32 codeLen, UINT32 reqPriority);

This operation attaches to an existing nonvolatile memory slot or allocates a new slot (if the specified value for slot is zero). Slot attach operations will fail (defaulting to slot zero) if the specified code (beginning at the caller's PC and extending for codeLen bytes) does not match the slot's authorizationHash. (For additional information about nonvolatile memory support, see the section entitled "Securing Nonvolatile Memory".)

UINT32 TRAP-SlotRead(UINT8 *dst, UINT32 slot);

This operation attempts to read a nonvolatile memory slot and, if successful, stores the result at the specified location. If the specified slot is not the slot that is currently attached, the private data portion(s) of the slot contents are not returned. (For additional information, see the section entitled "Securing Nonvolatile Memory".)

UINT32 TRAP_SlotWrite(UINT8 *newContents);

This operation attempts to write to the currently-attached nonvolatile memory slot. (For additional information, see the section entitled "Securing Nonvolatile Memory".) Slot write operations are atomic, meaning that the player guarantees that if the operation fails (e.g., due to an unexpected power loss) the operation will either be completed in its entirety or not at all.

The TRAP_SlotWrite operation ensures that the data written has correct values for several portions of the slot, including the creatorMediaID (the identifier of the media whose content code that originally created the slot), the lastUpdateMediaID (the identifier of the media whose content code most recently wrote to the slot), the lastUpdateSequenceCounter (the value of a global write counter, that monotonically increases once per write), and the slotPriority (which specifies the overwrite priority for the slot).

The content code controls the data written to the general-purpose area. Examples of information that can be stored include, without limitation, playback state information (such as the location and configuration where playback was paused/discontinued), audit information (including running hashes or other cryptographic authentication for audit data), high scores for video games, default information for automatically completing electronic purchases (user name, user address, credit card number, credit card expiration, billing address, shipping address, telephone number, e-mail address, etc.), executable code (e.g., new security logic, patches to correct problems with a title or player, etc.), keys (and other security information), etc.

The return value indicates whether the write operation was successful and the general status of the media (e.g., a warning if the nonvolatile memory is close to being exhausted due to an excessive number of write cycles). A read operation may be performed after a write for additional verification that the write was successful.

UINT32 TRAP_MediaEject(void);

This operation attempts to eject any removable media currently in the drive. After a successful call to TRAP_MediaEject( ), the interpreter may continue to operate, although in many cases the interpreter will then shut itself down by calling TRAP_Shutdown( ). Players are not required to support automated ejection, in which case the operation will fail. (Content code can detect eject support, and other player capabilities, using TRAP_DeviceDiscovery.)

In some situations, it may be advantageous to preserve portions of the content code's memory space while the media is changed. For example, this may be useful to preserve larger quantities of data than be readily saved in a nonvolatile memory slot when switching between discs in a multi-disc set. In this situation, TRAP_MediaEject is used to eject the initial media. The user then inserts another piece of content (e.g., after prompted with an overlay). The identity of the newly-inserted content can be determined via TRAP_DeviceDiscovery. To prevent unexpected media changes, an explicit call to TRAP_DeviceAccess is required to enable the new media. Portions of the new media that are marked as authorized for general reading can then be loaded. (Some portions may be designated that they should only be read by the media's own content code. Embodiments that require more sophisticated media-to-media (e.g., disc-to-disc) chaining capabilities can allow the code on the initial media to authenticate the second media, and also allow code on the second media to authenticate the source media. Media authentication can also be performed by the player, e.g. based on digitally-signed rules and certificates carried on the source and destination discs.)

UINT32 TRAP_MediaReadRequest(UINT32 offsetHigh, UINT32 offsetLow, UINT32 len);

This operation tells the media subsystem to begin retrieving some data. In the exemplary embodiment, the value for len may not exceed 1 megabyte (1048675 bytes), including sector boundaries. (If the offset is not on a sector boundary, i.e. not an exact multiple of SECTOR_SIZE, then the length may not exceed 1 megabytes minus the sector offset, which is computed as offsetLow modulo SECTOR_SIZE. SECTOR_SIZE is currently defined as 2048 bytes.) Players allow at least two uncompleted requests to be buffered (e.g., one that is currently being serviced and one that will be serviced next). This enables the content to keep the drive continuously busy. Players will typically use a separate one-megabyte pending buffer for each pending request. A return without any errors means that the read will be attempted (i.e., the request is not obviously bad), but does not assure that the read will actually succeed. (See TRAP_MediaReadFinal.)

While this operation simply requests that a read be performed (and does not actually load any data into the content code's memory area), alternate embodiments could specify a destination addresses and (for example) detect whether the read had completed by receiving an event or by checking whether the destination buffer has been filled. If such an approach is employed with the code-based NVRAM security capabilities (e.g., see TRAP_SlotAttach), security measures may be required to ensure that adversaries do not use pending reads to corrupt security code associated with unlocked NVRAM slots or otherwise attack the security. For example, players can suspend or prohibit media reads while NVRAM slots are unlocked and/or reject NVRAM slot attach requests while such operations are pending.

UINT32 TRAP_MediaReadFinal(UINT8 *dst);

This operation checks whether the oldest (first-in) requested read has completed. If not, a return value of STATUS_NOT_DONE is returned. If no reads are pending, a return value of STATUS_NOT_FOUND is returned. If the read request failed, STATUS_ERROR is returned. Otherwise, the requested data is transferred from the drive's buffer to the content code's memory space at the specified address and the value STATUS_OK is returned. If the address is 0xFFFFFFFF, the data is discarded.

Note that special reads (such as reading of burst cutting areas, data reads with error detection/correction disabled, etc.) are configured and performed using TRAP_DeviceAccess, not this operation.

UINT32 TRAP_MediaWrite(UINT32 offsetHigh, UINT32 offsetLow, UINT8 *src, UINT32 len);

This operation writes the specified data to the media, beginning at the specified offset. (The offset is a 64-bit value, encoded as a 32-bit upper value and a 32-bit lower value.)

This operation is only applicable for media formats that support writing. The writable regions may also be limited to certain portions of the media. Writing may also be prohibited in certain situations (e.g., if the media has been changed, if a recorder identifier on the media does not match the current device, if the media lacks a valid certificate authorizing use of writing capabilities, etc.)

TRAP_DeviceAccess may be used to provide any necessary authentication or key agreement required to secure or enable writing. For write-once media, attempts to overwrite previously-written portions (and risk corrupting the media at that location) may be rejected unless explicit authorization is obtained (e.g., via TRAP_DeviceAccess). (While normally undesirable, such writes could be useful in certain situations, e.g. to cause media to self-destruct in response to an attack.) If the drive allows direct control over the write head modulation, tracking control, error correcting codes, read/write head optical properties, or other configuration parameters, these may also be adjusted via TRAP_DeviceAccess. Characteristics of written media may be modified for forensic purposes, e.g. to enable content owners to determine which writing device produced a particular piece of optical media.

UINT32 TRAP_EventGet(UINT8 *evBuf, UINT32 len);

This operation checks whether any events (such as user interface operations, security changes, etc.) are pending and, if so, stores information about the first one (or the highest-priority one) at the address specified by event. If no event is found, the value STATUS_NOT_FOUND is returned and the contents of event are unchanged. Otherwise, the trap returns STATUS_OK and sores information describing the event at evBuf (but will not store more than len bytes).

The data returned in the event buffer (evBuf) depends on the event. If a user interface event is returned, the following data structure is stored at the memory address specified by evBuf:

```
typedef struct {
    UINT32  Source;       /* Device type that produced event */
    UINT32  Action;       /* Actual/suggested action for event */
    UINT32  Char;         /* UTF-8 value of event (if applicable) */
    UINT32  Direction;    /* Compass values for event */
    UINT32  Xpos;         /* Pointer X position for event */
    UINT32  Ypos;         /* Pointer Y position for event */
    UINT32  Reserved[10]; /* Do not interpret (future use) */
} EventInfo_UserInterface;
```

The Source field identifies the device from which the event originated. The interpretation of the Source field may be predetermined or may be determined by content code (e.g., via information obtained from TRAP_DeviceDiscovery). Examples of possible sources that may be designated include without limitation: remote controls, keyboards, faceplate keys, mouses (and other pointing devices), media drives, external devices, timers, codecs, unknown/unspecified sources, etc.

The Action field specifies the suggested action for the event or that triggered the event. This value may be modal (i.e., affected the player's current state) or may be constant. Actions may alter the playback state, or have other effects. Examples of possible actions include without limitation: play, pause, stop, rewind (at various rates), fast forward (at various rates), slow motion (at various rates), power off, eject, channel-up, channel-down, select, enter, volume adjustments (or mute), guide/menu selection, change viewing angle, skip-forward, scene selection, user language selection, subtitle control, video angle change, select, back, forward, yes, no, purchase, exit, help, error, output device change notification, playback environment reconfiguration notification, security alerts, etc. If unknown (such as the case where there is no action that corresponds to the event), this field is zero. (Note: This field is valid for user interface events as well as for other events. The most-significant 16 bits of the value identify the structure of subsequent fields, e.g. EventInfo_UserInterface, EventInfo_SecurityAlert, Etc.)

The Char field specifies the character corresponding to the key (e.g., encoded using ASCII, doublebyte, etc.) If unknown (such as the case where there is no character that corresponds to the event), this field is zero.

The Direction field specifies the direction that the event indicates, or zero if none. The direction can be any angle, although directions may be quantized to certain predetermined values (e.g., north/up, northeast/up-right, right/east, etc.)

The Xpos and Ypos fields indicate a position if the event can be interpreted as a pointer movement or action on a standard X/Y grid. If the event does not correspond to an X and/or Y coordinate, the corresponding field(s) are set to zero.

Note that a single event (such as a button press on a remote input device) may be interpreted in multiple ways. For example, on some input devices, the button used for "up" also corresponds to the number 8. In this case, one event would be generated, with a direction of "up" and a Char field with the number "8". The content code would use its current knowledge of what input is desired to determine which is appropriate. (In an alternate embodiment, players could provide separate capabilities or information to assist content code with interpreting user events, or enable content code to specify how to interpret events with several possible interpretations.) If content receives an unknown event type, it may safely ignore it (unless a criticality bit specified in the source field indicates otherwise).

For non-user-interface events (such events announcing device addition, device removal, device reconfiguration, other playback environment configuration changes, requests from external components for data, notification that operations have completed, etc.) or for events from other kinds of user interfaces (such as speech recognition capabilities or digital cameras configured to observe user gestures), other data fields can be provided. For some events, it may also be necessary for the content code to invoke additional TRAPs (such as a vendor specific TRAP) to get additional information.

Note that while the TRAP_EventGet operation uses polling to detect changes, alternate embodiments could use interrupts or other well known mechanisms for handling events.
UINT32 TRAP_CodecOutput(UINT32 idx, UINT8 *buf, UINT32 len);

This operation transmits data to a codec. A simple player might support just one codec (e.g., CODEC AUDIO_AND_VIDEO) or two codecs (e.g., CODEC_VIDEO MPEG2 and CODEC_AUDIO_MPEG), while a more complex player might support many, e.g. to support multiple kinds of content streams and to enable features such as picture-in-picture. Codec parameters may be set using TRAP_DeviceAccess operations.
UINT32 TRAP_CodecSetTime(UINT64 time);

This operation sets the main codec time clock. Specifying a value of zero causes the lock to be resynchronized with video timestamps embedded in data provided to TRAP_CodecOutput. This command is buffered with the video buffer, so the effect is delayed until the command is encountered. With TRAP_CodecFlush, this operation is used to enable real-time video splicing and to allow the content code to switch seamlessly from one compressed video/audio stream to another.
UINT32 TRAP_CodecSetRate(UINT32 rate);

This operation sets the rate and direction at which the codecs consume data. The rate value is converted to a signed integer and scaled down by a factor of 64. For example, the a rate of 0 means "paused", 128 is fast forward at 2× normal playback speed, −256 (0xFFFFFF00) is rewind at 4×, and 16 is slow forward play at 0.25×. If the requested value is not supported, the codec picks the next closest value by ignoring the sign and rounding higher, respecting the player's maximum rates. The exception is fractional playback rates where the codec should never round to 0 (paused) or 64 (normal). If a negative playback rate (reverse) is specified, the codec (through TRAP_CodecStatus) will typically request video GOPs in reverse order. By default, audio is muted for playback rates other than 64.
UINT32 TRAP_CodecFlush(void);

This operation flushes the video and audio codec buffers. This command is typically used if content code wishes to delete data in the codec buffers in order to switch quickly from one stream to another. For example, if the user requests to jump forward by 1 minute, the content code can use this operation to clear out any data in codec buffers so that newly-submitted data will be decoded immediately.
UINT32 TRAP_CodecStatus(CodecInfo *info);

This operation retrieves information about the codecs' FIFO queues and the next chunk of video or audio the codec expects. The data values returned include the current timestamps (including the timestamps corresponding to the audio-visual information currently being displayed/output, of the information currently being uncompressed, and of the information currently in the codec's buffer), the amount of time until the codec buffers will become empty, the number of bytes available in the codec's buffers, location (e.g., next, previous, seek distance) and type (e.g., full GOP or "I" frame) of data that should be added next to the codec buffers (for example, this might be the previous "I"-frame when playing MPEG-2 video backward at high speed). Where applicable, separate information is provided for each codec (audio, video, etc.)
UINT32 TRAP_OverlaySetup(UINT32 idx, UINT32 width, UINT32 height);

This operation allocates an overlay plane with index value idx, that has the specified dimensions, and is blank (all transparent).

UINT32 TRAP_OverlaySetPosition(UINT32 idx, UINT32 x, UINT32 y);

This operation sets the (x,y) position of the specified overlay plane on the display (where 0,0 is the left-hand corner). This operation does not actually display the overlay; it only specifies where it will be displayed when TRAP_OverlayShow( ) is invoked.

UINT32 TRAP_OverlayShow(UINT32 idx, UINT64 pts);

This operation displays an overlay. The pts value specifies when the overlay should appear, e.g. for use in synchronizing overlays with underlying video.

Multiple calls to TRAP_OverlayShow (along with calls to other overlay operations to actually create the appropriate images, set palettes, etc.) may be used to create animated menus, simple picture-in-picture video, and any manner of other animated overlays.

UINT32 TRAP_OverlayHide(UINT32 idx, UINT64 pts);

This operation hides, but does not clear, an overlay. Hiding an overlay leaves it available to be shown again later. The overlay is hidden at the specified time (pts).

UINT32 TRAP_OverlayClear(UINT32 idx);

This operation clears an overlay. Clearing an overlay erases its contents, so that it needs to be setup again (see TRAP_OverlaySetup) prior to showing it again.

UINT32 TRAP_OverlaySetPalette(UINT32 idx, UINT32 * color, UINT8 *trans);

This operation specifies the palette for an overlay, including the color (e.g., RGB or YUV) and transparency (opacity) for each of 256 palette values. Changes to palettes may be used to animate or modify overlays (e.g., to highlight boarders around a selected area, change the opacity of a translucent overlay pane, make an image visible, etc.).

UINT32 TRAP-OverlayBitmapDraw(UINT32 idx, UINT32 x, UINT32 y, UINT32 width, UINT32 height, UINT8 *bmp);

This operation draws a bitmap on the specified overlay. Drawing overlays that exceed the boundaries of the overlay area will produce an error, or may produce an aesthetically unpredictable result. However, the player should not overflow buffers or cause any other security breach in such situations. The parameter bmp specifies the image to draw (which may be compressed or uncompressed). Alternate embodiments may provide drawing operations or capabilities can be provided that perform scaling and other image manipulations, thereby offloading these (often computationally-intensive) processes from content code.

UINT32 TRAP_OverlayTextDraw(UINT32 idx, UINT32 x, UINT32 y, UINT32 size, UINT8 *text);

This operation draws text on the specified overlay. The first eleven entries in the palette are used for the coloring of the text (including anti-aliasing with translucent edges). Content code can also use image drawing capabilities to display text, e.g. if the player lacks a required font, character set, etc.

If the text line does not fit on the overlay, it is cropped. No support for line breaks is provided; this is the responsibility of the caller. The size parameter specifies the size of the text to draw, and may be a player default (e.g., reflecting user preferences, the characteristics of the current display, etc.)

UINT32 TRAP_OverlayRectDraw(UINT32 idx, UINT32 x1, UINT32 y1, UINT32×2, UINT32 y2, UINT32 color, UINT32 filled);

This operation draws a rectangle on the specified overlay. The input parameters specify the overlay index (idx), the upper-left hand coordinates (x1,y1), the lower-right hand coordinates (x2,y2), the color, and a Boolean value (filled) indicating whether the rectangle should be filled.

UINT32 TRAP_SockConnect(UINT8 *name, UINT32 port);

This operation opens a socket-based network connection to the address specified by name on the port specified by port. TRAP_DeviceAccess may be used to configure socket settings and determine whether a network connection is currently available, is potentially available (e.g., by attempting to dial via a modem), or certainly not available. The presence and reliability of network connections depends on the implementation (e.g., a portable device that is integrated with a cell phone is likely to have network connections, but one without any wireless connectivity support may not).

Player support for socket/network operations is optional, but is standardized to provide a consistent interface by which content can access remote network resources when available. Socket support is asynchronous; content requiring synchronous access should poll until the required data has been retrieved. Detection and configuration of network parameters is performed via TRAP_DeviceDiscovery and TRAP_DeviceAccess.

UINT32 TRAP_SockClose(void);

This operation closes the currently open connection.

UINT32 TRAP_SockRecv(UINT8 *buf, UINT32 len);

This operation receives data in buf from an open connection.

The content code controls how received data is used. Examples include, without limitation, obtaining fresh security code, checking revocation status, processing payments, shopping for (and purchasing) goods/services, downloading bonus content, downloading updated offers/advertisements (including pricing and purchase information), implementing multi-user interactive systems (movie watcher chat, etc.), web browsing (optionally with the assistance of player-implemented web page rendering and/or browsing capabilities), etc.

UINT32 TRAP_SockSend(UINT8 *buf, UINT32 len);

This operation sends the data pointed to by buf to the open connection.

UINT32 TRAP_DeviceDiscovery(UINT32 dev, UINT32 qID, UINT8 *buf, UINT32 *len);

The player environment discovery procedures (TRAP_DeviceDiscovery and TRAP_DeviceAccess) provide content code with information about the playback environment and provide the ability to control the environment. For example, the content may wish to perform operations such as (without limitation) determining player settings (such as the default player language, volume, brightness, contrast, output resolution, etc.); discovering what optional procedure calls are supported; determining the playback environment configuration (attached devices, active software drivers/programs, status of playback environment components, etc.); authenticating output devices; locating components (whether present locally, connected directly, connected over a network, etc.) and accessing optional or removable devices.

TRAP_DeviceDiscovery provides an answer to the question specified by qID for the device specified by dev. In order to learn information about the playback environment, the content code can ask each device a list of standard questions. Examples of supported questions include, without limitation: What qIDs (question IDs) are supported by the device? What are the device IDs of the device's parent and child device(s), if any? What are the device's roles in the system (storage, user interface, video display, speaker, portable, networking component, etc.)? What is the device's identity (serial number, manufacturer information, model, version, date, expiration date, etc.)? What are the device's certificates (and other cryptographic data and capabilities)? What cryptographic keys does the device contain (or have access to)? What roles (recording, retransmitting, displaying, etc.) of the device are currently in use and what roles are inactive? What protocols does the device support and what protocols (and protocol parameters) are currently enabled? Does the device support receiving executable code and, if so, what are the execution environment characteristics (interpreted vs. native, supported specification versions, multi vs. single-threaded, security certifications)? What is the device's current timer value (including time zone, etc.)? What configurable parameters does the device support and what are their current values? What is the device's status?

The standard question list may expand over time; devices that are manufactured before a certain question (qID) becomes part of the standard question list will respond to queries with that qID with the error code STATUS_QUESTION_UNKNOWN. Also note that questions on the standard question list will always have the most significant bit (bit 31) of qID clear. Question IDs with this most significant bit set are reserved for extended device-specific questions. (Content code that is designed to discover extended information about a specific device must be aware of that device's extended qID list and response methods.)

Calling routines should pass the maximum length (in bytes) of the buffer pointed to by buf as the location indexed by len. The value returned in len will indicate the number of bytes actually written to buf.

When a device is connected to the system, the player assigns a device ID to that device. Disconnecting a device from the system does not cause the device ID to be lost or reassigned to another device. Device ID zero is reserved for the main player itself (although the player may have additional IDs as well). Device IDs are persistent until new media is inserted or TRAP_DeviceDiscovery is called with a Device ID (dev) of zero. When TRAP_DeviceDiscovery is called with dev set to zero and qID set to zero, all currently assigned device IDs are discarded, a rescan of all devices is performed if appropriate, and device IDs are freshly assigned. Changes in devices or device configurations typically generate an event (obtained by TRAP_EventGet).

Information provided by TRAP_DeviceDiscovery may be used by content code in determining whether to play, determining how or what to play, deriving decryption keys or other cryptographic parameters, transforming data that will subsequently be executed as code, identifying (or working around) compatibility problems, assessing risks, determining player capabilities, identifying user preferences, and performing other security and non-security roles.

TRAP_DeviceDiscovery should not change the state of the system; operations that change the state of a device should use TRAP_DeviceAccess.
UINT32 TRAP_DeviceAccess(UINT32 dev, UINT32 opID, UINT8 *buf, UINT32 *len);

This operation requests the device operation specified by opID to be performed by the device specified by dev. Operations are typically device-specific. This TRAP (and/or the socket TRAPs) are typically used for message passing between or within devices, as well as for setting configuration parameters and generally managing the playback environment. The contents of the parameters passed depends on the opID. The buffer (buf) may be used for passing information from or to content, or both, depending on the opID.

TRAP_DeviceAccess may be used to implement a very broad range of capabilities. For example security parameters (such as keys and other parameters that affect how the data is loaded from physical media) can be specified using TRAP_DeviceAccess. The operation is also used to interact with remote devices and other components (including both hardware and software components), including without limitation transmitting data, receiving data, performing key agreement, determining revocation status, performing authentication, changing configuration states, controlling power management features, terminating/controlling processes, etc.

For example, TRAP_DeviceAccess may be used to transfer a copy of a movie to a remote device. The content code running on the sending device could first identify the destination device and the appropriate operation ID for the transfer. It would also perform any device authentication, key exchange, or other required security operations. (Although security analysis is most commonly performed prior to transfer, key distribution and other security-related processes may additionally or alternatively be performed during or after the main data transfer.) Next, it would submit portions of the movie (optionally along with interpretable code, if supported by the recipient) to the remote device. The format of the data sent is negotiated by the content code and the destination device and ultimately controlled by the content code. For example, the content code doing the transmission could chose from a plurality of formats supported by the destination device, rescale or otherwise transform the content, embed forensic marks in the content, and decrypt/re-encrypt the content prior to providing it to the destination device. Code sent with the content may also be different from the code actually being interpreted by the sending device (e.g., if the interpreters are of different types, perform different roles, etc.). Code, keys, data, and other portions may also be omitted or modified, e.g. to remove functionality that is not supported by (or authorized to be performed by) the recipient device, such as the ability to make subsequent copies. Code or data can also be provided in encrypted form and does not need to be decrypted by the sending content code. (n some cases, the sending device may not even have access to the decryption key.) Typically content would be loaded by the sender in portions from the media, subjected to any necessary security processing or other transformations, then output. The recipient device may also be running interpreted code. For example, a device-to-device transfer may involve first transmitting some initial code to the recipient, which would perform any required security checks on the recipient then manage the receipt subsequent data. (On the receiving end, for example, TRAP_DeviceAccess may be used to receive the data and store it, e.g. in a file system, or TRAP_CodecOutput may be used to display the data.) Even when sending to non-programmable devices, the sending code can perform security and revocation checks, manage security portions of the interface protocols, etc. In some situations (e.g., if the devices and the transfer protocol are newer than the content code), the content code may allow the devices to manage the security of the transfer process while overseeing the process to the extent necessary and/or practicable (e.g., by accessing details of security processes and preventing the transfer if a security problem is identified). Transfers may be accompanied by an NVRAM slot write, media write, handshake with an external server, or other process, e.g. to enforce the limitations such as "copy once" policies.
UINT32 TRAP_RunNative(UINT8 *signature, UINT32 sigLen, UINT8 *code, UINT32 codeLen);

This operation is intended to allow content code to execute native code on the player. Players may require that native code be digitally signed by the player manufacturer or another trusted party. (This is done to prevent malicious content from running malicious native code.) Operation of the native code is typically specific to the player implementation (or whatever other device(s) ultimately end up running the native code). As a result, the content code typically uses information about the player's characteristics (e.g., determined from TRAP_DeviceDiscovery) to determine what native code is required by a player (or, conversely, whether a player is compatible with some native code).

Examples of uses for TRAP_RunNative include, without limitation:

Installing software updates to players or other portions of the system (e.g., by writing updated code to a nonvolatile memory contained in a consumer electronics device, modifying a software program installed on a PC, etc.);

Updating keys or cryptographic parameters stored in the player;

Scanning the playback environment (memory, storage, etc.) for malicious (or potentially-malicious) software (such as video capture software masquerading as a video driver, media emulation software masquerading as an optical disc drive or other media input device, debuggers used to tamper with executing programs, any active software that is not correctly reported by TRAP_DeviceDiscovery, any software lacking a valid unrevoked digital signature, etc.);

Detecting whether malicious (or potentially-malicious) modifications have been performed on a device (such as unauthorized firmware changes, reconfiguration of FPGAs, replacement of hardware components, etc.);

Verifying that a device is of the type expected given its certificates, public keys, symmetric keys, and other cryptographic attributes (see below);

Providing work-arounds to bugs (such as deficiencies in the player's overlay/menu capabilities, memory leaks, memory corruption problems, incorrect interpreter operation, performance problems, security policy interpretation deficiencies, etc.); and Enabling direct access to peripherals (e.g., to obtain otherwise inaccessible information about the system or to modify the system state in ways that are not supported by existing TRAPs).

TRAP_RunNative can help re-establish security in situations where adversaries find a way to extract cryptographic keys from a type of legitimate player and use those keys with malicious software programs. In this scenario, it is usually unfeasible to revoke all vulnerable players' keys because many such players will be owned by legitimate users who would be upset to have their equipment revoked.

An exemplary media carries countermeasures to key extraction attacks and includes content code that operates as follows:

First, the content code on the media determines the player's alleged serial number by verifying the player's certificate. The player serial number implies both the type of the player and the specific cryptographic keys (e.g., in TRAP_Aes) that the player carries. (Some exemplary key management methods are described in the section "Exemplary Symmetric Key Management") Next, the content code verifies that the player knows the keys that it should know. (For example, this may be accomplished by invoking TRAP_Aes with src and dst pointing to a buffer containing encrypted code or data necessary for playback, with len containing the length of the buffer, with key pointing to the value of the buffer's decryption key that has been encrypted with the player key of interest, and opOrKeyID referencing the player key. Multiple TRAP_Aes calls can be performed, including where output from previous operation(s) is used to formulate inputs to subsequent operations. Other steps may also be included, such as performing a TRAP_Aes operation with a constant input then "correcting" the result by XORing or adding a "fixup" value.) For vulnerable players' keys, the key verification step should fail (or at least not complete fully), as these players require additional authentication to distinguish between situations where playback is being performed on a vulnerable player from situations where playback is being performed on a malicious player using keys extracted from a vulnerable player. This may be performed by performing a TRAP_RunNative that runs native code configured to distinguish emulated vs. legitimate players then modify the interpreter state according to the result (e.g., by returning a result value, decrypting or otherwise processing part of the interpreter's memory area based on the result, etc.). Alternatively or in addition, native code can have effects outside of the interpreter, e.g. by communicating with external devices, modifying what is output (e.g., to introduce forensic marks), etc. The operation performed by the native code can then be required by the content code for correct playback, e.g. by incorporating or otherwise requiring results in the derivation of decryption keys for video or required code/data.

Unless an emulator is perfect (an extremely difficult proposition, given the complexity of modern computing devices), it will be possible for native code to distinguish successfully. Examples of characteristics that native code can use to distinguish legitimate from emulated players include, without limitation: the ability to run native code of a particular type, values stored in hardware registers, effects from modifying hardware registers, memory contents and checksums/hashes, behavior when performing non-standard operations, correct implementation of vendor-specific security features (for example, an undocumented security capabilities in a video decoder chip), codec rounding errors, the handling of error conditions, optional user interface components (such as LCD displays or keyboard inputs), the presence of capabilities that are absent on legitimate devices, and the performance and timing of operations. In an exemplary embodiment, content specifies native code that performs one or more player security tests, derives a key based on the test results, and uses the derived key to decrypt a portion of the interpreter's memory area. The content code is then configured to play correctly if all (or a sufficiently large number) of the native code's checks indicate that the player is legitimate. If the player is not legitimate, the content code and/or native code may halt playback, report an error, require additional authentication, require a player upgrade, refuse to decode the end of a movie, disable bonus features, play at reduced resolution, or respond in other ways that reflect the higher risk associated with the playback environment.

UINT32 TRAP_Vendor Specific(UINT32 select, ... );

This operation is intended to allow player makers to add support for their own security and non-security operations. By way of example (and without limitation), some embodiments may provide file access (opening, reading, writing, seeking, closing, setting attributes, etc.), access to vendor-specific security operations (such as non-standard cryptographic support, auxiliary cipher transformations, security features in hardware video decoding circuits, etc. that can serve as a backup in case the primary cryptographic capabilities are compromised), access to specialized capabilities (3-dimensional displays, odor outputs, joystick vibration, etc.) that are not available through TRAP_DeviceAccess, access to raw frame buffer contents, etc.

Integrated Security Services

Exemplary embodiments can allows a licensing entity (or other entities) to provide an integrated suite of security services for content authors. While security services can be provided by content owners themselves, outsourcing these capabilities to a third party can reduce the need for content owners to be involved in the process while allowing economies of scale, e.g. by enabling one security provider to service multiple content owners. Regardless of whether security services are provided by a single entity or multiple entities, relevant tasks may include (without limitation):

- developing security code or services that combine audio-visual content with security countermeasures, decryption logic, forensic mark embedding functionality, enforcement of revocation policies, integration with nonvolatile memory capabilities, and integration with non-security features user interfaces;
- using automated search tools and/or manual processes to locate potentially pirated material available over computer networks and other distribution channels, manually and/or automatically examine and analyze pirated copies to recover information embedded in forensic marks, then use recovered information to gather information about pirates' devices or methods;
- collect, archive, and analyze other information about piracy, e.g. by analyzing pirate software/devices and discussions among pirates (e.g., in on-line chat rooms);
- use information collected to help mitigate piracy, including without limitation by revoking pirate devices, formulating countermeasures against pirate attacks, assisting with prosecutions against suspected pirates, etc.;
- managing revocation lists of keys, players and other components, such as those that are suspected of being compromised, insecure, involved in piracy, or otherwise should not be used for decrypting content. Such lists may be managed electronically and include without limitation multiple parameters associated with the status of each entry so that revocation data can be customized to meet the risk profiles associated with individual titles, processes, etc.;
- generating or obtaining inputs/outputs for block decryption operations (such as TRAP_Aes), e.g. for authoring content such that it can only be decrypted by unrevoked devices;
- developing or managing of countermeasures to attacks, including attacks against specific players. For example, in a format where native code based security countermeasures must be developed and digitally signed by player manufacturers, such service may include without limitation identifying situations where such countermeasures are required, providing information about risks to manufacturers, assisting with countermeasure development, providing testing (including security and compatibility testing) for countermeasures, developing code or policies for use by content to identify playback environments where each countermeasure should be used, integrating countermeasure code with other decryption processes and other security features (e.g., to prevent countermeasures from being skipped or bypassed), and combining countermeasures from a plurality of separate player types/makers on media;
- managing data associated with nonvolatile memory slots, including keys, code, identifiers, security policies, and other attributes;
- operating or integrating with on-line or other network-based or interactive components (e.g. for providing enhanced user or player authentication steps when decoding involves one or more devices or environments with questionable security);
- performing quality control on completed media;
- integrating content with special marketing features, user features, non-standard features present on individual platforms, etc.;
- performing player compatibility testing;
- development and integration with code for detecting players with problems (including without limitation menuing bugs, codec limitations, display limitations, non-working features, correctable security defects, etc.) and deploying appropriate work-arounds (which may include avoiding affected operations, using simplified features that are unaffected, installing a player patch, and executing native code to address the problem);
- integrating with replicators to ensure that media are produced correctly with the appropriate code and data to effect the features described above; and/or
- providing any manner of other tasks to assist content owners, player developers, users, law enforcement, or other parties.

Forensic Marking Embedding and Recovery Techniques

To get the best possible security against relatively large-scale collusion attacks (i.e., attacks whereby adversaries combine decoded outputs from multiple decoding devices, typically with the intent of obliterating forensic marks that could otherwise be used to identify and revoke the colluding devices), it is often advantageous to have the ability to introduce a relatively large number of variations in the output. Storing a completely separate version for a complete MPEG-2 video GOP is certainly possible, although the storage requirements become prohibitive if large numbers of alternate video sequences must be stored (such as several million of substitutions across a movie). To accommodate such situations, it is advantageous to minimize the amount of storage required.

Although the specific requirements and attributes required for forensic marks vary depending on the situation, desirable attributes typically include that the underlying variations be represented compactly (meaning that comparatively little storage space or bandwidth is required to encode the variation), be durable (meaning that the variation can be recovered from degraded copies, such as a copy produced by using a consumer camcorder to record from a television screen), be plausible (meaning that they cannot be automatically identified and removed by inspecting the output), and that they be artistically acceptable (meaning that the variation does not unduly detract the quality or experience of the content). These requirements may vary (e.g., among titles, content authors' requirements, playback environment characteristics, etc.).

For an exemplary optical video disc supporting forensic marking, the content author locates or generates a plurality of substitutions (or other modifications) that may be applied to the compressed video. These substitutions are identified as part of the video compression process, where the video compression process is modified to identify potential variations then evaluate their suitability among a plurality of criteria (e.g., storage size, durability, plausibility, artistic acceptability, etc.). If the variation is suitable, it is output as a suitable variation. For example, the compression logic may be configured to identify locations where varying the value of a single bit (or a single byte, single word, single block, etc.) will produce a suitable alternate video sequence.

In an alternate embodiment, a conventional compression algorithm may be employed and substitutions may be generated and validated as a post-compression step. For example, automated software may be employed to (a) identify candidate modifications to the video stream, for example by using a (pseudo)random number generator to select an arbitrary byte of the compressed video and a new value for the byte, (b) perform a trial decompression of the video and, if the stream was rendered invalid by the change, reject the candidate modification as invalid, and (c) compare the output of the trial decompression with the result of decompressing the original stream and reject the candidate modification if the difference does not meet the requirements. For example, step (c) may reject modifications that are too small (i.e., not durable enough) or too large (i.e., not plausible and/or artistically acceptable). Additional tests may be performed to verify that modifications will not interact with each other (e.g., in some situations, modifications may be acceptable if applied separately, but not if applied together). Modifications that pass the tests are saved.

When authoring an exemplary media that uses forensic marking, an initial compressed video data stream is prepared. This data consists of the main compressed video, optionally with some modifications applied already (which may optionally include some substitutions or other modifications that corrupt the video). Data structures are prepared that identify valid modifications to the video (e.g., applying modifications that were identified previously but not applied, or undoing modifications that have already been applied), including any modifications that are mandatory to make the video playable. Substitutions may be very compact (e.g., a 24-bit byte offset in an MPEG GOP and an 8-bit substitution value can be represented in 4 bytes), enabling literally millions of changes to be defined in just a few megabytes of data.

The content author then prepares program logic for selecting and applying variations based on playback environment characteristics. This program logic should be configured to apply changes to the video sequence, where the combination of changes applied is typically based on information that would be useful for forensic purposes (such as serial numbers, values that cryptographically identify devices, model/manufacturer information, information about connected devices, etc.). In addition, the program logic should may be configured to apply any changes necessary to produce a valid video stream (at least when operating in an acceptable playback environment). (Having "mandatory" changes may be useful to help thwart attacks where adversaries attempt to disable content code portions that apply changes.) Content code logic may include the use of cryptography, e.g. to use player keys to decrypt substitution sets only on players that should apply those substitutions. Similarly, content code may include the use of error correcting codes, e.g. to enable a party recovering marked video to recover player information even if mark recovery is unreliable (e.g., due to attacks or degradation). The values embedded may include digital signatures, MACs, or other values that authenticate the information embedded so that a party recovering the mark can have confidence in the validity of recovered information.

When a pirated copy is recovered, the content author can analyze the copy to identify the variations present. While this analysis may be done manually (e.g., by comparing frames of the pirated video with each of the possible variants at each location, then mapping the list of variations back to playback environment characteristics), the analysis process can be automated for better efficiency and to enable the analysis of marks of greater complexity. An exemplary automated forensic mark analysis system is implemented using a computer with customized software. The analysis software begins with the original compressed video, the list of modifications, and a digital representation of the recovered pirated video. Next, the analysis software matches frames in the original video with frames in the pirated video, and identifies the transformations (rotation, scaling, bending, color shifting, intensity adjustments, time shifting, etc.) to most closely match frames of the pirated video with corresponding frames of the original video (and/or the original with modifications applied). The analysis software then compares the pirated video frames (or parts of frames, or sets of frames, etc.) against the corresponding portions of each of the variants of the original video. The software then computes a score based on the similarity/difference that indicates how closely the recovered video matches each variation. This score may, for example, be computed using the least squares difference between the (transformed) pirate video images and the variations of the original. In computing the scores, regions that are unaffected by the change may be ignored, and further adjustments may be made for distortions such as interlacing, inter-frame blurring, etc. The image analysis software may also provide a "manual mode" user interface that allows an operator to view frames of the pirate video (with or without adjusting transformations) next to the original video's variants (with optional magnification and highlighting to assist with visually locating variations) and provides user interface options to allow the operator to select which variation is present in the pirated video (or to indicate that the variation is unknown), to move frames forward and backward in each video source, to quickly advance to the next variation, and to save the current program state. The output of the image analysis process (whether performed manually or automatically) is a list of relative scores assigned to the possible variations that may be present in the video. (A simplified form of this is the case where the output simply identifies the most probable option for each variant.) Automated and/or manual processes are then used to convert the recovered variation data into information about the playback environment. For example, if the mark embedding was originally based on the output of an error-correcting code applied to the player serial number, the recovered selection values can be converted into input to an appropriate decoding process that will recover the serial number (assuming that the number of errors is not excessive). Similarly, if the selection process is performed using a pseudorandom number generator (PRNG) seeded with a portion of the serial number, then the analysis process may involve correlating PRNG outputs using each possible seed value with the observations from the pirate video.

Variations may also be embedded in content using other means than modifying the compressed video stream. For example, content code may introduce modifications by directing the player to overlay images on top of the decoded video. For example, a forensic mark can be embedded by drawing one or more translucent overlay frames on top of MPEG-2 decoded video (or, similarly, by having content code directly or indirectly modify output frame buffers(s)). Overlays can also be highly-visible. For example, a dynamically-generated moving translucent overlay stating "Screener for FirstName LastName's. Do Not Copy." can provide an overt deterrent to piracy and can be produced by determining the viewer's name (e.g., from an optical disc's burst cutting area, from NVRAM slots, from a server, etc.) and displaying the appropriate overlay. Overlays can also be used to correct or modify uncompressed video, e.g. by drawing over (intentionally) defective portions. Overlays can be very efficient with storage space on the media since the amount of data required to represent the code for drawing an overlay can be very small. Overlay-based marks make it efficient to generate video portions that have a large number of variants (e.g., a small portion of a single video frame can be easily made to uniquely identify the player by briefly overlaying a representation of the player serial number in that area). Overlay-based marking can also simplify making marks that vary widely, since (for example) there may be a wide range of options for the screen position (x,y) and time when a faint translucent overlay image may be displayed. These characteristics can be particularly helpful in identifying devices in situations where pirates may try to conceal the source of their copies by combining output from multiple players. Forensic marks can also be embedded in other data, including without limitation audio, still images, control data, media write patterns, etc.

Media and Content Authentication

Content code and/or the player may cryptographically authenticate the media when it is inserted and/or when data is loaded thereafter.

In an exemplary embodiment, all or some individual data portions of the media (e.g., sectors) are digitally signed using a hash tree. The root hash is digitally signed by an entity overseeing the format (or another trusted entity) and placed on the media. The root hash signature may also identify the replication and/or mastering facilities, the copyright owner, issue dates, criteria describing player devices that are authorized (or unauthorized) to access the media, and other such information. When data blocks (e.g., sectors, GOPs, tracks, files, etc.) are loaded from the media (or thereafter), they may be validated by the drive, content code, player application, and/or other player device/portion by combining the loaded data with the appropriate intermediate hash values to recreate the root hash. The value of the root hash may be cached after the media signature is verified so that the (relatively slow) public key signature verification step does not need to be repeated for each read. Similarly, intermediate hash values may be stored with data blocks, cached, computed as needed, or retrieved from the media. Media may also contain multiple root hashes, or may use other authentication schemes (such as by verifying digital signatures on each sector, GOP, or other data portion). To reduce the storage overhead, signature and padding schemes may be employed that allow for message recovery. Digital signatures can also authenticate portions the disc's content, such as the boot code contained on the disc or data stored in (re)writable portions, or all data.

Signatures (or other cryptographic or non-cryptographic values) can also specify or limit the operations may be performed by a particular disc or code portion. For example, a digital signature may be issued by a licensing authority that authorizes and enables content to access particular player features or capabilities. Such authorizations may be used to ensure that licensing fees have been paid or to deter the production of unauthorized pirate media. In an exemplary embodiment, each content author (or its replication facility) wishing to mass-produce optical discs containing a movie would provide the licensing entity with information identifying the discs to be produced. Such information could include without limitation the title, identity of the legal copyright holder, number of copies to be authorized, the hash of at least a portion of the disc contents, media serial numbers, the desired capabilities required, and a digital signature authenticating the request. In response, the copyright holder would receive one or more digital signatures authorizing production of the media. The licensing entity can also receive and process payments from the content author (or its agent). In this way, it is possible for licensing fees to be tied directly to the specific capabilities (security or otherwise) actually used by the content. Restrictions imposed on the operation of the content code can also be based on non-cryptographic flags (e.g., analogous to the broadcast flag used to indicate whether broadcast television signals are can be copied). Permissions can also be based on prior actions (e.g., denying access to network resources by content code that has accessed private user information to that ensure that user privacy is maintained, granting greater access to content code that has obtained the user's permission or obtained authentication from a remote server, etc.), and can be different for different threads, content code portions, etc.

Digital signatures may be distributed with content or separately, and may be placed on any portion of media and may also be accompanied by encrypted keys, logic for deriving decryption keys, security policy information, etc. For example, in the case of optical media, it may be advantageous to place a digital signature on a portion of the media that can be written separately for each disc (thereby providing authenticated unique disc serial numbers, e.g. for use with media revocation capabilities, to expressly specify which devices should be able to play the media, etc.).

For media containing nonvolatile memory (EEPROM, Flash, etc.), unique data may be stored normally, while other media types may require other techniques. For example, stamped optical media can carry data in a burst cutting area (BCA), which is typically written using a high-powered laser. Patterns of intentional defects or changes can also be introduced in the media surface and read by players and/or content code (e.g., by directly processing read results produced with error detection and error correction disabled). For semiconductor-based ROMs, fuses and other write-once features may be employed.

In addition to signatures and certificates, media-unique areas can be used to carry, without limitation: localization information, encrypted keys (e.g., keys that enable a specific player to decode the current or future media, e.g. as a screener, demo, or other disc intended for controlled distribution; keys that enable reading, decrypting, and/or writing to player nonvolatile memory data, etc.), unencrypted keys (e.g., written after production of stamped media to prevent decoding of media or data stolen by pirates from replication facilities), identifying information (such as a recipient name, e.g. for display in overlays and use in forensic marking), marketing and promotional data (e.g., values enabling participation in trials, sweepstakes, on-line services, etc.), telephone numbers, data network addresses, executable code, or any manner of other cryptographic or non-cryptographic data that may be used by content code and/or players. When loading data from disc-unique areas, the drive may apply one-way transformations (e.g., a SHA hash, an HMAC-SHA keyed with a value specified by content code, an RSA public key operation, etc.) so that it does not output (e.g., to applications or content code) the information required to forge the contents of the disc-unique area. Recording devices can also use hashing or other cryptographic transformations to block adversaries from using information extracted from legitimate media to produce exact illegitimate copies. Media-unique areas can also be pre-recorded (e.g., with serial numbers on blank consumer-recordable media) or written by recording devices (e.g., with a identifier of the recording device, which may be digitally signed, that may be verified by legitimate devices to ensure that the recorder is not revoked and may be used when illegal copies are recovered to identify and/or revoke the recording device(s) used to make them).

For media formats that support media authentication and anti-forgery techniques (such as modulating pit characteristics or wobble track contents, as outlined in U.S. Pat. No. 6,646,967), values derived from these characteristics may also be read (or detected) by the player and authenticated by the player and/or the content code. After reading the physical characteristic(s), the drive may apply a one-way cryptographic transformation prior to outputting this value so that a malicious party knowing the transformed characteristic lacks the ability to forge the underlying characteristic in a way that will be accepted by unmodified drives. Content code (and/or the drive, the player application, or other components) can authenticate the transformed characteristic (e.g., by verifying that the media carries a signature from a trusted party with the characteristic's value).

Bootstrapping, Security Analysis, and Playback

The actual operation of an exemplary player with an exemplary optical disc will be described, beginning with the insertion of the disc into a drive. The interpreter is first bootstrapped by loading and executing an initial portion of code and/or data from the disc. This initial portion can be small and simple, e.g. it may simply notify the user that the title is loading then begin loading additional code and data from the media into the content's memory area. This code may in turn load additional code (e.g., it may check the player type then load code specific to that player type). Any number of code loading checks may be performed, depending on the player design and the media. Players may also detect the case where inserted media lacks code (or characteristics required to run code) and, if so, play the disc using capabilities built in the player. Such support is, for example, useful for enabling playback from legacy media formats such as DVD, CD, DVD-Audio, etc.

The exemplary media then uses the player's cryptographic interfaces (e.g., TRAP_Aes) to derive one or more title-specific decryption keys. The content code is configured so that only non-revoked players are capable of deriving valid decryption keys. (To accomplish this, the content code may use, without limitation, techniques such as broadcast encryption, key-encrypting-keys, obfuscated software, etc.) These decryption keys may then, for example, be used to decrypt additional encrypted code, video, or other data. Bootstrapping may also include loading data from media, uncompressing data as necessary, and performing any manner of security analysis operations (discussed in further detail in the following subsection).

Actual playback then typically includes repeatedly performing a variety of steps or checks, which may include without limitation:

Handling events. This may include detecting and processing user interface events (such as keystrokes, remote control button presses, mouse movements, pointer/cursor movements, selection inputs, etc.) and other events (for example, power-down requests/notifications, hardware reconfiguration requests/notifications, software change requests/notifications, error alerts, media eject requests/notifications, etc.) (See TRAP_GetEvent.) The appropriate method for handling an event may depend on the event, the title, player attributes, and the state of the playback process (e.g., the logic used to process events when a menu is displayed may be different from the logic used when video is being played). For an example, some events may (without limitation) be handled by switching to new video streams, changing player configuration bits, requesting actions (e.g., calling a "media eject" TRAP in response to an eject request), updating menus, changing (e.g., animating, updating, etc.) overlay graphics, initiating/updating/etc. network connections, changing playback configuration (playback speed, etc.), loading and running new content code, jumping to a new location in the video stream (which may require changing/clearing buffered media requests, purging data buffered codecs, etc.), terminating playback, performing security checks, displaying an error, etc. Some events may also require that the content code check that the requested operation is authorized. Operations that cannot be performed immediately may be buffered until they can be performed. Some events may also be ignored.

Managing the media interface. In an exemplary embodiment, media handling routines are responsible for ensuring that there is a steady supply of data available for the video and audio codecs and for other purposes. For example, if the media is an optical disc, the content code may check the status of the drive, retrieve data that has been successfully read, submit new read requests, clear read requests that are no longer necessary, provide hints to read-ahead capabilities or caches (e.g., to load data in each possible fork of an upcoming branch in the video in order to ensure uninterrupted playback), specify where in the content code's memory area (or elsewhere, e.g. a codec, frame buffer, decryption module, etc.) that data should be loaded, check for errors, direct how errors should be handled, specify cryptographic keys to the drive or other components, provide authenticating information in connection with a drive read/write requests, specify decoding parameters (such as error correction information, keys, sector address mapping, read head depth/focus/etc., file access privileges, etc.), etc.

Security processing: This logic may perform any additional required decryption or processing steps, such as deriving keys, authenticating loaded data (e.g., using MACs, hash trees, digital signatures, etc.), and running executable portions (e.g., security code associated with a particular portion of audio or video). This step may also include embedding forensic marks (e.g., by selecting which portions of the loaded data to output, making modifications to the data, etc.). In an exemplary embodiment, this operation includes deriving a key for an MPEG GOP, performing an AES decryption operation on the GOP's data, and using content code to do preprocessing and post-processing (reordering data, block XORs, substitutions, byte modifications, etc.) before/after the decryption to ensure that knowledge of the block AES key by itself would not enable an adversary to decrypt contents of the disc.

Transferring data to the codecs. This code may also detect and handle error conditions, such as situations where codec starvation cannot be avoided because the data required from the media is not available: This code may also detect the codec status to ensure that the codec buffers do not overflow or underflow, and to ensure that the media interface code is loading the correct data.

Handling overlays and special features. This logic is responsible for drawing and removing menus, overlays, subtitles, and similar features. It also handles picture-in-picture video and certain kinds of forensic marks (such as those drawn using overlays).

Special situations (such as games/puzzles, menus, handling of menu selections, hidden "Easter eggs", etc.) may require special code. If a multi-threaded interpreter (such as a Java virtual machine) is provided, separate threads may be used for different operations (managing events, overlays, video, etc.) and the interpreter's support for message passing between threads and/or shared memory areas can be used for synchronization and control between threads. Similarly, status checks and message passing may be used to ensure that the interpreter is synchronized with other components.

Players may also provide default handlers for various operations, e.g. to improve user interface consistency, reduce content authoring effort, increase performance, etc.

Upon completion (such as a situation where the user presses an eject button on a player), the content code may be notified of a pending shutdown. The content code can then notify remote devices, clean up its internal state (e.g., completing any required nonvolatile memory writes, etc.), and exit. If the content does not exit within a predetermined period of time (e.g., 5 seconds), the player device terminates the content code and ejects the media.

Security Analysis Operations

Content code can analyze the playback environment to look for security problems. This process typically includes obtaining and processing information about the player and other portions of the playback environment. This information may include digital signatures and/or cryptographic certificate(s) for the player or for other components that the content code can verify.

This information obtained from the player describes characteristics (or alleged characteristics) of the player and the playback environment. Some characteristics (such as the presence of a particular TRAP) are reported directly. Others may be inferred indirectly, e.g. the specific combination of cryptographic keys in a player may be partially or completely determined by the player's serial number. A player masquerading as a legitimate player but that lacks the correct cryptographic keys can be "caught in a lie" because it will be unable to perform cryptographic operations (decryption, signing, etc.) using the keys it lacks. Similarly, other inconsistencies can be used to identify problems.

Security analysis processes may be involved in a variety of playback-related processes, including the derivation of keys for compressed video, code, audio, and/or other data. For example, if legitimate players of a particular type support the ability to run native code (code running on a local processor in the machine, as opposed to code running in a standardized interpreter/virtual machine) and/or support undocumented player-type-specific computations, then content can use these capabilities to authenticate the player type. If the content discovers that it is running on a player that claims to be of a particular model but that cannot correctly perform operations that are supported by that model, then the content can reasonably conclude that it is running on a device that is masquerading as this player type, e.g. using keys extracted from a maliciously-compromised player of this type.

Security checks can involve analyzing any combination of components or attributes. For example, characteristics of the media, the media drive, and hardware components are useful to detect fake players. Content sold on pre-recorded or "stamped" media can query the drive to determine whether it is running on consumer-recordable media and, if so, refuse to play because this should never occur. If a particular title allows recording to consumer-recordable media in certain situations (e.g., if a payment is made), the content may only allow playback from consumer-recordable media if a valid digital signature (issued by the content owner's authorized representative) is present that, for example, expressly authorizes playback from media with a particular serial number and/or carrying a particular recording device's identifier.

Security checks can be performed on output devices, device drivers, and other playback components, including those that will (or may) receive content. This capability is particularly useful to address situations where content may be recorded using malicious or compromised output devices. Verification operations for output devices are limited only by the capabilities of the device. For example, output device verification may include, without limitation, sending native code to an input or output device (e.g., to detect security problems, fix bugs, etc.), performing cryptographic handshakes with other devices, testing devices' keys against revocation lists carried on the media, etc. Output devices may also request verification of the player, in which case appropriate verification may be provided by the actual player, the content code, or a combination of these (or other components). If multiple output devices are connected in a chain (e.g., a player device may send digital audio to a mixer, which provides the digital audio to an amplifier, which in turn provides analog output to speakers), each device may provide information to the player about what it plans to do with the content and allow the originating (or other) device to pass messages through to subsequent devices. In this way, content code can authenticate each device in an arbitrarily long chain (or network) of devices involved in the playback process. If an untrustworthy device is detected (or a device that is not authorized, such as a recording device), the content code can ensure that an appropriate response is made (including, without limitation, refusing to play, refusing to output to the untrusted device, directing intermediate devices to not send content to the untrusted device, reconfiguring the untrusted device to correct the problem, reducing output quality, performing additional security authentication steps, etc.) If a connection to the Internet or another data connection is present, security checks can include downloading additional security-related information from a remote site. Similarly, remote devices and local storage (e.g., NVRAM can also be used to obtain useful information such as fresh certificate revocation tables or digitally signed security code that is more recent than code on the media.

While security checks are typically performed prior to playback, content code can perform security checks at any time. For playback environments that may be reconfigured, or in situations where other new security-related information may become available, it may be advantageous to periodically or constantly perform additional security checks. If a major change is detected, content code may terminate playback or pause playback until confidence in the playback environment can be reestablished.

A table or decision tree may be employed to rapidly select which security analysis code (if any) is appropriate given a particular player attribute. Security code that is not applicable to the present player does not need to be run (or even loaded from the media), preventing any unnecessary performance impact and preventing compatibility problems that might result from running security code on a player that does not support it. As described previously, security checks can be bound to cryptographic key derivation operations (e.g., where devices requiring a particular security check must actually perform the check to derive a necessary key correctly, while devices that do not require the security check are able to directly obtain the key).

Exemplary Key Management

An exemplary player is initialized by its manufacturer with a unique combination of keys. These keys are obtained from a key management authority which is authorized by an entity that controls the media format. The key management authority receives requests from authorized manufacturers, validates the requests, provides player key sets, and receives payment for the keys (and corresponding licensing fees). The key set for an exemplary player consists of 128 AES keys, each of 128 bits, that are derived from a top-level 256-bit AES key (known only to the key management authority), a 32-bit group ID (identifying the player's manufacturer), and a 32-bit device ID (identifying the player's serial number). The group and device identifiers together uniquely identify the player and are represented in the player's digital certificate(s).

In the exemplary embodiment, each of the 128 keys (key ID values 0 through 127) in the key set is derived by the key management authority by first computing a key selection block from the key ID, the group ID, and/or the device ID. The key selection block is then padded (if necessary) and encrypted using the top-level key. The resulting value may be post-processed (e.g., truncated), producing the actual key. The method used to derive the key selection block from the specified parameters depends on the key ID. The following table illustrates exemplary rules usable to transform the key ID, the group ID, and the device ID into the key selection block.

| Key ID | Contents of key selection block following key ID |
|---|---|
| 0 ... 31 | GroupID \|\| (DeviceID >> KeyID) |
| 32 ... 63 | (GroupID >> (KeyID − 32)) \|\| 0x00000000 |
| 64 ... 79 | KeySelector(GroupID, DeviceID, 15, 8) |
| 80 ... 83 | KeySelector(GroupID, DeviceID, 16, 8) |
| 84 | KeySelector(GroupID, DeviceID, 17, 9) |
| 85 | KeySelector(GroupID, DeviceID, 18, 9) |
| 86 | KeySelector(GroupID, DeviceID, 19, 10) |
| 87 | KeySelector(GroupID, DeviceID, 20, 10) |
| 88 | KeySelector(GroupID, DeviceID, 21, 11) |
| 89 | KeySelector(GroupID, DeviceID, 22, 11) |
| 90 | KeySelector(GroupID, DeviceID, 23, 12) |
| 91 | KeySelector(GroupID, DeviceID, 24, 12) |
| 92 | KeySelector(GroupID, DeviceID, 25, 13) |
| 93 | KeySelector(GroupID, DeviceID, 26, 13) |
| 94 | KeySelector(GroupID, DeviceID, 27, 14) |
| 95 | KeySelector(GroupID, DeviceID, 28, 14) |
| 96 | KeySelector(GroupID, DeviceID, 29, 15) |
| 97 | KeySelector(GroupID, DeviceID, 30, 15) |
| 98 | KeySelector(GroupID, DeviceID, 31, 16) |
| 99 | KeySelector(GroupID, DeviceID, 32, 16) |
| 100 | 0x00000000 \|\| DeviceID |
| 101 ... 127 | GroupID \|\| DeviceID |

An exemplary function KeySelector(GroupID, DeviceID, g, d) that assigns keys to pseudorandom device subsets (according to their group IDs and device IDs) is:

```
Let hash[0..19] equal the bytes of the SHA hash of KeyID || GroupID.
Let AND_MASK = (1 << g) − 1.
For i = 0 upto d−1:
    Let n = hash[i] mod (g − i).
    Clear the n^th set bit in AND_MASK.
EndFor.
Let XOR_MASK = hash[16..19] AND (AND_MASK XOR
((1 << g) − 1)).
Compute deviceHash[0..19] as the SHA hash of KeyID || GroupID ||
DeviceID.
Return 0x00000000 || ((deviceHash[16..19] AND AND_MASK) XOR
XOR_MASK).
```

Note: "||" denotes concatenation. "0x" denotes that the following is a 32-bit hexadecimal value. "<<" denotes a left-shift operation. "−" denotes subtraction. "AND" denotes a bitwise logical AND. "XOR" denotes a bitwise logical exclusive-OR.

Note that different kinds of keys are included. For example, key 0 and keys 101 through 127 will be assigned uniquely to the device. In contrast, keys 1 through 31 will be shared among increasingly large sets of devices of devices within the same group. Keys 32 through 63 are shared among multiple groups. Finally, keys 64 through 99 are shared among various (in this case, pseudorandom) subsets of devices. Key 100 is shared by devices across different groups that have the same device ID.

It is important that device keys be adequately safeguarded. For example, placing the device's actual keys on media risks compromising the players' keys if a title's security was compromised. Similarly, providing device keys to content publishers could put keys at risk in situations where a content publisher becomes compromised. To address these risks, the present invention does not require that entities that prepare and encrypt content be trusted. For example, the key management authority can provide a service whereby any party can identify a set of player keys and one or more input values. In response, the authority can provide the result of decrypting (or encrypting) the specified input(s) with each of the identified keys. Alternatively, the content publisher can provide plaintext/ciphertext pairs of its choosing. In either case, parties authoring content can obtain plaintext/ciphertext pairs, but not the keys themselves. These pairs may then be used in the production of secure media.

The production of an exemplary media includes the following steps: (a) the content publisher defines a set of player keys that are not known to any revoked player but where each valid player contains at least one key in the set, (b) the content publisher selects an arbitrary plaintext value, (c) the content publisher securely transmits to a key management authority the desired plaintext value along with identification of the keys in the selected set, (d) the key management authority verifies that the plaintext value has not previously been submitted by another party, (e) the key management authority derives each player key in the requested set and uses each key to encrypt the plaintext value, (f) the key management authority provides the resulting ciphertexts to the content publisher, (g) the content publisher encrypts a portion of the content (or some code, keys, or other data) with the plaintext value, and (h) the content publisher stores on the media the encrypted content with the ciphertext list and corresponding code that is configured to identify whether the player that is running the code contains any key(s) in the set and, if so: determines the key ID in the player; locate the ciphertext corresponding to the key ID in the ciphertext list; and decrypt the encrypted content portion, e.g. by invoking TRAP_Aes with the encrypted content portion as the source data, with the ciphertext as the key parameter, and the selected key ID value. The content code can then provide the decrypted result to the codec or otherwise use the data as appropriate.

Alternate embodiments can, without limitation, use multiple levels of decryption operations, integrate cryptographic results with forensic marking and other operations, use multiple key authorities, and use security code or other processes to further protect or process values (keys, plaintexts, ciphertexts, etc.), etc.

If public key cryptography is employed, the key management authority may provide (or publish) players' public keys (or, identity-based cryptography may also be employed to make key lists unnecessary). For digital signing keys, the key management authority can also provide reference signatures (e.g., message/signature pairs) for use by content code. Public/private keys can be shared among groups of devices (e.g., by using operations such as KeySelector as a seed for a strong PRNG used to generate keypairs, randomly generating and assigning keys, etc.)

Of course, the roles above may be divided among multiple parties. For example, the key management authority may also manage a centralized revocation list, making it unnecessary for content publisher to determine which keys are valid and which are not. Similarly, content publishers can outsource security-related tasks to other parties (including the key management authority).

The exemplary process above for deriving player keys is deterministic. Other embodiments may involve generating keys randomly and may use other techniques. The operations employed to derive keys (e.g., AES encryption) are exemplary and may be substituted with other operations (such as MACs, public key operations, other algorithms, etc.)

Versioning

When content is decoded, typically either (a) the content will be older than the player, or (b) the player will be older than the content. In both cases, provided that the player correctly implements all the required TRAPs (including any necessary cryptographic keys) and meets the security rules enforced by the code associated with the content, playback should occur normally. Of course, if content code is poorly-written, if the player is defective, or if serious security issues have arisen after authoring, then playback may not work automatically.

To address situations where content code is failing to play correctly on a legitimate player, content may (for example) be authored to check players for a disc-specific security override key and, if found, use the key to decrypt a content code portion that bypasses one or more security checks or other operations that would normally be performed. This "bypass" logic can be carried on media in encrypted form, ensuring that it cannot be used unless the decryption key is actually released. If an over-ride is required, the over-ride key may, for example, be stored in the player's nonvolatile memory (e.g. in encrypted form), be retrieved over a network, be accessed via a TRAP, etc. Measures that do not affect security (such as disabling graphical menus for players with display limitations) can be user-configurable and do not require secure authentication.

Content code may also be configured to enable users to address situations where security failures or risks are detected. For example, if a modem, Internet connection, or other data channel is available, the content can communicate with an authentication server to obtain updated security code and/or to obtain permission to proceed with playback. A code can also be displayed (or played audibly) that users can provide to an automated toll-free telephone service that provides an activation value. (The service can receive information via telephone, for example, by using voice recognition systems, by detecting DTMF tones, or by detecting sounds carried from the user's speakers into the telephone earpiece. Similarly, information can be returned to the user for keyboard entry, carried from the telephone earpiece to a microphone on the player, etc.) Responses can be verified by content code (e.g., by checking a digital signature, MAC, obfuscated checksum, etc.) and/or used in subsequent cryptographic processing (e.g., as a key). Challenge/response authentication results can be used with forensic marking, e.g. to enable copies to be traced back to a particular user or identifier. For example, if the activation value is unique and is included in forensic marks, then the content owner can use the forensic marks to trace recovered pirate copies back to the transaction that produced a given activation value. Thus, it may be advantageous for the content owner to obtain information about the user (e.g., the caller's telephone number using ANI or caller ID, name, credit card number, etc.) prior to providing an activation value. Activation values may be stored in the player's nonvolatile memory (e.g., for future use and for use by other titles).

Media Encoding & Decoding

In an exemplary embodiment, the content code can specify (through a TRAP) parameters required for reading and decoding data from the media. The actual processing of a sector read from optical media may include any or all of the following:

- The sector decoding parameters are provided to the optical drive (or other component(s) responsible for performing part or all of the sector decoding).
- The drive reads raw data corresponding to the requested data (e.g., a sector). The actual loading may include using a sector identifier (or other addressing information) to locate the data on the media, then actually loading the appropriate data from the media. The drive may also remove or process unencrypted portions (such as navigational fields) included with the loaded data.
- Error correction is applied to the raw sector data. The error correction process may involve an adjustable polynomial or other parameter(s). Content code may also disable error correction and/or detection, e.g. if it wishes to perform those operations itself.
- Decryption or other cryptographic transformations may also be included with the error correction, performed before ECC, and/or performed afterward. Decryption processes applied on non-error-corrected data may be chosen to avoid propagating errors. For example, decryption with a stream cipher (e.g., RC4 or AES in counter mode) may be performed prior to correction for bit errors. Decryption (or other processing steps) may be applied by the drive, content code, codecs, drivers, or any other component.

Decryption processes may also be chosen to have a one-way properties, e.g. to prevent adversaries from being able to use recorded outputs to compute outputs that would have been produced with other decoding parameters. For example, the drive may compute each sector's key as the HMAC-SHA of a 160-bit (or other size) lead-in value (which is not returned by the drive) using a content-specified key. Without knowledge of the lead-in value, adversaries cannot convert the decrypted output produced using known content-specified keys into the output that would have been produced using other content-specified key values. As a result, the adversary lacks the information required to copy the media or emulate it (e.g., using a hard drive and a malicious device driver). While it would be possible for an adversary to store decoded sector representations for specific key values, the copy/emulation will fail any time the content code requests a sector using a key for which the corresponding output is not known. Because the total number of decoding keys can be extremely large, e.g. $2^{256}$ for a 256-bit key, it is impossible for an adversary to store all possible sector decodings. Content code can perform varying combinations of requests and, for some of them, use or check the actual data loaded.

Players (or other components) may perform asymmetric cryptographic transformations on sector data. For example, block signatures may be employed to prevent adversaries from mastering new titles without permission. In one embodiment, the public key consists of a 2048-bit RSA modulus embedded in the drive (although it could also be obtained from the media, extracted from a certificate, etc.). To increase the efficiency of signature verification operations, the RSA modulus is generated to be close to an exact power of 2, e.g. with the most significant 128 bits equal to "1". While mastering media, each block (e.g., sector) is first randomized by exclusive-ORing the sector data with a keystream produced by seeding a stream cipher with the SHA hash of the media ID, the block's address, and the block data. The block data is then divided into 256-byte (2048-bit) chunks that are each digitally signed by performing a modular exponentiation on the chunk using the RSA private key. The signed chunks are recorded with the SHA hash. Thus, the block is expanded by only 20 bytes (less than 1% if blocks are 2048-byte sectors). Provided that the stream cipher randomizes effectively, the probability is negligible (about $2^{-128}$) that the modular exponentiation input will be larger than the public modulus. As a result, no special handling for this case is necessary. The corresponding verification and decoding process is performed when a data block (e.g., sector) is read from the media and decoded, and includes (a) reading the 256-byte chunks and the SHA hash, (b) performing a modular exponentiation operation on each chunk using the public modulus and public exponent (e.g., 3), (c) reversing the randomization process, e.g. by using the loaded SHA hash value contained to compute a keystream that is exclusive-ORed with the chunks; (d) verifying the integrity of the decoded data by hashing the media D, block address, and block data and comparing the result with the hash value that was loaded; and (e) if the hashes match, returning the decoded data block. If the hashes do not match, an error is returned. If performance is a problem, verification can be performed probabilistically (e.g., on randomly-selected sectors) and/or only on regions containing more critical data.

When writing to recordable media (or producing a master for reproduction), the recording device can receive a value that it transforms using a cryptographic one-way function (such as SHA, HMAC-MD5, one-way functions constructed using AES, etc.) and writes to a special location on the media (see below). In this way, adversaries cannot use legitimate recording equipment to copy media because they will not know the correct input (e.g., the hash pre-image). Other authenticating values (such as digital signatures) may also be stored. Security values may be applicable to any part (or all) of the media.

Media security values may be stored as ordinary data, or may be stored in a "special" area that includes additional protection from direct reading and/or is encoded specially. Because the quantity of security data can be relatively small (e.g., as little as 128 bits or less), storage techniques with relatively low density and performance may be employed. For example, it is known that data may be encoded in variations in the pit encoding or track locations ("wobble") of optical media. Data may also be concealed in redundant bits normally reserved for error correction, variations in sector durations, navigational fields, etc. Data may also be encoded on different physical disc locations (e.g., inside or outside the normally-readable area, or at a different focal depth).

Data on the media may include indicator bits, pit encoding variations, or other markers that indicate whether certain processing or security steps should be performed in connection with the data. For example, a sector security flag may be used to indicate that the data contained in that sector should be transformed with a public key and/or should only be released if the drive has first received cryptographic authorization. (Such authorization may include, without limitation, requiring the SHA hash of the sector contents, performing a successful challenge-response authentication with a recipient whose keys were not revoked when the media was mastered, verifying a digital signature authorizing the release of the data, receiving a key that decodes the sector correctly, etc.) Data may also be marked so that it may only be released in encrypted form. (This is particularly important in personal computers and other systems where data may travel across untrusted buses or channels.)

Although the exemplary embodiment above was primarily described with respect to optical media, similar techniques can be applied to other media types such as magnetic media. With solid state media (such as EEPROM/Flash memories) and other storage technologies where the media itself can perform computations, the media may perform cryptographic processing itself, and may also include a security interpreter internally that communicates with the drive, player application, etc. (which may also have interpreters). The media only needs to contain only the amount of nonvolatile memory necessary to actually store the compressed content (e.g., roughly 30 gigabytes for a high-definition movie), but it may use cryptography or other techniques to create a "virtual" or "emulated" address range that is vastly larger (e.g., $2^{256}$ bytes). If this is done, it becomes infeasible for an adversary to produce perfect pirate copies because storing (or even reading) the entire address range is infeasible and there is no general-purpose way for adversaries to determine how portions of the address range will actually be used. For example, in each playback the content code can require that different regions be used. This general approach can even be employed in situations where the main player application is not programmable, but where the media (or media drive/interface) is.

Conditional Access Keystream Forensics

Pay television receivers are commonly designed with the objective of placing all security-critical components in a smart card or other removable device so that security failures can be addressed by replacing the smart card. Typically, the replaceable module is used to derive decryption keys, which are provided to a general-purpose decryption circuit contained in the set top box. A major deficiency of conventional implementations is that an adversary could record the output from an authorized device and retransmit the keys (and any other required data) to an unauthorized device. A related attack involves recording and retransmitting the video itself.

Tracing such attacks can be extremely difficult or impossible. For example, compromised computers could be used by pirates to anonymously relay keys and data to unauthorized viewers via the Internet. Keys can be sent in UDP packets with forged "from" addresses, making tracing very difficult. Although the system operator could receive access to the unauthorized data by enrolling in a pirate service, there is no way to trace the source of the attack. In other situations, tracing the data may be practical, but the source may be located in a jurisdiction where law enforcement is ineffective.

With current systems, the sequence of decryption keys used to decrypt the video (as well as the decrypted video itself) is the same for each subscriber. These keys may be transported (e.g., from a conditional access smart card to a video decoder chip) encrypted with device-specific keys, but the actual video decryption keys are still global. As a result, an adversary who has compromised or reverse engineered one set top box (which isn't necessarily very difficult, since their design is often completely standardized) and who has a legitimately-subscribed account can determine and retransmit the sequence of video decryption keys. This attack does not typically require actually compromising the security module itself, preventing security module replacements from being an effective countermeasure.

To address such attacks, the system operator needs to identify the specific account (and hence the security module) that is being employed by the adversary to extract the keys and other data being retransmitted. Once this account has been identified, the system operator can terminate the account (e.g., by ceasing to transmit keys required for access in a form that can be utilized by the adversary's security module, by transmitting an encrypted message over the air that temporarily or permanently disables the adversary's security module, etc.) and any related accounts (e.g., accounts from devices connected to the same phone line, accounts sharing the same billing address, accounts with nearby physical locations, accounts paid for with the same credit card or other payment instrument, etc.)

To accomplish this identification, the operator of the system includes forensic marking information in the actual sequence of decryption parameters that are output by each security module.

In one embodiment, the conditional access module outputs conventional decryption keys along with byte substitutions to be applied to the decrypted plaintext by the set top box prior to video decoding. When creating the video sequence, the system operator identifies a plurality of locations in the video stream where byte replacement can create acceptable variations (polymorphs). In addition, some bytes in the video stream are corrupted such that byte replacements are mandatory to form a valid (or pleasantly viewable) video stream. Legitimately subscribed conditional access cards are configured to output unique combinations of byte substitutions, including a sufficient set of mandatory byte substitutions to recreate a viewable stream. Each module can output unique combinations of substitutions, making it possible to match retransmitted outputs back to a single device. Alternate embodiments do not necessarily have to use byte substitution; any manner of transformations may be specified by the conditional access module, including, without limitation, additions, exclusive-ORs, block movements, deletions, insertions, bit inversions, and more complex operations (including specifying actual code that should be executed by an interpreter or microprocessor the decoding device).

The method described above requires support in the set top box, and therefore cannot be used with many legacy systems. For legacy environments, a different embodiment may be required where the content provider assembles a stream that is valid when interpreted in each of two different keying states.

The content provider assembles a video stream portion that decodes acceptably when decrypted with each of two different keys (or keying states). Existing satellite or cable television systems typically encrypt portions of video (such as 10-second segments) each with a different key. For the present invention, one or more segments will be created that can be decoded with more than one key.

In one embodiment, the video compression process is modified to identify a plurality of acceptable modifications to an initial block of compressed video data. Next, the block is encrypted with a first key, producing a ciphertext that would be suitable for transmission to set top boxes decrypting with the first key. Next, the block is decrypted with a second key. If the resulting plaintext would also decode to an acceptable output on devices keyed with a second key, the block saved and the process is repeated with each subsequent data block. If decryption with the second key indicates that the ciphertext would not be amenable to forming an acceptable stream on devices keyed with the second key, a new value for the starting block is attempted. With enough attempts, the system operator will be able to gradually assemble a video stream that can be decrypted with each of two (or possibly more) keys. The quality of the resulting video with each key will depend on the computational effort expended, the techniques used to select candidate blocks, the video compression techniques employed, the reference video, and other factors.

More computationally-efficient encoding methods are also possible. For example, within most video compression schemes (including MPEG-2), it is possible to use fields (such as comment fields) to interleave data regions that are encrypted with each key. This technique typically increases the size of the video data, but can be computationally efficient and does not degrade the output quality.

An exemplary video stream begins with conventionally-encoded data (e.g., digital video and/or audio that is encrypted with a single key or unencrypted) up through a location where a key change is expected. A key change signal is then encoded. The first ciphertext block after the key change is chosen so that (a) using a first decryption key, it decrypts to a suitable value for the next 8 bytes of the compressed video stream, and (b) using a second decryption key, it decrypts to a bit sequence that directs the decompressing device to ignore subsequent bytes (e.g., by starting an MPEG comment) or otherwise cause the subsequent bytes have relatively little effect on the decompressed output. To find a block with these properties, the compressing device or process may (for example) begin with the desired plaintext when decrypting with the first key then attempt random values for the first and/or second keys until a pair of keys is found that gives a suitable result with the second key as well.

A subsequent portion of the stream is generated such that the ciphertexts (a) yield compressed video decrypted with the first key, and (b) are ignored (or processed with relatively little effect) when decrypted with the second key. This stream may be prepared by encrypting the video data with the first key and (if necessary) decrypting the resulting data with the second key to verify that the result is appropriate (e.g., does not prematurely terminate an MPEG comment). It may be necessary to make small adjustments to the plaintext and iterate to correct any situations where an inappropriate plaintext appears (e.g., that would prematurely terminate the ignoring of the data, or would convey an inappropriate length, or otherwise would create an illegal stream, or would cause an unaesthetic interruption of the stream, etc.). Eventually (such as when an MPEG comment's end is approaching, when the video block being encoded with the first key is nearly complete, etc.), the ciphertext stream can include data that, when decrypted with the first key, causes the decompression process to begin ignoring data. At this point or soon thereafter, the "ignore data" state with the second key ends, and the stream continues with ciphertexts that yield valid compressed video when decrypted with the second key, but are ignored when decrypted with the first key. The stream continues, alternating segments of data that yield compressed video when decrypting with one of the keys and yield comment data when decrypting with the other. Eventually, a key change is triggered (e.g., due to a key change notice present in the stream), either reverting to normal video or beginning a new segment of video that can be decrypted with a new pair of keys.

If the adversary is only retransmitting key sequences it may be acceptable if the two decryption results yield the same video when decompressed. If adversaries are retransmitting the decompressed video, however, then the video sequences produced by decrypting with each of the key values should be different.

Note that alternate embodiments can include data that can be decrypted correctly with more than two keys, or that can be decoded using more than one cryptographic algorithm (with the same or different key values). Examples of supported decryption algorithms may include without limitation DES, AES, triple DES, the DVB block cipher, IDEA, any other block cipher in any mode (CBC, ECB, etc.), RC4, SEAL, any other stream cipher, etc.). For embodiments where encryption can be disabled on the set top box, the encryption-disabled state may be used as a keying state (e.g., where the transmitted data can be successfully interpreted as valid video in the form transmitted and also when decrypted with an appropriate key). The system operator can precompute compressed video sequences or portions usable in sequences (such as useful ciphertext blocks and corresponding keys). Streams can be assembled in real time or in advance. For example, video for common sequences (such as an all-black display) can be precomputed and inserted. If a key check is performed by decoding devices, the system operator may need to perform a search to locate multiple keys that can simultaneously pass the same key check. Such searches may be simplified using collision searching techniques that take advantage of the birthday paradox.

While the bandwidth required for the video stream typically increases for video segments encoded as described above, the overall bandwidth impact can be minimized by limiting the use to situations where a pirate attack that needs to be traced is believed to be in progress. If adversaries attempt to identify and delete video segments where the present invention is active (e.g., by analyzing the amount of ignored data in the stream), similar characteristics can be placed in ordinary (unmarked) regions to create "red herrings" to confuse attackers.

For systems that employ ciphers with unused bits (such as the parity bits commonly included in single DES or triple DES keys), forensic information can be included in these bits, though the effectiveness of this approach may be limited if adversaries can overwrite the values in these bits prior to retransmitting keys.

The logic employed to derive appropriate key values on device(s) should be implemented internally to the security device. Key derivation may be performed using software and/or rules that that are received over-the-air (e.g., in encrypted form and intermingled with video or other content). For example, prior to transmitting a block that can be decrypted in multiple ways, the system operator can transmit (individually and/or in groups) keys (or key-encrypting-keys) such that predetermined subsets of the viewing base have each key. These keys can be used to decrypt or otherwise derive the appropriate video keys on each device. Subsets may be chosen randomly and/or may be based on geographic location (e.g., based on the ability to receive spot beam satellite signals also used for transmitting local television channels, locations in a cable network, etc.), subscriber ID, telephone number, knowledge of one or more keys, device types, or any other characteristic (or combination of characteristics). Executable code may also be delivered (optionally in real time) for assisting with (or performing) key derivation/selection.

Specific steps and components involved in an exemplary embodiment for tracing the source(s) of maliciously redistributed keys and/or video include any or all of the following, in any order: (a) creating a portion of compressed, encrypted video that, when decrypted with each of two different keying states, yields at least two different plaintexts, and where each of the plaintexts can be correctly decoded as part of a valid compressed content stream, (b) transmitting control data to a plurality of conditional access devices, where said control data is configured to cause each of said conditional access devices to output one of said at least two keys, (c) receiving a key and/or video (and/or other data) retransmitted by said malicious source(s) that contains or corresponds to one (or more) of said keys; (d) using knowledge of which keys are contained in (or were used to produce) the maliciously-transmitted data to obtain information about the malicious source's security module(s), e.g. by inferring that the malicious source has a device capable of deriving the received key (or video); (e) using the improved knowledge of the pirate group to repeat some or all of the steps above until at least one malicious device has been identified; and (f) disabling said malicious device, e.g. by sending a "kill" message or by withholding future keys.

Although the examples above are described primarily with respect to the video portion of audiovisual content, the same techniques are equally applicable to audio and other kinds of content.

Examples of Attacks & Countermeasures

This section describes some exemplary attacks and countermeasures.

Adversaries may try to disable a player's overlay capability to prevent overlay-based forensic marks from being embedded in the output. One countermeasure to this attack is for content owners to embed marks directly in the compressed audiovisual data stream.

Adversaries may attempt to compare and combine outputs from multiple devices in an effort to remove forensic marks. For example, in locations where the devices' outputs differ, an adversary may attempt to combine the video, delete/degrade the video, probabilistically select an variant, select the most common variant, or use other techniques to produce copies that are more difficult to trace. If the number of colluders is known to be fairly small, the mark recovery processes can identify colluders by using each mark to exclude any groups of colluders where no member of the group would have been able to output the recovered mark. Content provider can also include forensic marks with many different variants (making averaging and selection difficult). Highly-visible forensic marks can also be used to gain increased resistance to degradation or obfuscation caused by malicious attacks. If necessary, subsequent content may need to be authored with improved forensic marking techniques. Content owners can also embed large numbers of marks and look for correlations between sequences embedded by individual devices and recovered copies.

Adversaries may attempt to emulate a legitimate player. A related attack involves modifying the interpreter in a legitimate player to operate in a (presumably malicious) incorrect manner. In this case, differences between the legitimate player and the emulation (including without limitation, undocumented operations, native code support, timing/performance, cryptographic keys, etc.) may be used to distinguish between legitimate and malicious environments. For example, a native code player update can also be deployed to correct the vulnerability.

Adversaries may attempt to extract digital content by compromising codecs, device drivers, display/speaker devices, or other components that either receive content immediately prior to, or after, decompression. Similarly, malicious versions of these or other components may be inserted. To respond to such attacks, future content can respond by authenticating output devices and refusing to provide content to compromised devices. Content can deliver security upgrades (such as native code patches) to vulnerable or unknown devices. Forensic marking may also be used to trace copies compromised in this manner, providing a psychological and legal deterrent as well as a way to identify pirates' devices for revocation.

Adversaries may attempt to "prerecord" inputs and outputs to all TRAP operations and use this data with a malicious interpreter. This attack can be thwarted in many ways, including by making the total amount of storage required excessive, using native code, by tracing the compromise using forensic marking, or by upgrading the security of the original device. If the source device is not actually compromised (e.g., it is running malicious content code), player cryptographic operations can be used to ensure that the player is actually running the content code being signed, decrypted, etc.

A malicious adversary may attempt to produce a hostile interpreter that operates incorrectly in ways intended to bypass security checks. A specific example is the case where the malicious interpreter attempts to make content code accept invalid RSA signatures, e.g. by searching for and replacing expected computational intermediates. To thwart such an attacks, the player can verify the signature using a computation other than a simply cubing the signature (mod n) and comparing against the expected value. For example, the content code could multiply by an initial value, then verify that the result equals the expected value times the cube of the initial value. Another way to verify a signature involves adding a constant to the signature, then verifying that the result is correct. Signature verification code can also be intertwined with other operations (such as modifications to a symmetric cryptographic key) such that the resulting cryptographic value will only be correct if the signature is valid. Self-modifying code, code obfuscation techniques, native code, and any other countermeasures can also be employed as appropriate.

Adversaries may attempt to insert malicious firmware into media interfaces (such as optical disc drives). This attack can be detected by having content code perform self checks to authenticate itself and to verify that data is loaded correctly from the media. Native and/or interpreted code can also be run by the drive to detect the attack. Content can also detect the attack by including data that would be modified by the attack and detecting if it is changed.

Adversaries may attempt to emulate media, including security features, for example by using a malicious device driver that loads data from a file on a hard drive instead of from legitimate media. This attack can be detected and thwarted by verifying that the drive has valid cryptographic keys. If adversaries find ways to extract keys from legitimate drives (thereby making the malicious emulator capable of emulating a legitimate drive's cryptographic operations), then additional drive authentication steps (such as providing native code for the drive, timing checks, tests for non-standard functionality, etc.) may be performed. In addition, the malicious device driver can be detected (e.g., using TRAP_DeviceDiscovery, native code, etc.)

Adversaries may attempt to exploit vulnerabilities in specific titles' security code. While some countermeasures may be possible (e.g., by delivering updated security logic), the primary solution is for content authors to ensure that future content is authored more carefully and does not have the same vulnerabilities.

Additional Considerations and Variations

Media may be configured to allow a limited number of uses (e.g., any three music videos can be watched) or duration of access (e.g., access expires 3 days after the first viewing). Thereafter, the user may be required to make a payment to obtain authorization for further (or unlimited) playbacks. A viewing counter (and/or other security and state information) may be stored on the media itself and/or in the player and/or on remote servers. For example, data authorizing unlimited playback may be placed on a writable portion of the media, thereby enabling playback on any player. Alternatively, the authorization can be stored in the player's nonvolatile memory and/or content code can be configured to contact a server over a network to obtain authorization.

Portions (or all) of the content on media can be inaccessible until certain conditions are met (e.g., payment, playback of a certain combination of other titles, a puzzle is solved, a certain amount of time has elapsed, etc.) In one example, content code is inoperable until it is purchased or activated. The activation process may performed locally or may involve interaction with remote server(s). For example, content code may contact a remote server, identify the local playback device to the server, interact with the user and with the server to effect a payment, and receive some keys, interpretable security code, or other data that enables decoding of the content. After the purchase is complete, the data received is used to activate decoding of the content.

When a user purchases a new player, a provision may be included to enable the migration of player nonvolatile memory from the old player to the new player. In one embodiment, this process is performed by moving data between devices on a physical carrier such as a smart card or writable media. Alternatively, the transfer may be performed via a digital connection such as a wired or wireless network or infrared port. For the greatest security, the transfer may be carried through (or mediated by) a trusted server device, which communicates with the donor and recipient devices to ensure that the data is transferred correctly and that the data is removed (or invalidated) on the donor device before it becomes usable on the recipient device. To accommodate data written by a wide range of different content titles, a single server may have knowledge of how many titles make use of nonvolatile storage, or the player may interact multiple servers (e.g., as identified in the nonvolatile memory slots themselves). Cryptographic keys on both the donor and recipient may be used to provide security for the transfer.

Media may include multiple data encoding methods. For example, a single optical disc may contain a high-density stamped portion, a write-once portion, and a recordable portion.

Location and distance measuring techniques can be used to ensure that recipient devices are not in unacceptable physical locations (such as in an unauthorized country, too far from a home network server serving content only for in-home use, etc.). The round communications round trip time can be multiplied by the speed of light to determine an upper bound on the distance to a device. Global positioning systems and attenuation of radio signals (e.g., if the devices are within range over 802.11b, Bluetooth, etc., or if devices can access a common radio/satellite signal, etc.) may also be employed to estimate location and/or proximity. The ability of devices to share a common wire (phone connection, home's power circuit, etc.) can also be used. Internet IP addresses and telephone numbers may also be used to obtain location information (e.g., for region coding applications, regional sports blackouts, selection of default language/currency options, etc.). Location information may be included in forensic marks.

The player can provide volatile or "fragile nonvolatile" memory storage areas, such as memory slots that allow content to pass data along to the next disc inserted but where the contents are deleted immediately thereafter. Volatile memory may be used for temporary storage in situations where it does not matter if the contents are erased when power is lost.

Neural networks may be employed in forensic mark detection/analysis, defining optimal security policies, etc.

Content code may be configured to allow playback from recordable media if proper authentication is present. For example, this capability may be used to create a optical disc burning kiosk (or other system) that can record media for consumers, e.g. to enable small stores to satisfy unpredictable consumer demand without having to carry a large inventory. A kiosk can retrieve the (raw) content from any source or combination of sources, including internal storage (hard disks, etc.) and data networks. The data recorded may be modified by the kiosk (optionally using interpreted code running in an interpreter contained within the kiosk), for example to introduce identifying forensic marks, to re-encrypt portions of the data, to associate up-to-date security logic with the content, to combine multiple content portions selected by a consumer, to accommodate a user request/preference, to (re)compress content or change formats to meet capacity or codec requirements of the media or player device, etc.

A value cryptographically authenticating the recording and authorizing playback may also be included. For example, this may be a digital signature issued by a trusted party, transferred to the kiosk over a network, burned onto the media, and verified by the content code during playback. This digital signature may, for example, include the media identifier, the root of a hash tree of the content computed using SHA-1, the identifier of the kiosk's recording drive, the issuance date, and the serial number of the destination media.

The kiosk may also include an interface for receiving bills, credit cards, or other payments; a touch screen or other input devices for receiving user selections; capabilities for printing customized box inserts, media surfaces, receipts, etc.; network capabilities for retrieving new content data, receiving new user interface components and advertisements/offers, verifying and processing payments, reporting error conditions, etc.; and audio/video manipulation capabilities for converting data to desired output formats, creating customized menus, etc.

To achieve high performance in writing to physical media (such as optical discs), media recording devices may simultaneously use multiple recording lasers. A physical supporting barrier may be placed surrounding the media to prevent shattering or damage due to centrifugal forces. Mirrors or other optical elements can be used to move laser beams around the media to reduce or eliminate the need to physically rotate optical media. Non-laser-based recording techniques may be employed (such as recording by placing microdroplets of an etching substance on a circular substrate, e.g. using high-resolution techniques analogous to those used in ink-jet printers, then coating the substrate with a protective layer).

Media does not need to be physically present at the playback device. For example, media can communicate with a player device via wireless or other networks. In one embodiment, media includes a coil and at least one semiconductor chip configured to (a) receive power from the inductive coil, (b) send and receive data with a player (or other device) using the inductive coil, (c) retrieve content (including content code, if supported) from a local memory, which may or may not include rewritable portions, (d) perform cryptographic handshakes for use by content code or other devices to authenticate the validity of the media. If multiple such media may be present (for example contained in an optionally-removable tray in the player device that can contain multiple media), an addressing method may be employed to enable the selection of which media should be communicating at a given time.

Content code can interact with any manner of external devices, as well as with components (such as software programs) that may be contained within the player device. For example, a smart toy (or other device) can interact with content code that supports the device (or a general class of such devices). Such interactions can include any manner of data exchanges, including commands (e.g., directions for a toy car to move), audio data (e.g., sounds for the device to emit, sounds recorded by the device, etc.), image/video data (e.g., for the device to display, from a digital camera in the device, etc.), logic (e.g., for execution by the device), event notifications, etc. In one embodiment, the content code interacts with and helps to control external appliances and devices (including without limitation lights, heating, air conditioning, home security systems, appliances, pet care/feeding devices, video recorders, etc.). The method of communication between the player device and external devices may include outputting data from a player device through conventional audiovisual outputs (e.g., to microphones, CCDs, or other sensors on the remote device) and receiving data via a remote control (e.g., infra-red) interface. Other supported communication methods can include wireless and wired networking and data exchange protocols. Some player devices may not have the necessary interfaces to enable all desired external interactions, in which case an external interface module may be connected directly (e.g. through a physical interface that bidirectional data communications and power). External devices may also include a nonvolatile memory or other storage for carrying code (including interpreted code) that is delivered to the player device, e.g. to assist the player device and/or content code in making use of the features provided by such external device.

Aspects of the playback system may be implemented separately and may communicate with each other. For example, on certain platforms (such as personal computers), it may be advantageous to separate portions that implement discovery and/or security assessment capabilities from the main player application, since these components may require more frequent updates than other components. In an exemplary embodiment, content code communicates with a security scanner configured to detect known security issues, such as the presence of malicious, unauthorized, and/or suspicious software. The scanner also provides information to content code and/or player applications about the state of the system, such as what applications are running, what device drivers are installed, what devices are known to be connected, etc. The scanner can also report its assessment of security status of the current system, such as whether the system meets requirements for secure playback. Because new piracy risks can appear quickly, for example if a new software exploit is publicized, the scanner program is preferably updated frequently, such as by downloading updates over the Internet or receiving digitally signed updates delivered with content code. The user may be charged (e.g., by automatically and periodically charging a payment instrument corresponding to the user, automatically notifying the user if the payment was unsuccessful, and/or automatically terminating the user's access if no payment is ultimately received) for the update service. The scanner may also notify the user of its results, automatically correct issues, and/or automatically download countermeasures or updates. The scanner can also notify content code or other components of changes in the system/security status, e.g. by registering an interrupt or event. Communications between components, such as content code and a scanner, may be secured cryptographically. For example, a scanner can digitally sign its results, along with a challenge value to prevent replay attacks. The scanner may be integrated an anti-virus scanner or other vulnerability scanner, although its functionality differs from conventional virus detectors in that it provides cryptographic authentication of its results as an attestation about the state of a machine that is usable by a content owner, as opposed to merely protecting the interests of the owner or operator of a computer.

An automated program may also be configured to search a computer to detect unauthorized (e.g., pirated) content. If such content is found, program can notify the user of potentially the infringing material. The program can also interact with (and provide attestations to) content code or other security components, e.g. to authorize playback of content on devices that are believed to be free of pirated material. To determine if material is authorized, the scanner can look for license files, digital signatures, known file hashes, etc.

Elements of the present invention (including security and non-security features) may, without limitation, be used with non-programmable content distribution systems, content protection systems that use native code instead of an interpreter or virtual machine, as part of any software application or device, on programmable systems where code is always run natively (as opposed to being processed using an interpreter/virtual machine), and may be used in other systems (including video game console copy protection and security systems). For example, and without limitation, individual aspects can be used for computer security applications, network security applications, non-programmable anti-piracy systems, fraud screening systems, e-mail filtering, etc.

The present invention may be integrated with digital data broadcasting systems (including without limitation television broadcasts of all kinds, satellite transmissions, communications over cable networks, Internet multicast, etc.). The broadcast signal may carry code (including security-related information and countermeasures) for use with the content carried in that signal or other content. The broadcast signal may also carry content and/or other data usable by other content titles. Security capabilities may also be integrated with (and communicate with) conventional conditional access cards and systems used to secure television signals.

When components of the present invention interact, they may use cryptographic techniques to secure their communication. Such security features may include the use of symmetric encryption and/or message authentication codes (or other checks) on the data. Symmetric keys used to secure such communications may be negotiated using public key cryptographic techniques (including digital signatures/certificates, exponential key agreement, public key encryption/decryption, challenge-response protocols, etc.), or asymmetric cryptographic techniques may be applied directly to the data. The revocation status of symmetric and asymmetric keys may be enforced (e.g., by checking revocation lists, interacting with a remote server, etc.) Keys may also be negotiated using symmetric cryptographic protocols (including without limitation using broadcast encryption techniques). Security measures employed do not need to be the same for all communications. (For example, control messages, security-related parameters, keys, and/or MPEG "I" frames could be encrypted, while other communications could be unencrypted.) Keys used to secure handshakes (including one or more related certificates related to each key or set of keys) may be verified using content code and/or directly by devices. Examples of components whose communications could be appropriate to secure cryptographically include without limitation optical disc drives, other media interfaces, media interface device drivers, player applications, content code execution threads (e.g., from a different content title being run simultaneously or from another thread belonging to the same content title), operating systems, video device drivers, video processors (or video cards, etc.), audio device drivers, audio processors, any manner of external devices (whether connected locally, accessed over a network, accessed over a bus, etc.), other applications (security scanners, audio mixers, video effects processors, etc.), codecs, and security modules.

Digital signatures may also be produced using keys that are authenticated using one or more certificates, and may be combined with other security values. Multiple versions of signatures may be provided (e.g., produced with different keys/signers, key sizes, algorithms, etc.)

Examples should not be construed as imposing limitations. For the sake of brevity, lists have not necessarily been fully enumerated, particularly in situations where items are included in a similar lists. The word "including" means including without limitation. Similarly, "e.g." and "for example" denote illustrative examples that do not limit the generality of what is being discussed. Similarly, "etc." means that there are additional possibilities, and the list should not be construed as necessarily enumerating all known possibilities.

In an exemplary embodiment, content can be customized for specific players. In this case, the content is playable only on a single player or small number of players, but code that is not required for playback on the recipient device(s) does not need to be transmitted. Thus, this approach is of particular value when it is difficult, expensive, or slow to send information to users, e.g. if storage space is limited or of the content must be sent over a slow network connection. The content can still, however, query the player to verify that the playback environment is suitably secure.

To ensure that playback is not interrupted or distorted, it can be helpful to require specific minimum performance standards for the players' interpreters.

In an exemplary embodiment, the systems and methods can be configured to allow content to be exchanged from one device to another. The specific security characteristics of such exchanges depend factors such as whether on-line communication with a trusted (e.g., publisher-operated) server is available. The form in which the content is transferred depends on the security policies enforced by the content and the devices' hardware capabilities. For example, in one embodiment where both devices include secure interpreters, the sending device transmits the raw encrypted content (as stored on the original media or encrypted with another key, optionally with watermarks included) along with code for controlling the playback. The playback control code can be customized by the sending device for the recipient device. In another case, the sending device may verify that the security characteristics of the output port and destination device are acceptable, negotiate a shared key with the destination device, decrypt and watermark the content, re-encrypt the content with the shared key, and send the re-encrypted content to the destination.

Players with adequate nonvolatile storage can be used to store updateable code that is called from the interpreter. For example, the player can be configured to always store the latest security code for a particular publisher. In this case, if a newer version of the security code is encountered, the old version will be updated (e.g., after verifying a digital signature on the new code). In this way, older content can benefit from security updates carried on new content. (This approach can, for example, be implemented using the secure memory method described previously.) In another embodiment, content can require that players include current security updates by obtaining the current date/time from the player and comparing against the date/time of the latest known security upgrade. In this manner, content can ensure that players have reasonably up-to-date security upgrades.

In general, content protection systems should avoid playing any visible role in legitimate actions by legitimate users. Nevertheless, some user interface elements are necessary, such as for reporting errors or providing information. In the case where content can select between multiple supported output qualities (e.g., a "legacy" quality if the player provides inadequate security and a "high" quality if security is satisfactory), an indicator can be useful to notify the user of the output quality. For example, in one embodiment, a green light emitting diode (LED) under the control of the content indicates that output is of high-quality (i.e., the security is satisfactory), an orange LED indicates reduced quality (i.e., marginal security), and a blinking red LED can indicates that no output is provided because the player is revoked. In another embodiment, a brief spoken or written notice (in the user's language, if known) is provided to report the status of the security. The decision whether to report and/or use the higher quality versus the lower quality output can be based on other factors, such as the presence and/or absence of a robust and/or fragile watermark. If necessary, a degradation module can be included with the player to enable the content to reduce the quality of playback (e.g., to the quality of a legacy format) for security or other reasons. (Degradation modules can, for example, be included to convert high-definition television signals to NTSC-resolution or to convert high-resolution multi-channel audio into 2-channel CD-quality audio.)

If the media interface and player interpreter offer adequate performance, bulk decryption and watermark embedding can be handled in the interpreter instead of in a separate decryption module. Allowing the content to decrypt itself directly can provide some security benefits, such as ensuring that attackers will not mount attacks against the decryption module. If the interpreter performance is adequate, it is also possible to implement the content decompression in the interpreter as well, avoiding the need to standardize a single player Codec type.

While implementation using an interpreter is preferable on platforms (such as personal computers) that do not have specific hardware support for the techniques and systems disclosed herein, it is possible to implement many of the interpreter functions in dedicated hardware. Depending on the application, dedicated implementations may have cost or power consumption savings, although provide reduced functionality.

Embodiments that receive content on physical media can use virtually any media format. While optical discs (such as CD and DVD) provide high storage densities at low cost, other storage systems can also be employed, including without limitation magnetic media, holographic memories, battery-backed RAM, ROM, EEPROM, and flash memory. The storage capacity of the media can be used for storing data of many different types, including information related to the techniques and systems disclosed herein (such as executable programs that implement decoding methods for various computer platforms, content protected using methods disclosed herein, etc.) as well as data that is not directly related to the techniques and systems disclosed herein (such as unrelated executable programs, unprotected content such as Red Book CD audio, content protected using other security schemes, etc.).

Media can include tamper-resistant circuitry for performing cryptographic computations to enable players to verify that the media is not an unauthorized copy. Although such capabilities are simplest to implement for media that use electrical interfaces, even optical media can include cryptographic capabilities. For example, a contactless cryptographic module (such as the contactless smart card of U.S. Pat. No. 5,640,306 to Gaumet et al.) can be affixed to or embedded in an optical disc. While cryptographic media authentication is preferable, other authentication mechanisms can be employed instead. For example, general media authentication methods known in the background art include writing serial numbers to difficult-to-copy locations (such as regions that are not writeable using commercially recordable media or drives) and including a digitally-signed "description" of various characteristics of the original physical media. Of course, cryptographic mechanisms offer the advantage that, even if attackers discover methods for compromising existing media, future media can be issued with improved security without requiring any changes to the player.

Because many consumers already have an investment in content on legacy formats, players implementing the techniques and systems disclosed herein may be configured to support these legacy formats. Similarly, different versions of the interpreter may be supported by a particular player. In this case, the player needs to analyze the media or content to identify the appropriate security system to use. For example, a digital video player might detect whether the disc is a legacy DVD using CSS (and, if so, select a CSS decryption system) or is a DVD using the techniques and systems disclosed herein (and, if so, activate a language-based decryption system). Robust watermarks included in the content can be used to detect if content that was originally protected with one security system has been copied to a format lacking the original protections. For example, content that does not allow copying could include a watermark to indicate that any devices that encounter a copy in any other format (e.g., in an unprotected format) can recognize the copy as unauthorized and (for example) refuse playback.

The techniques and systems disclosed herein can be used with a wide variety of content types, including without limitation audio, still images, video, 3-dimensional images, and 3-dimensional video.

The techniques and systems disclosed herein can also be implemented in a variety physical devices. If only one device is responsible for decrypting content, it is preferable to have security policies enforced by that device. However, output devices and intermediate processing devices (such an audio equalizer or mixer), can also benefit from the techniques and systems disclosed herein and/or by providing query capabilities that can be used by such techniques and systems to verify their security. In one embodiment, a home entertainment server downloads, stores, and manages content, and forwards content to playback devices (speakers, headphones, video displays, etc.) whose security has been successfully verified. Connections to these devices are encrypted, preferably under the joint control of the techniques and systems disclosed herein and the destination device, to prevent theft of content in transit.

We claim:

1. A computer-implemented method of controlling playback of digital content by a playback device, the method comprising:

receiving data that includes the digital content, first data processing instructions, and second data processing instructions, the first data processing instructions being specific to the digital content and being executable by a computer language interpreter of the playback device to authenticate the second data processing instructions, the second data processing instructions being executable by the computer language interpreter of the playback device to request an access to a memory of the playback device; and executing the first data processing instructions by using the computer language interpreter, the first data processing instructions configuring the computer language interpreter to:

obtain a cryptographic value of the second data processing instructions;

determine an authenticity of the second data processing instructions by using the cryptographic value;

based on the authenticity, performing a first operation, the first operation being selected from a first group consisting of:

inhibiting playback of at least a portion of the digital content, and enabling the access by the computer language interpreter to the memory of the playback device, the access being performed by the computer language interpreter pursuant to execution of the second data processing instructions.

2. The computer-implemented method of claim 1, wherein the first data processing instructions, in configuring the computer language interpreter to determine the authenticity, configure the computer language interpreter to perform a second operation selected from a second group consisting of:
   comparing the cryptographic value to a reference value stored in the memory, and
   verifying a digital signature corresponding to at least one of the first data processing instructions or the second data processing instructions.

3. The computer-implemented method of claim 1, wherein the receiving of the data includes receiving at least some of the data from a media drive or via a network.

4. The computer-implemented method of claim 1 further comprising storing information in the memory, the information representing at least one of:
   a payment referencing the digital content,
   a history of pay-per-view payments,
   a counter value,
   a duration of access,
   a spending limit,
   a pricing discount,
   a permission level,
   a privilege level,
   a security policy,
   a software update of the playback device,
   third data processing instructions to obtain the software update,
   a cryptographic key, or
   a digital signature.

5. The computer-implemented method of claim 1, wherein the first data processing instructions, in configuring the computer language interpreter to inhibit the playback, configure the computer language interpreter to perform a third operation selected from a third group consisting of:
   preventing the playback,
   disabling a rendering of the portion of the digital content,
   communicating an error message,
   communicating a first request to receive authentication data,
   communicating a second request to initiate an upgrade of the playback device,
   disabling a decryption of the portion of the digital content, and
   restricting the playback to a reduced quality level less than a maximum quality level of the digital content.

6. An optical medium comprising:
   digital content;
   first data processing instructions specific to the digital content and executable by a computer language interpreter of a playback device to authenticate second data processing instructions; and
   the second data processing instructions, the second data processing instructions being executable by the computer language interpreter of the playback device to request an access to a memory of the playback device;
   the first data processing instructions, when executed by the computer language interpreter of a playback device, configuring the computer language interpreter to:
      obtain a cryptographic value of the second data processing instructions;
      determine an authenticity of the second data processing instructions by using the cryptographic value;
      based on the authenticity, perform a first operation, the first operation being selected from a first group consisting of:
         inhibiting playback of at least a portion of the digital content, and
         enabling an access by the computer language interpreter to a memory of the playback device, the access being performed by the computer language interpreter pursuant to execution of the second data processing instructions;
   the second data processing instructions, when executed by the computer language interpreter of the playback device, configuring the computer language interpreter to request the access to the memory of the playback device.

7. The optical medium of claim 6, wherein the first data processing instructions, in configuring the computer language interpreter to determine the authenticity, configure the computer language interpreter to perform a second operation selected from a second group consisting of:
   comparing the cryptographic value to a reference value stored in the memory; and
   verifying a digital signature corresponding to at least one of the first data processing instructions or the second data processing instructions.

8. The optical medium of claim 6, wherein the first data processing instructions, in configuring the computer language interpreter to inhibit the playback, configure the computer language interpreter to perform a third operation selected from a third group consisting of:
   preventing the playback,
   disabling a rendering of the portion of the digital content,
   communicating an error message,
   communicating a first request to receive authentication data,
   communicating a second request to initiate an upgrade of the playback device,
   disabling a decryption of the portion of the digital content, and
   restricting the playback to a reduced quality level less than a maximum quality level of the digital content.

9. An apparatus to control playback of digital content, the apparatus comprising:
   a memory;
   a computer language interpreter communicatively coupled to the memory; and
   a media interface communicatively coupled to the computer language interpreter, the media interface being configured to receive data that includes the digital content, first data processing instructions, and second data processing instructions, the first data processing instructions being specific to the digital content and being executable by the computer language interpreter to authenticate the second data processing instructions, the second data processing instructions being executable by the computer language interpreter to request an access to the memory, the first data processing instructions, when executed by the computer language interpreter, configuring the computer language interpreter to:
      obtain a cryptographic value of the second data processing instructions;
      determine an authenticity of the second data processing instructions by using the cryptographic value;
      based on the authenticity, perform a first operation selected from a first group consisting of:
         inhibiting playback of at least a portion of the digital content, and
         enabling the access by the computer language interpreter to the memory, the access being performed by the computer language interpreter pursuant to execution of the second data processing instructions.

10. The apparatus of claim 9, wherein the media interface is to receive at least some of the data from a media drive or via a network.

11. A computer-implemented method of controlling a playback device, the method comprising:

receiving data that includes digital content and first data processing instructions, the first data processing instructions being specific to the digital content and being executable by a computer language interpreter of the playback device to identify second data processing instructions that are executable by the playback device to affect playback of the digital content; and executing the first data processing instructions by using the computer language interpreter of the playback device, the first data processing instructions configuring the computer language interpreter to:

determine a security risk of the playback device;

identify the second data processing instructions as a software countermeasure associated with the security risk, the identifying being based on the security risk; and initiate an execution of the second data processing instructions by the playback device to implement the software countermeasure associated with the security risk.

12. The computer-implemented method of claim 11, wherein the second data processing instructions include a specific instruction encoded as native code of the playback device.

13. The computer-implemented method of claim 11, wherein the first data processing instructions, when executed by the computer language interpreter, configure the computer language interpreter to determine an authenticity of the second data processing instructions.

14. The computer-implemented method of claim 11, wherein the first data processing instructions, in configuring the computer language interpreter to determine the security risk, configure the computer language interpreter to detect a presence of unauthorized software on the playback device.

15. The computer-implemented method of claim 11, wherein the first data processing instructions, when executed by the computer language interpreter, configure the computer language interpreter to initiate a reception of at least some of the second data processing instructions from a media drive or via a network.

16. The computer-implemented method of claim 11, wherein the second data processing instructions, when executed on the playback device, configure the playback device to modify at least some of the digital content with a forensic mark.

17. An optical medium comprising:

digital content; and first data processing instructions specific to the digital content and executable by a computer language interpreter of a playback device to identify second data processing instructions that are executable by the playback device to affect playback of the digital content, the first data processing instructions, when executed by the computer language interpreter of the playback device, configuring the computer language interpreter to:

determine a security risk of the playback device;

identify the second data processing instructions as a software countermeasure associated with the security risk, the identifying being based on the security risk; and initiate execution of the second data processing instructions by the playback device to implement the software countermeasure associated with the security risk.

18. The optical medium of claim 17, wherein the second data processing instructions include a specific instruction encoded as native code of the playback device.

19. The optical medium of claim 17, wherein the first data processing instructions, when executed by the computer language interpreter, configure the computer language interpreter to determine an authenticity of the second data processing instructions.

20. The optical medium of claim 17, wherein the first data processing instructions, in configuring the computer language interpreter to determine the security risk, configure the computer language interpreter to detect a presence of unauthorized software on the playback device.

21. The optical medium of claim 17, wherein the second data processing instructions, when executed on the playback device, configure the playback device to modify at least some of the digital content with a forensic mark.

22. An apparatus comprising:

a media interface to receive data that includes digital content and first data processing instructions, the first data processing instructions being specific to the digital content and being executable by a computer language interpreter of the apparatus to identify second data processing instructions that are executable by the apparatus to affect playback of the digital content; and the computer language interpreter, the computer language interpreter being communicatively coupled to the media interface, the computer language interpreter being configured to execute the first data processing instructions, the first data processing instructions, when executed by the computer language interpreter, configuring the computer language interpreter to:

determine a security risk of the apparatus;

identify the second data processing instructions as a software countermeasure associated with the security risk, the identifying being based on the security risk; and initiate an execution of the second data processing instructions by the apparatus to implement the software countermeasure associated with the security risk.

23. A non-transitory machine-readable storage medium comprising a set of instructions that, when executed by one or more processors of a machine, cause the machine to perform operations comprising:

receiving data that includes digital content and first data processing instructions, the first data processing instructions being specific to the digital content and being executable by the one or more processors of the machine to identify second data processing instructions that are executable by the machine to affect playback of the digital content; and executing the first data processing instructions by using the one or more processors, the first data processing instructions configuring the one or more processors to:

determine a security risk of the machine;

identify the second data processing instructions as a software countermeasure associated with the security risk, the identifying being based on the security risk; and initiate an execution of the second data processing instructions by the machine to implement the software countermeasure associated with the security risk.

24. A system to control playback of digital content, the system comprising:

a memory;

means for receiving data that includes the digital content, first data processing instructions, and second data processing instructions, the first data processing instructions being specific to the digital content and being executable to authenticate the second data processing instructions, the second data processing instructions being executable to request an access to the memory; and means for executing the first data processing instructions, the first data processing instructions to:

obtain a cryptographic value of the second data processing instructions;

determine an authenticity of the second data processing instructions by using the cryptographic value;

based on the authenticity, perform an operation selected from a group consisting of:

inhibiting playback of at least a portion of the digital content, and enabling the access to the memory of the playback device, the access being performed pursuant to execution of the second data processing instructions.

* * * * *